(12) United States Patent
Tajima

(10) Patent No.: US 10,720,662 B2
(45) Date of Patent: Jul. 21, 2020

(54) SECONDARY BATTERY AND METHOD FOR MANUFACTURING SECONDARY BATTERY

(71) Applicant: Semiconductor Energy Laboratory Co., Ltd., Atsugi-shi, Kanagawa-ken (JP)

(72) Inventor: Ryota Tajima, Isehara (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 468 days.

(21) Appl. No.: 14/993,413

(22) Filed: Jan. 12, 2016

(65) Prior Publication Data
US 2016/0218387 A1    Jul. 28, 2016

(30) Foreign Application Priority Data
Jan. 23, 2015   (JP) .................................. 2015-010992

(51) Int. Cl.
*H01M 10/00*      (2006.01)
*H01M 10/04*      (2006.01)
*H01M 10/0525*    (2010.01)

(52) U.S. Cl.
CPC .... *H01M 10/0431* (2013.01); *H01M 10/0525* (2013.01); *H01M 2220/30* (2013.01)

(58) Field of Classification Search
CPC ......... H01M 10/0431; H01M 10/0525; H01M 2220/30; H01M 10/0583; H01M 10/052
See application file for complete search history.

(56) References Cited

U.S. PATENT DOCUMENTS

| 4,029,855 A | 6/1977 | Dougherty et al. |
| 6,020,086 A * | 2/2000 | Van Lerberghe ... H01M 2/0207 |
| | | 429/127 |

(Continued)

FOREIGN PATENT DOCUMENTS

| CN | 101257109 A | 9/2008 |
| CN | 102326218 A | 1/2012 |

(Continued)

OTHER PUBLICATIONS

International Search Report (Application No. PCT/IB2016/050114) dated May 17, 2016.

(Continued)

*Primary Examiner* — Nicholas P D'Aniello
(74) *Attorney, Agent, or Firm* — Robinson Intellectual Property Law Office; Eric J. Robinson

(57) ABSTRACT

When stress is concentrated on an electrode and a tab to which a lead of the electrode is connected in a secondary battery with a curved shape, the tab might be broken. The secondary battery including a first electrode, a second electrode, a separator, a first lead, and a second lead includes a first portion, a second portion, and a third portion located between the first portion and the second portion. The first electrode overlaps with the second electrode with the separator provided therebetween in the first portion and the second portion. The first electrode is folded in the third portion so as to form a first folded portion, and the first lead is connected to the first folded portion. The second electrode is folded in the third portion so as to form a second folded portion, and the second lead is connected to the second folded portion.

14 Claims, 29 Drawing Sheets

(56) References Cited

U.S. PATENT DOCUMENTS

| | | | |
|---|---|---|---|
| 8,163,421 B2 | 4/2012 | Chang et al. | |
| 8,932,754 B2 | 1/2015 | Shibata et al. | |
| 2005/0130030 A1* | 6/2005 | Watanabe | H01M 2/0404 429/100 |
| 2012/0040231 A1 | 2/2012 | Hagiwara et al. | |
| 2012/0107670 A1* | 5/2012 | Viavattine | A61N 1/378 429/153 |
| 2012/0177985 A1 | 7/2012 | Kuo et al. | |
| 2015/0022957 A1 | 1/2015 | Hiroki et al. | |
| 2015/0138699 A1 | 5/2015 | Yamazaki | |
| 2015/0155530 A1 | 6/2015 | Takahashi et al. | |
| 2015/0243962 A1 | 8/2015 | Hiroki et al. | |
| 2015/0340664 A1 | 11/2015 | Takahashi et al. | |
| 2016/0118640 A1 | 4/2016 | Miyake | |
| 2016/0218327 A1 | 7/2016 | Takahashi et al. | |

FOREIGN PATENT DOCUMENTS

| | | |
|---|---|---|
| DE | 2726562 | 12/1978 |
| JP | 05-144421 A | 6/1993 |
| JP | 2000-012095 A | 1/2000 |
| JP | 2004-241250 A | 8/2004 |
| JP | 4964350 | 6/2012 |
| JP | 2012-519949 | 8/2012 |
| JP | 2013-153013 A | 8/2013 |
| JP | 2016-001604 A | 1/2016 |
| WO | WO-2010/104688 | 9/2010 |
| WO | WO-2010/125867 | 11/2010 |

OTHER PUBLICATIONS

Written Opinion (Application No. PCT/IB2016/050114) dated May 17, 2016.

* cited by examiner

FIG. 13A
FIG. 13B
FIG. 13C
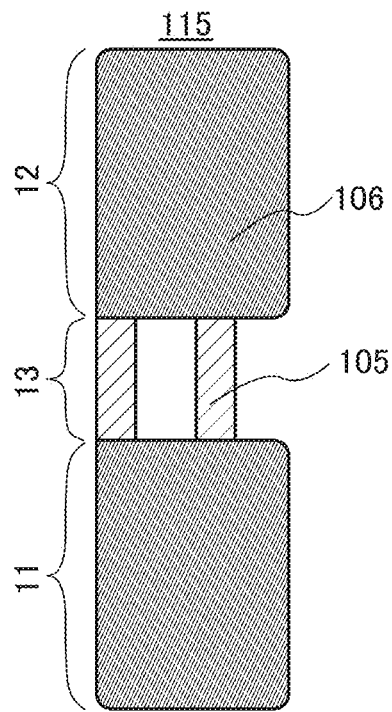
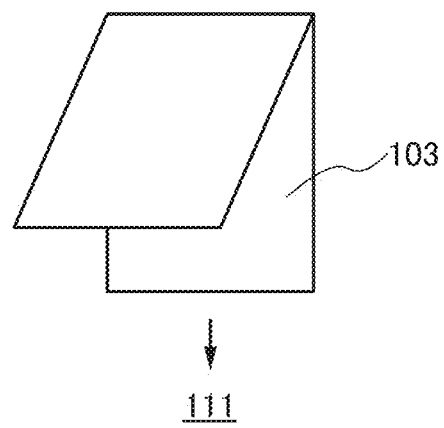
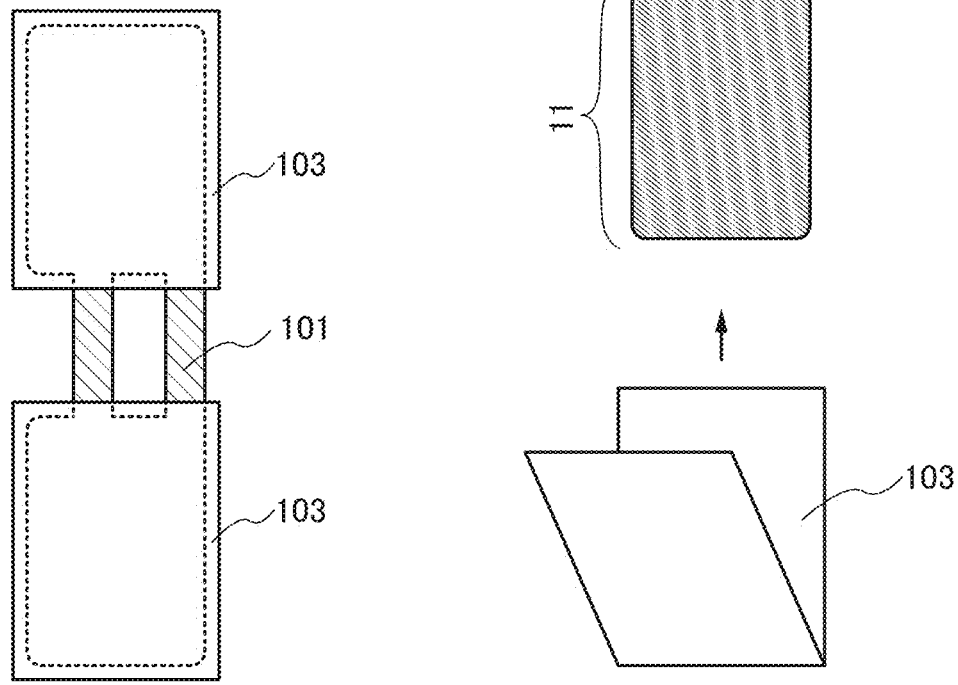

SECONDARY BATTERY AND METHOD FOR MANUFACTURING SECONDARY BATTERY

TECHNICAL FIELD

The present invention relates to an object, a method, or a manufacturing method. The present invention relates to a process, a machine, manufacture, or a composition of matter. In particular, one embodiment of the present invention relates to a semiconductor device, a display device, a light-emitting device, a power storage device, an imaging device, a driving method thereof, or a manufacturing method thereof. In particular, one embodiment of the present invention relates to a secondary battery and a method for manufacturing the secondary battery.

BACKGROUND ART

In recent years, wearable devices have been actively developed. Because a wearable device is worn on one's body, it is preferable that the wearable device have a curved shape so as to conform to a curved surface of the body or be curved according to the movement of the body. Therefore, it is preferable that a secondary battery used in a wearable device have flexibility like those for displays and other housings.

For example, Patent Document 1 discloses an electrochemical device (e.g., a secondary battery or a capacitor) which is covered with a metal laminate and which can be easily curved or can easily maintain a curved state.

REFERENCE

Patent Document

[Patent Document 1] Japanese Published Patent Application No. 2004-241250

DISCLOSURE OF INVENTION

A secondary battery with a curved shape includes an exterior body formed using a flexible material such as a laminate film, and is provided with a positive electrode lead and a negative electrode lead to take a positive electrode and a negative electrode out of the exterior body. Here, the positive electrode lead and the negative electrode lead are interposed between an exterior body. The positive electrode lead is connected to a positive electrode tab formed in the positive electrode, and the negative electrode lead is connected to a negative electrode tab formed in the negative electrode. The positive electrode tab and the negative electrode tab have elongated shapes in each electrode. Thus, the positive electrode tab and the negative electrode tab are likely to cause deterioration such as a crack or a breakage compared with the main portions of the electrodes.

In particular, in the case where the positive electrode lead and the negative electrode lead are each connected to the edge of the secondary battery in the curving direction as disclosed in Patent Document 1, stress due to transformation of the secondary battery tends to concentrate on the positive electrode tab and the negative electrode tab. Thus, the positive electrode tab and the negative electrode tab might be cracked or broken when a curved wearable device including the secondary battery is attached and detached repeatedly, for example.

In view of the above, an object of one embodiment of the present invention is to provide a secondary battery with a structure that can inhibit deterioration of a positive electrode or a negative electrode, in particular, a positive electrode tab or a negative electrode tab.

Another object of one embodiment of the present invention is to provide a secondary battery with a novel structure or, specifically, a flexible secondary battery with a novel structure. Another object of one embodiment of the present invention is to provide a novel power storage device, an electronic device including a novel secondary battery, or the like.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In order to achieve the above objects, according to one embodiment of the present invention, a positive electrode tab and a negative electrode tab are provided in places where occurrence of positional misalignment when a secondary battery is curved is relatively low.

One embodiment of the disclosed invention is a secondary battery including a first electrode, a second electrode, a separator, a first lead, and a second lead. The secondary battery includes a first portion, a second portion, and a third portion located between the first portion and the second portion. The first electrode overlaps with the second electrode with the separator provided therebetween in the first portion and the second portion. The first electrode is folded in the third portion so as to form a first folded portion, and the first lead is connected to the first folded portion. The second electrode overlaps with the first electrode with the separator provided therebetween in the first portion and the second portion. The second electrode is folded in the third portion so as to form a second folded portion, and the second lead is connected to the second folded portion.

Another embodiment of the disclosed invention is a secondary battery including a first electrode, a second electrode, a separator, a first lead, and a second lead. The secondary battery includes a first portion with a first curved shape, a second portion with a second curved shape, and a third portion located between the first portion and the second portion. The first electrode overlaps with the second electrode with the separator provided therebetween in the first portion and the second portion. The first electrode is folded in the third portion so as to form a first folded portion, and the first lead is connected to the first folded portion. The second electrode overlaps with the first electrode with the separator provided therebetween in the first portion and the second portion. The second electrode is folded in the third portion so as to form a second folded portion, and the second lead is connected to the second folded portion.

Another embodiment of the disclosed invention is a secondary battery including a first electrode, a second electrode, a separator, a first lead, a second lead, a first exterior body, a second exterior body, and a third exterior body. The secondary battery includes a first portion with a first curved shape, a second portion with a second curved shape, and a third portion located between the first portion and the second portion. The first electrode overlaps with the second electrode with the separator provided therebetween in the first portion and the second portion. The first electrode is folded in the third portion so as to form a first folded portion, and the first lead is connected to the first folded portion. The second electrode overlaps with the first electrode with the separator provided therebetween in the first portion and the second portion. The second electrode is folded in the third portion so as to form a second folded portion, and the second lead is connected to the second folded portion. The first exterior body is attached to the second exterior body in the first portion and attached to the third exterior body in the second portion. The second exterior body is attached to the third exterior body in the third portion.

In the above embodiment, the second exterior body may be folded at a boundary between the first portion and the third portion.

In the above embodiment, a cushioning material may be provided between the first exterior body, and the first electrode or the second electrode.

In the above embodiment, in a direction in which a midpoint of one edge on the first portion side of the secondary battery and a midpoint of one edge on the second portion side of the secondary battery are connected, the length of the first portion is preferably one-third or more and three times or less the length of the second portion.

In the above embodiment, a plurality of first electrodes, a plurality of second electrodes, and a plurality of separator may be stacked. The plurality of first electrodes may be fixed to the first lead in the third portion. The plurality of second electrodes may be fixed to the second lead in the third portion.

According to one embodiment of the present invention, it is possible to provide a secondary battery with a structure that can inhibit deterioration of a positive electrode or a negative electrode, in particular, a positive electrode tab or a negative electrode tab.

According to one embodiment of the present invention, a secondary battery with a novel structure or, specifically, a flexible secondary battery with a novel structure can be provided. According to one embodiment of the present invention, a novel power storage device, an electronic device including a novel secondary battery, or the like can be provided.

Note that the description of these effects does not disturb the existence of other effects. One embodiment of the present invention does not necessarily achieve all the objects listed above. Other effects will be apparent from and can be derived from the description of the specification, the drawings, the claims, and the like.

BRIEF DESCRIPTION OF DRAWINGS

FIGS. 13A to 13C illustrate a method for manufacturing a secondary battery.

BEST MODE FOR CARRYING OUT THE INVENTION

Figure 1A:
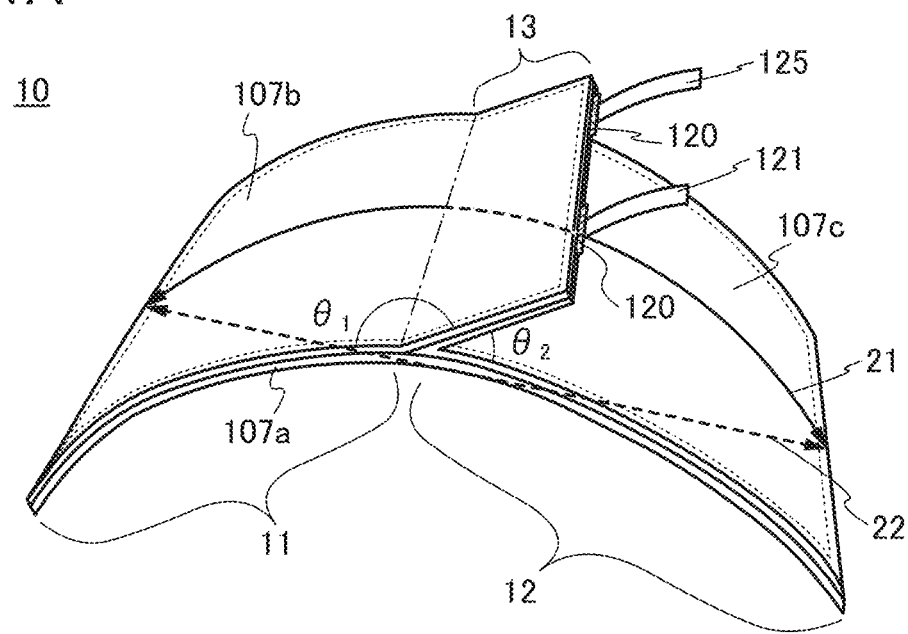
FIGS. 1A and 1B are a perspective view and a top view illustrating a structure example of a secondary battery.

Embodiments of the present invention will be described below in detail with reference to the drawings. However, the present invention is not limited to the description below, and it is easily understood by those skilled in the art that modes and details disclosed herein can be modified in various ways. Furthermore, the present invention is not construed as being limited to description of the embodiments.

The term "electrically connected" includes the case where components are connected through an "object having any electric function". There is no particular limitation on the "object having any electric function" as long as electric signals can be transmitted and received between the components connected through the object.

The position, size, range, or the like of each component illustrated in drawings and the like is not accurately illustrated in some cases for easy understanding. Therefore, the disclosed invention is not necessarily limited to the position, the size, the range, or the like disclosed in the drawings and the like.

The ordinal number such as "first", "second", and "third" are used to avoid confusion among components.

Note that the terms "film" and "layer" can be interchanged with each other depending on the case or circumstances. For example, in some cases, the term "conductive layer" can be used instead of the term "conductive film", and the term "insulating film" can be used instead of the term "insulating layer".

Embodiment 1

In this embodiment, a structure example of a secondary battery of one embodiment of the present invention will be described with reference to FIGS. 1A and 1B, FIGS. 2A and 2B, FIGS. 3A and 3B, FIGS. 4A to 4C, FIGS. 5A and 5B, FIG. 6, FIGS. 7A to 7C, FIGS. 8A to 8C, FIGS. 9A and 9B, FIGS. 10A to 10C, FIGS. 11A to 11F, and FIGS. 12A and 12B.

[1. 1. Typical Structure]

Figure 1B:
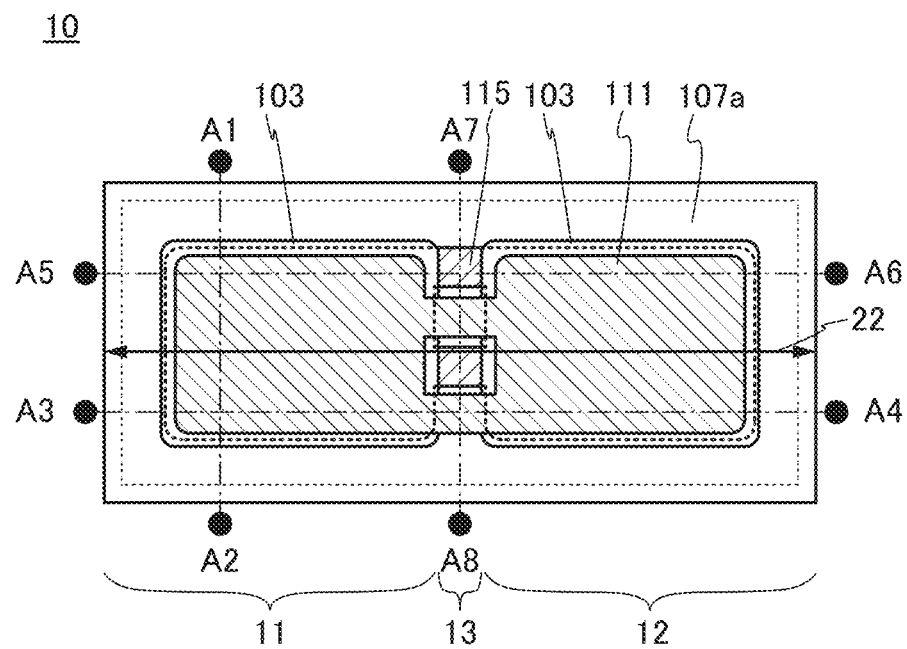

FIGS. 1A and 1B, FIGS. 2A and 2B, and FIGS. 3A and 3B illustrate a structure of a secondary battery 10 of one embodiment of the present invention. FIG. 14 is a perspective view of the secondary battery 10, FIG. 1B is a top view of the secondary battery 10, and FIGS. 2A and 2B and FIGS. 3A and 3B are cross-sectional views of the secondary battery 10.

Figure 2A:
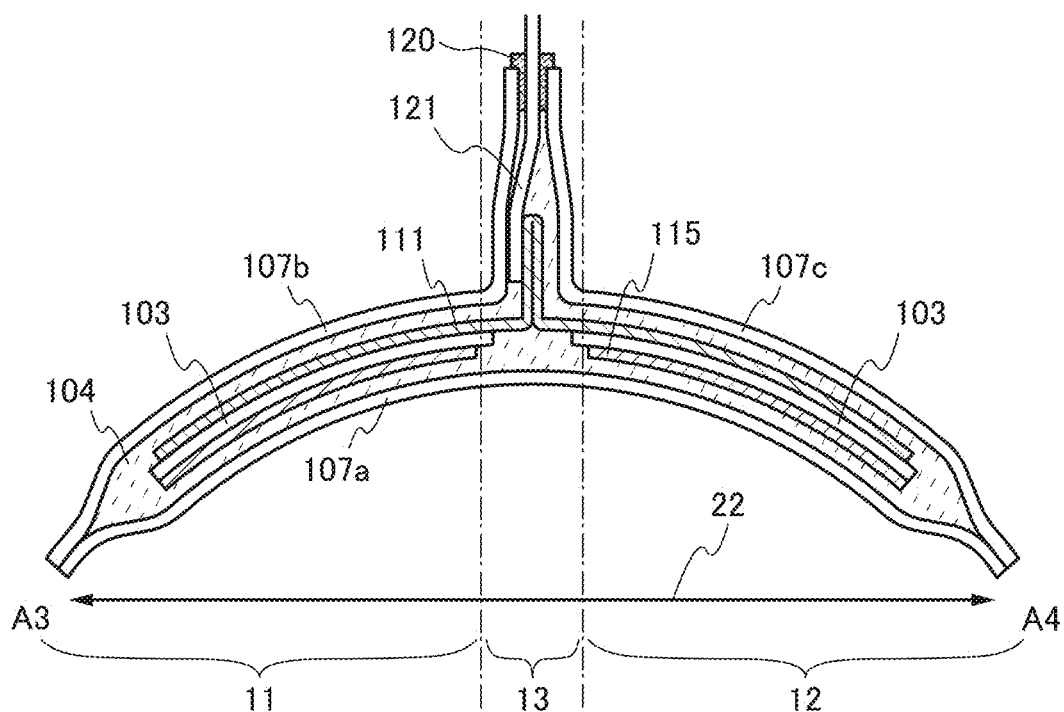
FIGS. 2A and 2B are cross-sectional views illustrating a structure example of a secondary battery.
Figure 2B:
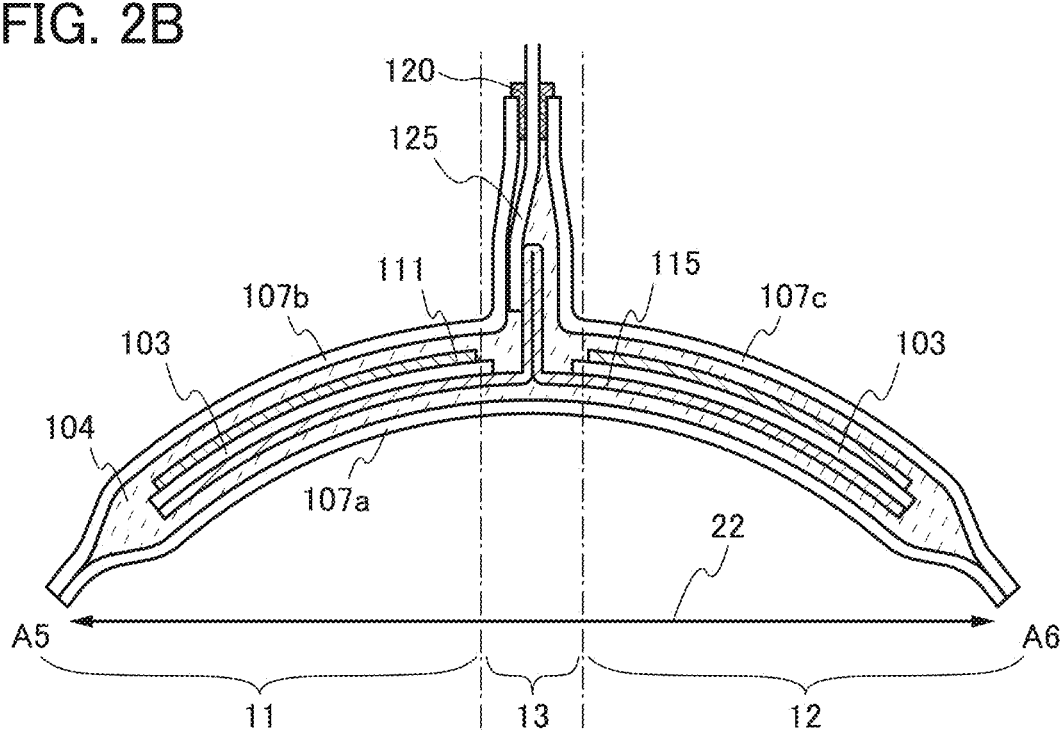
Figure 3A:
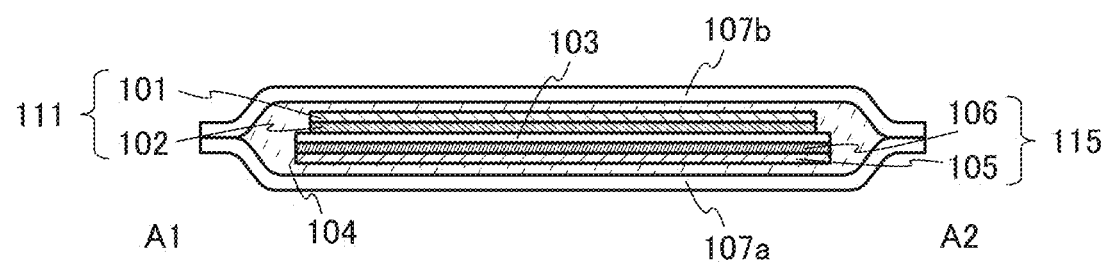
FIGS. 3A and 3B are cross-sectional views illustrating a structure example of a secondary battery.
Figure 3B:
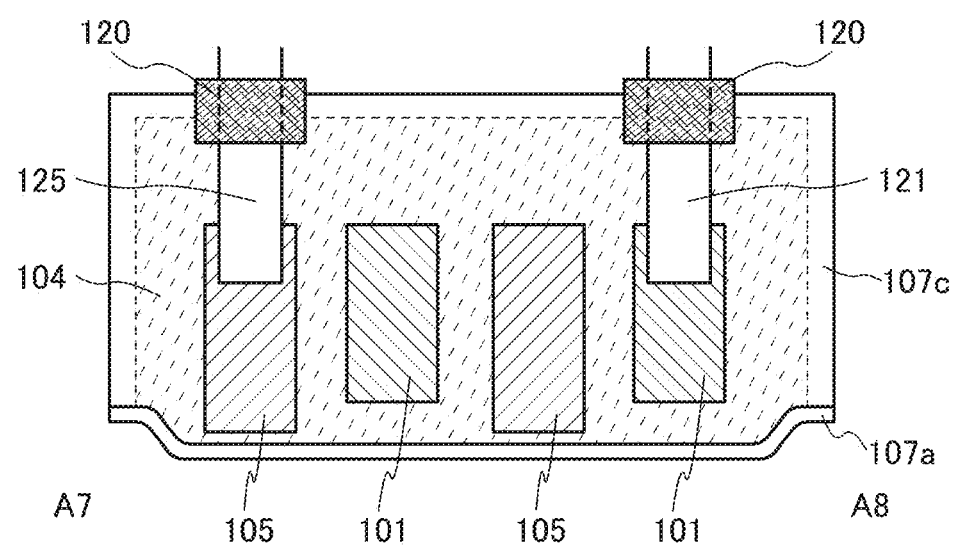

Note that the secondary battery 10 is schematically illustrated in the perspective view of FIG. 1A, in which some of the components (e.g., the thicknesses of exterior bodies) are exaggerated for easy understanding. In FIG. 1B, some of the components (e.g., an exterior body 107b, an exterior body 107c, a positive electrode lead 121, and a negative electrode lead 125) are omitted from illustration to avoid complexity of the drawing. FIG. 2A is a cross-sectional view taken along the dashed-dotted line A3-A4 in FIG. 1B, and FIG. 2B is a cross-sectional view taken along the dashed-dotted line A5-A6 in FIG. 1B. FIG. 3A is a cross-sectional view taken along the dashed-dotted line A1-A2 in FIG. 1B, and FIG. 3B is a cross-sectional view taken along the dashed-dotted line A7-A8 in FIG. 1B. Note that in FIG. 3B, some of the components (e.g., a positive electrode current collector 101, a negative electrode current collector 105, the positive electrode lead 121, the negative electrode lead 125, and a sealing layer 120) are schematically illustrated to avoid complexity of the drawing.

The secondary battery 10 illustrated in FIGS. 1A and 1B and FIGS. 2A and 2B includes a positive electrode 111, a negative electrode 115, a separator 103, the positive electrode lead 121, the negative electrode lead 125, and exterior bodies 107a to 107c having flexibility. The exterior bodies 107a to 107c are provided to wrap the positive electrode 111, the negative electrode 115, and the separator 103. The positive electrode 111 includes the positive electrode current collector 101 and a positive electrode active material layer 102, and the negative electrode 115 includes the negative electrode current collector 105 and a negative electrode active material layer 106. The positive electrode lead 121 and the negative electrode lead 125 each include the sealing layer 120. The secondary battery 10 includes an electrolyte solution 104 in a region wrapped with the exterior bodies 107a to 107c.

Here, the secondary battery 10 is composed of a first portion 11, a second portion 12, and a third portion 13, and the third portion 13 is located between the first portion 11 and the second portion 12. The first portion 11 and the second portion 12 have curved shapes, which are preferably substantially continuous. However, when the thickness of the third portion 13 is increased, the curved shapes of the first portion 11 and the second portion 12 are not continuous in some cases.

As illustrated in FIG. 1A, a first direction 21 refers to the direction in which the first portion 11 and the second portion 12 are curved. In addition, as illustrated in FIG. 1B, a second direction 22 refers to the direction in which the midpoint of one edge on the first portion 11 side (A3 and A5 sides) of the secondary battery 10 and the midpoint of one edge on the second portion 12 side (A4 and A6 sides) of the secondary battery 10 are connected. The second direction 22 can also be referred to as the first direction 21 which is projected on the plane in FIG. 1B.

In the first portion 11 and the second portion 12, the positive electrode 111 and the negative electrode 115 overlap with each other with the separator 103 provided therebetween. That is, the first portion 11 and the second portion 12 have a function of generating electromotive force in the secondary battery 10. Note that as illustrated in FIGS. 2A and 2B, the positive electrode 111 is provided over the negative electrode 115 with the separator 103 provided therebetween. Without limitation to such a structure, the negative electrode 115 may be provided over the positive electrode 111 with the separator 103 provided therebetween.

In the third portion 13, the positive electrode 111 is folded so as to form the folded portion (the folded portion of the positive electrode 111 can also be referred to as a positive electrode tab), and the folded portion is connected to the positive electrode lead 121. The negative electrode 115 is also folded so as to form the folded portion (the folded portion of the negative electrode 115 can also be referred to as a negative electrode tab), and the folded portion is connected to the negative electrode lead 125. That is, the third portion 13 has a function of taking electromotive force generated in the first portion 11 and the second portion 12 out of the secondary battery 10.

Here, regions outside thin dotted lines representing the outer edges of the exterior bodies 107a to 107c, which are illustrated in FIGS. 1A and 1B, are bonding portions of the exterior bodies, and the exterior bodies 107a to 107c are attached to one another in the bonding portions. That is, the first exterior body 107a and the second exterior body 107b are attached to each other in the first portion 11, and the first exterior body 107a and the third exterior body 107c are attached to each other in the second portion 12. The second exterior body 107b is attached to the third exterior body 107c in the third portion 13.

As illustrated in FIG. 2A, in the third portion 13, the positive electrode lead 121 is interposed between the second exterior body 107b and the third exterior body 107c through the sealing layer 120. Similarly, the negative electrode lead 125 is interposed between the second exterior body 107b and the third exterior body 107c through the sealing layer 120.

The third portion 13 may be folded on the first portion 11 side or the second portion 12 side. As illustrated in FIG. 1A, $\theta_1$ represents an angle formed by the first portion 11 side and the third portion 13 side of the exterior body 107b, and $\theta_2$ represents an angle formed by the third portion 13 side and the second portion 12 side of the exterior body 107c. Note that the sum of $\theta_1$ and $\theta_2$ is preferably about 180°, and the angles of $\theta_1$ and $\theta_2$ can be set as appropriate within this range. For example, the first portion 11 and the third portion 13 may be in contact with each other in the exterior body 107b when $\theta_1$ is 0° and $\theta_2$ is 180°, or the second portion 12 and the third portion 13 may be in contact with each other in the exterior body 107c when $\theta_1$ is 180° and $\theta_2$ is 0°. Such a structure can prevent bulkiness of the third portion 13. Note that the secondary battery 10 with $\theta_1$ and $\theta_2$ each being 90° is illustrated in FIG. 1B and FIGS. 2A and 2B.

Figure 4A:
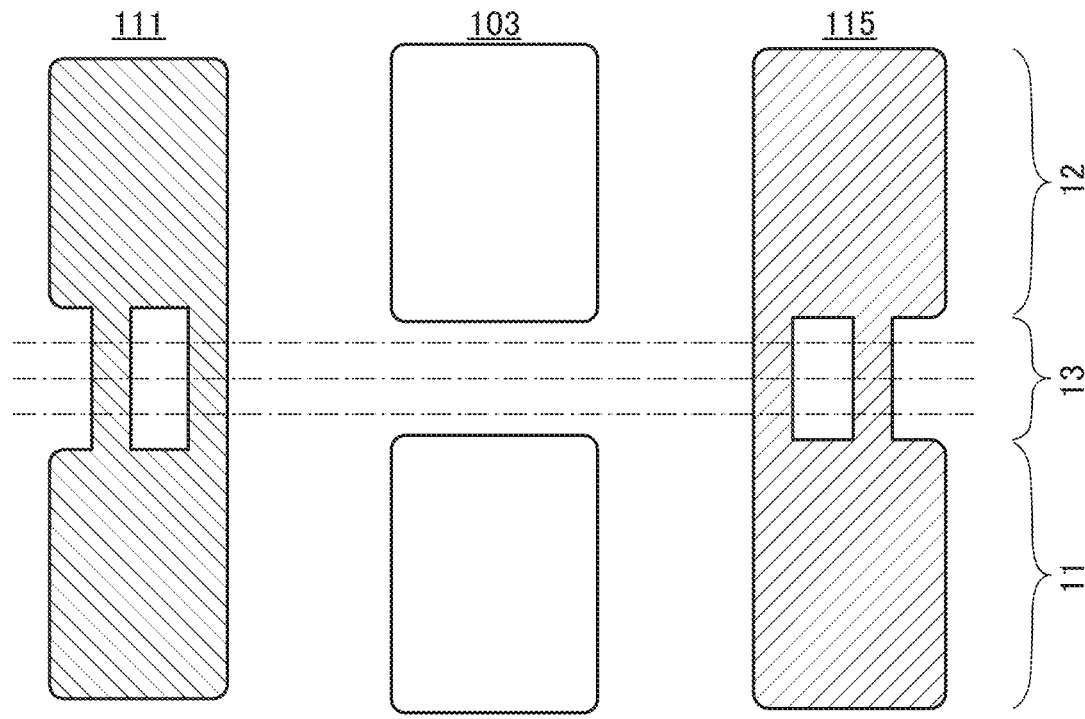
FIGS. 4A to 4C are top views illustrating structure examples of a secondary battery.

FIG. 4A is a top view of the positive electrode 111, the separator 103, and the negative electrode 115 included in the secondary battery 10. Note that the positive electrode 111 illustrated in FIG. 4A is in a state where the positive electrode tab has not been provided, and the positive electrode tab can be provided as illustrated in FIG. 2A by folding the third portion 13 along dashed dotted lines. Similarly, the negative electrode 115 illustrated in FIG. 4A is in a state where the negative electrode tab has not been provided, and the negative electrode tab can be provided as illustrated in FIG. 2B by folding the third portion 13 along dashed dotted lines.

Here, the positive electrode 111 preferably has a shape in which the first portion 11 and the second portion 12 are continuous through two or more places as illustrated in FIG. 4A. With such a shape, the first portion 11 and the second portion 12 of the positive electrode 111 can be prevented from being misaligned at the time of attaching the lead electrodes in manufacture of the secondary battery 10. Further, with such a shape, when the secondary battery 10 is expanded and contracted toward the second direction 22, the positive electrode 111 or the negative electrode 115 can be prevented from moving not parallel to the second direction 22 and thus can be prevented from being misaligned from the second direction 22. Note that as illustrated in FIG. 4A, the negative electrode 115 preferably has a shape in which the first portion 11 and the second portion 12 are continuous through two or more places, similar to the positive electrode 111.

Figures 4B, 4C:
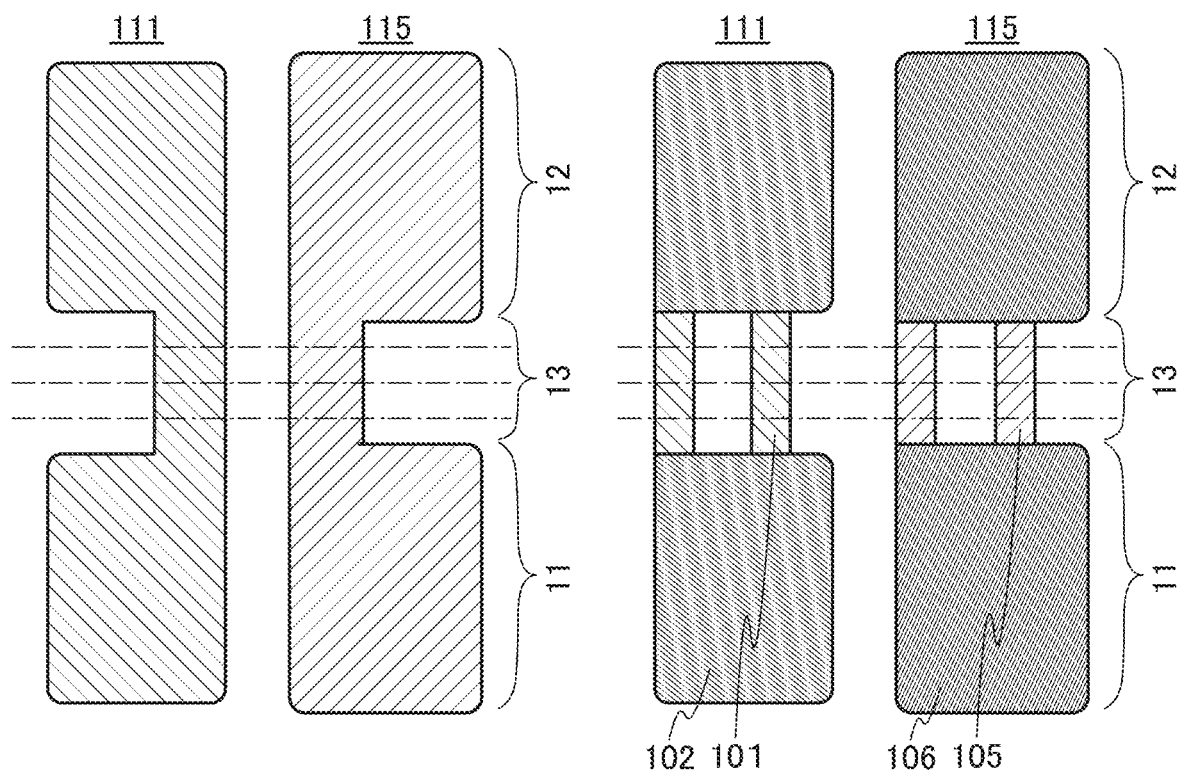

However, without limitation to such shapes, the positive electrode 111 and the negative electrode 115 can each have a shape in which the first portion 11 and the second portion 12 are continuous through one place, as illustrated in FIG. 4B. Note that it is necessary to provide a groove or an opening as appropriate in the positive electrode 111 and the negative electrode 115 such that the positive electrode tab and the negative electrode tab can be taken out in the third portion 13.

The separator 103 is preferably provided such that the edge is located outside the edge of either the positive electrode 111 or the negative electrode 115 in each of the first portion 11 and the second portion 12. Alternatively, the separator 103 may have a bag-like structure to wrap either the positive electrode 111 or the negative electrode 115 in each of the first portion 11 and the second portion 12. Examples of the bag-like structure include a structure in which two sides of one film which is folded into half are bonded and a structure in which three sides of two films are bonded. With such a structure, a short circuit between the positive electrode 111 and the negative electrode 115 can be prevented. The separator 103 may be provided in each of the first portion 11 and the second portion 12 because it does not need to be provided in the third portion 13 as illustrated in FIG. 4A. Note that without limitation to such a structure, the first portion 11 and the second portion 12 of the separator 103 may be continuous to have an integrated separator. In that case, it is necessary to provide a groove or an opening as appropriate in the separator 103 such that the positive electrode 111 or the negative electrode 115 can be taken out under the separator 103.

As illustrated in FIG. 3A, the positive electrode 111 includes the positive electrode current collector 101 and the positive electrode active material layer 102 containing a positive electrode active material. Similarly, the negative electrode 115 includes the negative electrode current collector 105 and the negative electrode active material layer 106 containing a negative electrode active material. Here, the positive electrode active material layer 102 and the negative electrode active material layer 106 are provided to face each other with the separator 103 provided therebetween.

Note that the positive electrode 111 is preferably provided such that the edge is located inside the edge of the negative electrode 115 in each of the first portion 11 and the second portion 12, as illustrated in FIG. 1B, FIG. 3A, and the like. For example, in the case where lithium or the like is contained in a positive electrode active material, lithium might be precipitated at the edge of the negative electrode 115 owing to movement of a lithium ion from the positive electrode active material layer 102 to the negative electrode active material layer 106 at the time of charging and discharging. With such a structure, precipitation of lithium at the edge of the negative electrode 115 can be inhibited.

As illustrated in FIG. 4C, in the positive electrode 111, the positive electrode active material layer 102 may be provided in portions corresponding to the first portion 11 and the second portion 12 over the positive electrode current collector 101. The positive electrode active material layer 102 is not necessarily provided in the portion corresponding to the third portion 13 over the positive electrode current collector 101, and the positive electrode current collector 101 is exposed in the portion corresponding to the third portion 13. Therefore, as illustrated in FIG. 3B, the positive electrode current collector 101 is connected to the positive electrode lead 121 in the third portion 13.

Similarly, as illustrated in FIG. 4C, in the negative electrode 115, the negative electrode active material layer 106 may be provided in portions corresponding to the first portion 11 and the second portion 12 over the negative electrode current collector 105. The negative electrode active material layer 106 is not necessarily provided in the portion corresponding to the third portion 13 over the negative electrode current collector 105, and the negative electrode current collector 105 is exposed in the portion corresponding to the third portion 13. Therefore, as illustrated in FIG. 3B, the negative electrode current collector 105 is connected to the negative electrode lead 125 in the third portion 13. Note that the positive electrode active material layer 102 and the negative electrode active material layer 106 can be made to face each other with such a planar structure as illustrated in FIG. 1B when the positive electrode 111 illustrated in FIG. 4C is turned over and overlapped with the negative electrode 115 illustrated in FIG. 4C.

In addition, as illustrated in FIGS. 2A and 2B and FIGS. 3A and 3B, the electrolyte solution 104 is included in the region wrapped with the exterior bodies 107a to 107c. Although regions between the positive electrode 111 or the negative electrode 115, and the exterior bodies 107a to 107c are filled with the electrolyte solution 104 in FIGS. 2A and 2B and FIGS. 3A and 3B, the structure of the present invention is not limited thereto. For example, the positive electrode 111 or the negative electrode 115 may be in contact with any of the exterior bodies 107a to 107c.

Since the secondary battery 10 has curved shapes in the first portion 11 and the second portion 12, the positive electrode 111, the negative electrode 115, and the separator 103 are also curved in the first portion 11 and the second portion 12. When the positive electrode 111, the negative electrode 115, the separator 103, and the like are curved, the positive electrode 111, the negative electrode 115, and the separator 103 are misaligned in the first direction 21 due to a difference between the inner diameter and the outer diameter because they are stacked. Such misalignment of the position does not occur at the center of the secondary battery 10 in the first direction 21, that is, in the third portion 13; however, the misalignment occurs more frequently at the edges of the secondary battery 10 in the first direction 21, that is, at the edges on the first portion 11 side and the second portion 12 side.

Here, in the secondary battery with a curved shape like the secondary battery 10, when a positive electrode lead and a negative electrode lead are each connected to the edge in the first direction 21, stress due to transformation of the secondary battery tends to concentrate on a positive electrode tab and a negative electrode tab. The positive electrode tab and the negative electrode tab have elongated shapes in each electrode and are thus likely to cause deterioration such as a crack or a breakage compared with the main portions of the electrodes. Thus, the positive electrode tab and the negative electrode tab might be cracked or broken when expansion and contraction of the secondary battery toward the second direction 22 are repeated.

However, the secondary battery 10 of one embodiment of the present invention is provided with the third portion 13 between the first portion 11 and the second portion 12. That is, the positive electrode tab and the negative electrode tab of the secondary battery 10 are provided at the center of the secondary battery 10 in the first direction 21. Hardly any positional misalignment occur in the positive electrode 111, the negative electrode 115, and the separator 103 at the center; therefore, stress due to transformation of the secondary battery 10 does not concentrate on the positive electrode tab and the negative electrode tab. Thus, it is possible to reduce the possibility of cracking or breaking the positive electrode tab and the negative electrode tab even when expansion and contraction of the secondary battery 10 toward the second direction 22 are repeated.

With such a structure, it is possible to provide the secondary battery 10 with a structure that can inhibit deterioration of the positive electrode 111 or the negative electrode 115, in particular, the positive electrode tab or the negative electrode tab. Accordingly, the secondary battery 10 can be highly reliable.

Note that although the lengths of the first portion 11 and the second portion 12 in the first direction 21 are substantially equal in FIGS. 1A and 1B and FIGS. 2A and 2B, the lengths are not necessarily equal in one embodiment of the present invention. For example, in the first direction 21, the length of the first portion 11 is preferably one-ninth or more and nine times or less and further preferably one-third or more and three times or less the length of the second portion 12. Similarly, in the second direction 22, the length of the first portion 11 is preferably one-ninth or more and nine times or less and further preferably one-third or more and three times as long as the length of the second portion 12. With such a structure, the third portion 13 having the positive electrode tab and the negative electrode tab can be provided in places where occurrence of positional misalignment due to the curved shape of the secondary battery 10 is relatively low. Thus, it is possible to provide the secondary battery 10 with a structure that can inhibit deterioration of the positive electrode 111 or the negative electrode 115, in particular, the positive electrode tab or the negative electrode tab.

In addition, although, as illustrated in FIG. 1B, the top shape of the secondary battery 10 in this embodiment is a substantially rectangular shape whose side parallel to the second direction 22 is a long side and whose side perpendicular thereto is a short side, one embodiment of the present invention is not limited to such a shape. For example, the top shape of the secondary battery 10 may have a substantially rectangular shape whose side perpendicular to the second direction 22 is a long side and whose side parallel thereto is a long side. For example, the top shape of the secondary battery 10 may have a substantially elliptical shape.

Materials that can be used for the positive electrode 111, the negative electrode 115, the separator 103, the electrolyte solution 104, and the exterior bodies 107a to 107c of the secondary battery 10 are described below.

[1. 2. Positive Electrode]

The positive electrode 111 includes the positive electrode current collector 101, the positive electrode active material layer 102 formed in contact with the positive electrode current collector 101, and the like.

The positive electrode current collector 101 can be formed using a material that has high conductivity and is not eluted with the potential of the positive electrode, such as a metal like stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The positive electrode current collector 101 can have a foil-like shape, a plate-like shape (a sheet-like shape), a net-like shape, a punching-metal shape, an expanded-metal shape, or the like as appropriate. The positive electrode current collector 101 preferably has a thickness greater than or equal to 5 µm and less than or equal to 30 µm. The surface of the positive electrode current collector 101 may be provided with an undercoat layer using graphite or the like.

The positive electrode active material layer 102 may further include, in addition to the positive electrode active material, a binder for increasing, adhesion of the positive electrode active material, a conductive additive for increasing the conductivity of the positive electrode active material layer 102, and the like.

Examples of the positive electrode active material that can be used for the positive electrode active material layer 102 include a composite oxide with an olivine crystal structure, a composite oxide with a layered rock-salt crystal structure, and a composite oxide with a spinel crystal structure. For example, a compound such as $LiFeO_2$, $LiCoO_2$, $LiNiO_2$, $LiMn_2O_4$, $V_2O_5$, $Cr_2O_5$, or $MnO_2$ can be used.

In particular, $LiCoO_2$ is preferable because it has high capacity and higher stability in the air and higher thermal stability than $LiNiO_2$, for example.

It is preferable to add a small amount of nickel to a lithium-containing material with a spinel crystal structure which contains manganese such as $LiMnO_4$ because characteristics of the secondary battery using such a material can be improved.

In addition, a lithium-manganese composite oxide that is represented by a composition formula $Li_aMn_bM_cO_d$ can be used as the positive electrode active material. Here, the element M is preferably silicon, phosphorus, or a metal element other than lithium and manganese, and further preferably nickel. Furthermore, it is preferable to satisfy the following at the time of discharging in the case where a whole particle of a lithium-manganese composite oxide is measured: $0<a/(b+c)<2$; $c>0$; and $0.26\leq(b+c)/d<0.5$. Note that the composition ratios of metal, silicon, phosphorus, and the like in the whole particle of a lithium-manganese composite oxide can be measured with, for example, an inductively coupled plasma mass spectrometer (ICP-MS). The composition ratio of oxygen in the whole particle of a lithium-manganese composite oxide can be measured by, for example, energy dispersive X-ray spectroscopy (EDX).

Alternatively, the composition ratio of oxygen in the whole particle of a lithium-manganese composite oxide can be measured by ICP-MS combined with fusion gas analysis and valence evaluation of X-ray absorption fine structure (XAFS) analysis. Note that the lithium-manganese composite oxide is an oxide containing at least lithium and manganese, and may contain at least one selected from chromium, cobalt, aluminum, nickel, iron, magnesium, molybdenum, zinc, indium, gallium, copper, titanium, niobium, silicon, phosphorus, and the like.

To achieve high capacity, the lithium-manganese composite oxide preferably includes a region where the surface portion and the middle portion are different in the crystal structure, the crystal orientation, or the oxygen content. In order that such a lithium-manganese composite oxide can be obtained, the composition formula is preferably $Li_aMn_bNi_cO_d$ satisfying the following: $1.6 \leq a \leq 1.848$; $0.19 \leq c/b \leq 0.935$; and $2.5 \leq d \leq 3$. Further, it is particularly preferable to use a lithium-manganese composite oxide represented by a composition formula $Li_{1.68}Mn_{0.8062}Ni_{0.318}O_3$. In this specification and the like, a lithium-manganese composite oxide represented by a composition formula $Li_{1.68}Mn_{0.8062}Ni_{0.318}O_3$ refers to that formed at a ratio (molar ratio) of the amounts of raw materials of $Li_2CO_3$: $MnCO_3$: $NiO=0.84:0.8062:0.318$. Although this lithium-manganese composite oxide is represented by a composition formula $Li_{1.68}Mn_{0.8062}Ni_{0.318}O_3$, the composition might be different.

Figure 5A:
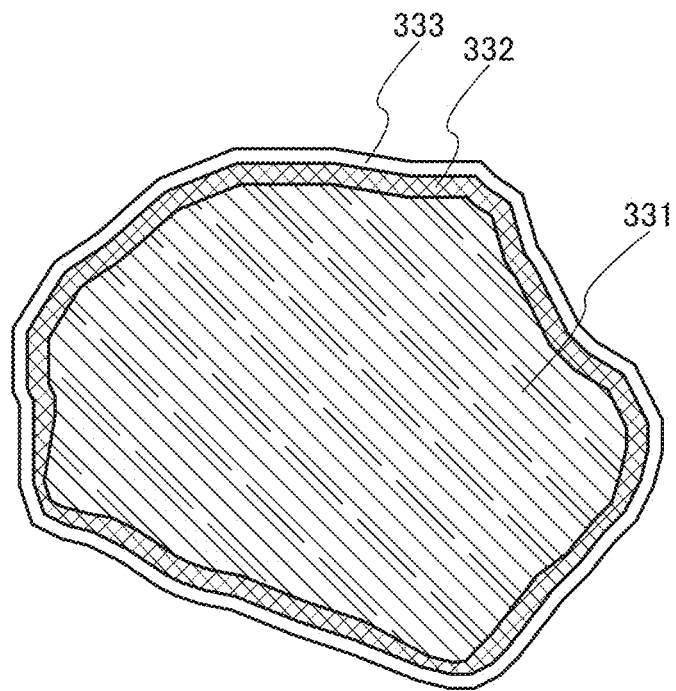
FIGS. 5A and 5B are cross-sectional views each illustrating a positive electrode active material which can be used in a secondary battery.
Figure 5B:
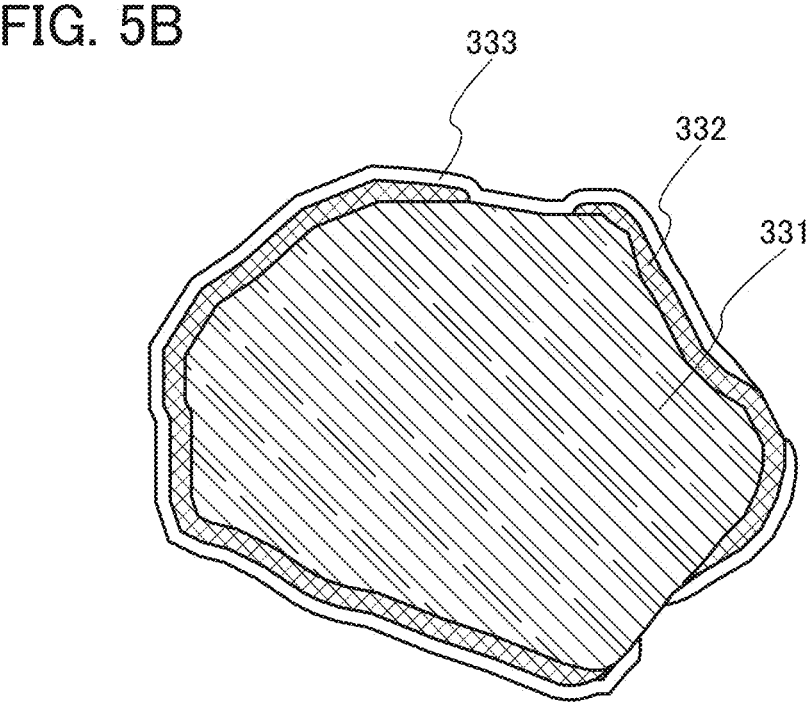

FIGS. 5A and 5B illustrate examples of a cross-sectional view of a particle of a lithium-manganese composite oxide having a region with a different crystal structure, crystal orientation, or oxygen content.

As illustrated in FIG. 5A, the lithium-manganese composite oxide having a region with different crystal structure, crystal orientation, or oxygen content preferably has a first region 331, a second region 332, and a third region 333. The second region 332 is in contact with at least part of the outside of the first region 331. Here, the term "outside" refers to the side closer to a surface of a particle. The third region 333 preferably includes a region corresponding to a surface of a particle containing the lithium manganese composite oxide.

As illustrated in FIG. 5B, the first region 331 may include a region not covered with the second region 332. The second region 332 may include a region not covered with the third region 333. For example, the first region 331 may include a region in contact with the third region 333. The first region 331 may include a region covered with neither the second region 332 nor the third region 333.

The second region 332 preferably has composition different from that of the first region 331.

For example, the case is described where the composition of the first region 331 and that of the second region 332 are separately measured and the first region 331 and the second region 332 each contain lithium, manganese, the element M, and oxygen; the atomic ratio of lithium to manganese, the element M, and oxygen in the first region 331 is represented by a1:b1:c1:d1; and the atomic ratio of lithium to manganese, the element M, and oxygen in the second region 332 is represented by a2:b2:c2:d2. Note that the composition of each of the first region 331 and the second region 332 can be measured by, for example, energy dispersive X-ray spectroscopy (EDX) using a transmission electron microscope (TEM). In measurement by EDX, the composition ratio of lithium is sometimes difficult to measure. Thus, a difference between the first region 331 and the second region 332 in composition ratios of elements other than lithium is described below Here, d1/(b1+c1) is preferably greater than or equal to 2.2, further preferably greater than or equal to 2.3, and still further preferably greater than or equal to 2.35 and less than or equal to 3. Furthermore, d2/(b2+c2) is preferably less than 2.2, further preferably less than 2.1, and still further preferably greater than or equal to 1.1 and less than or equal to 1.9. Also in this case, the composition of a whole particle of the lithium-manganese composite oxide including the first region 331 and the second region 332 preferably satisfies $0.26 \leq (b+c)/d < 0.5$ as described above.

The valence of manganese in the second region 332 may be different from that of manganese in the first region 331. The valence of the element M in the second region 332 may be different from that of the element M in the first region 331.

Specifically, the first region 331 is preferably a lithium-manganese composite oxide with a layered rock-salt crystal structure. The second region 332 is preferably a lithium-manganese composite oxide with a spinel crystal structure.

Here, in the case where the composition of the regions or valences of elements in the regions are spatially distributed, the composition or valences in a plurality of portions are obtained, the average values thereof are calculated, and the average values are regarded as the composition or valences of the regions, for example.

A transition layer may be provided between the second region 332 and the first region 331. Here, the transition layer is a region where composition is changed continuously or gradually, a region where a crystal structure is changed continuously or gradually, or a region where the lattice constant of a crystal is changed continuously or gradually. A mixed layer may be provided between the second region 332 and the first region 331. The mixed layer is a layer in which, for example, two or more crystals having different crystal orientations are mixed, two or more crystals having different crystal structures are mixed, or two or more crystals having different compositions are mixed.

The third region 333 preferably contains carbon or a metal compound. Examples of the metal include cobalt, aluminum, nickel, iron, manganese, titanium, zinc, and lithium. As an example of the metal compound, an oxide of the metal, a fluoride of the metal, or the like can be given.

It is particularly preferable that the third region 333 contain carbon. Since carbon has high conductivity, the particle coated with carbon in the electrode of the secondary battery can reduce the resistance of the electrode, for example. When the third region 333 contains carbon, the second region 332 in contact with the third region 333 can be oxidized. The third region 333 may contain graphene, graphene oxide, or graphene oxide subjected to reduction. Graphene and reduced graphene oxide have excellent electrical characteristics of high conductivity and excellent physical properties of high flexibility and high mechanical strength. Moreover, a particle of the lithium-manganese composite oxide can be coated efficiently.

When the third region 333 includes a carbon material such as graphene, the secondary battery using the lithium-manganese composite oxide as the positive electrode material can have improved cycle characteristics.

The thickness of a layer containing carbon is preferably greater than or equal to 0.4 nm and less than or equal to 40 nm.

Furthermore, the average size of primary particles of the lithium-manganese composite oxide is preferably greater than or equal to 5 nm and less than or equal to 50 μm and further preferably greater than or equal to 100 nm and less than or equal to 500 nm, for example. Furthermore, the specific surface area is preferably greater than or equal to 5 $m^2/g$ and less than or equal to 15 $m^2/g$. Furthermore, the average size of secondary particles is preferably greater than or equal to 5 μm and less than or equal to 50 μm. Note that the average particle sizes can be measured with a particle size distribution analyzer or the like using a laser diffraction and scattering method or by observation with a scanning electron microscope (SEM) or a TEM. The specific surface area can be measured by a gas adsorption method.

Alternatively, a complex material ($LiMPO_4$ (general formula) (M is one or more of Fe(II), Mn(II), Co(II), and Ni(II))) can be used as the positive electrode active material layer 102. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

$LiFePO_4$ is particularly preferable because it meets requirements with balance for a positive electrode active material, such as safety, stability, high capacity density, and the existence of lithium ions that can be extracted in initial oxidation (charging).

Alternatively, a complex material such as $Li_{(2-j)}MSiO_4$ (general formula) (M is one or more of Fe(II), Mn(II), Co(II), and Ni(II); 0≤j≤2) can be used as the positive electrode active material layer 102. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+l+u≤1, 0<r<1, 0s<1, 0<l<1, and 0<u<1).

Still alternatively, a nasicon compound expressed by $A_xM_2(XO_4)_3$ (general formula) (A=Li, Na, or Mg, M=Fe, Mn, Ti, V, or Nb, X=S, P, Mo, W, As, or Si) can be used for the positive electrode active material. Examples of the nasicon compound are $Fe_2(MnO_4)_3$, $Fe(SO_4)_3$, and $Li_3Fe_2(PO_4)_3$. Still further alternatively, compounds represented by a general formula, $Li_2MPO_4F$, $Li_2MP_2O_7$, and $Li_5MO_4$ (M=Fe or Mn), a perovskite fluoride such as $NaFeF_3$ and $FeF_3$, a metal chalcogenide (a sulfide, a selenide, and a telluride) such as $TiS_2$ and $MoS_2$, an oxide with an inverse spinel crystal structure such as $LiMVO_4$, a vanadium oxide based material (e.g., $V_2O_5$, $V_6O_{13}$, and $LiV_3O_8$), a manganese oxide based material, and an organic sulfur compound based material can be used as the positive electrode active material, for example.

In the case where carrier ions are alkali metal ions other than lithium ions or alkaline-earth metal ions, the positive electrode active material may contain, instead of lithium, an alkali metal (e.g., sodium or potassium) or an alkaline-earth metal (e.g., calcium, strontium, barium, beryllium, or magnesium). For example, the positive electrode active material may be a layered oxide containing sodium such as $NaFeO_2$ or $Na_{2/3}[Fe_{1/2}Mn_{1/2}]O_2$.

Further alternatively, any of the aforementioned materials may be combined to be used as the positive electrode active material. For example, a solid solution obtained by combining two or more of the above materials can be used as the positive electrode active material. For example, a solid solution of $LiCo_{1/3}Mn_{1/3}Ni_{1/3}O_2$ and $Li_2MnO_3$ can be used as the positive electrode active material.

Note that although not illustrated, a conductive material such as a carbon layer may be provided on a surface of the positive electrode active material layer 102. With the conductive material such as the carbon layer, conductivity of the electrode can be increased. For example, the positive electrode active material layer 102 can be coated with the carbon layer by mixing a carbohydrate such as glucose at the time of baking the positive electrode active material.

The average particle diameter of the primary particle of the positive electrode active material layer 102 is preferably greater than or equal to 50 nm and less than or equal to 100 μm.

Examples of the conductive additive include a carbon material, a metal material, and a conductive ceramic material. Alternatively, a fiber material may be used as the conductive additive. The content of the conductive additive in the active material layer is preferably greater than or equal to 1 wt % and less than or equal to 10 wt % and further preferably greater than or equal to 1 wt % and less than or equal to 5 wt %.

A network for electrical conduction can be formed in the electrode by the conductive additive. The conductive additive also allows maintaining of a path for electric conduction between the particles of the positive electrode active material. The addition of the conductive additive to the active material layer increases the electrical conductivity of the active material layer.

Examples of the conductive additive include natural graphite, artificial graphite such as mesocarbon microbeads, and carbon fiber. Examples of carbon fiber include mesophase pitch-based carbon fiber, isotropic pitch-based carbon fiber, carbon nanofiber, and carbon nanotube. Carbon nanotube can be formed by, for example, a vapor deposition method. Other examples of the conductive additive include carbon materials such as carbon black (e.g., acetylene black (AB)), graphite (black lead) particles, graphene, and fullerene. Alternatively metal powder or metal fibers of copper, nickel, aluminum, silver, gold, or the like, a conductive ceramic material, or the like can be used.

Flaky graphene has an excellent electrical characteristic of high conductivity and excellent physical properties of high flexibility and high mechanical strength. Thus, the use of graphene as the conductive additive can increase contact points and the contact area of active materials.

Note that graphene in this specification includes single-layer graphene and multilayer graphene including two to hundred layers. Single-layer graphene refers to a one-atom-thick sheet of carbon molecules having π bonds. Graphene oxide refers to a compound formed by oxidation of such graphene. When graphene oxide is reduced to form graphene, oxygen contained in the graphene oxide is not entirely released and part of the oxygen remains in the graphene. In the case where graphene contains oxygen, the proportion of oxygen in the graphene measured by XPS is higher than or equal to 2 atomic % and lower than or equal to 11 atomic %, preferably higher than or equal to 3 atomic % and lower than or equal to 10 atomic %.

Graphene is capable of making low-resistance surface contact and has extremely high conductivity even with a small thickness. Therefore, even a small amount of graphene can efficiently form a conductive path in an active material layer.

In the case where an active material with a small average particle size (e.g., 1 μm or less) is used, the specific surface area of the active material is large and thus more conductive paths for the active material particles are needed. In such a case, it is particularly preferable to use graphene with extremely high conductivity that can efficiently form a conductive path even in a small amount.

A cross-sectional structure example of a positive electrode active material layer containing graphene as a conductive additive is described below. Note that a negative electrode active material layer may contain graphene as a conductive additive.

Figure 6:
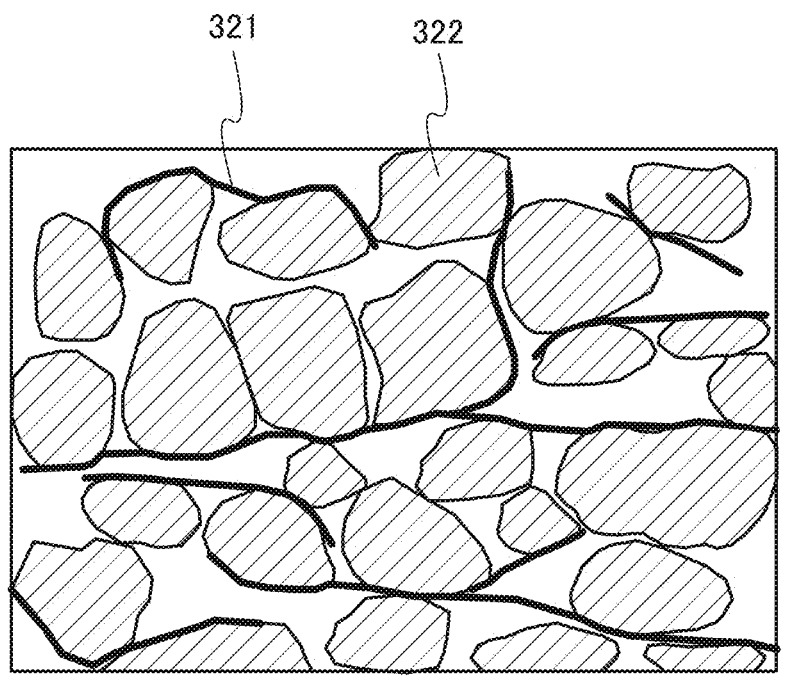
FIG. 6 is a cross-sectional view illustrating a conductive additive and the like which can be used in a secondary battery.

FIG. 6 illustrates a longitudinal sectional view of the positive electrode active material layer 102. The positive electrode active material layer 102 includes positive electrode active material particles 322, graphene flakes 321 as a conductive additive, and a binder (not illustrated).

The longitudinal section of the positive electrode active material layer 102 of FIG. 6 shows substantially uniform dispersion of the graphene flakes 321 in the positive electrode active material layer 102. The graphene flakes 321 are schematically shown by thick lines in FIG. 6 but are actually thin films each having a thickness corresponding to the thickness of a single layer or a multi-layer of carbon molecules. The plurality of graphene flakes 321 are formed in such a way as to wrap, coat, or adhere to the surfaces of the plurality of positive electrode active material particles 322, so that the graphene flakes 321 make surface contact with the positive electrode active material particles 322. Furthermore, the graphene flakes 321 are also in surface contact with each other; consequently, the plurality of graphene flakes 321 form a three-dimensional network for electric conduction.

This is because graphene oxide with extremely high dispersibility in a polar solvent is used for the formation of the graphene flakes 321. The dispersion medium is removed by volatilization from a suspension in which graphene oxide is uniformly dispersed, and the graphene oxide is reduced to graphene; hence, the graphene flakes 321 remaining in the positive electrode active material layer 102 partly overlap with each other and are dispersed such that surface contact is made, thereby forming an electrical conduction path. Then, graphene oxide is preferably reduced by heat treatment or with the use of a reducing agent, for example.

Unlike a conventional conductive additive in the form of particles, such as acetylene black, which makes point contact with an active material, the graphene flake 321 is capable of making low-resistance surface contact; accordingly, the electrical conduction between the positive electrode active material particles 322 and the graphene flakes 321 can be improved without an increase in the amount of a conductive additive. Thus, the proportion of the positive electrode active material particles 322 in the positive electrode active material layer 102 can be increased. Accordingly, the discharge capacity of a secondary battery can be increased.

Graphene flakes are bonded to each other to form net-like graphene (hereinafter referred to as a graphene net). The graphene net covering the active material can function as a binder for binding particles. The amount of a binder can thus be reduced, or the binder does not have to be used. This can increase the proportion of the active material in the electrode volume or weight. That is to say, the capacity of the secondary battery can be increased.

Various methods can be used for forming an electrode which is used for the secondary battery of one embodiment of the present invention. For example, in the case where an active material layer is formed over a current collector by a coating method, the active material, the binder, the conductive additive, and the dispersion medium (also referred to as a solvent) are mixed to form a paste, the paste is applied to the current collector, and the dispersion medium is vaporized. After that, the active material layer may be pressed by a compression method such as a roll press method or a flat plate press method so as to be consolidated if necessary.

As the dispersion medium, water, a polar organic solvent such as N-methylpyrrolidone (NMP) or dimethylformamide can be used, for example. Water is preferably used in terms of the safety and cost.

It is preferable for the binder to include, for example, water-soluble polymers. As the water-soluble polymers, a polysaccharide or the like can be used, for example. As the polysaccharide, a cellulose derivative such as carboxymethyl cellulose (CMC), methyl cellulose, ethyl cellulose, hydroxypropyl cellulose, diacetyl cellulose, or regenerated cellulose, starch, or the like can be used.

As the binder, a rubber material such as styrene-butadiene rubber (SBR), styrene-isoprene-styrene rubber, acrylonitrile-butadiene rubber, butadiene rubber, fluorine rubber, or ethylene-propylene-diene copolymer is preferably used. Any of these rubber materials is further preferably used in combination with the aforementioned water-soluble polymers.

Alternatively, as the binder, a material such as polystyrene, poly(methyl acrylate), poly(methyl methacrylate) (PMMA), sodium polyacrylate, polyvinyl alcohol (PVA), polyethylene oxide (PEO), polypropylene oxide, polyimide, polyvinyl chloride, polytetrafluoroethylene, polyethylene, polypropylene, isobutylene, polyethylene terephthalate, nylon, polyvinylidene fluoride (PVH), polyacrylonitrile (PAN), polyvinyl chloride, ethylene-propylene-diene polymer, polyvinyl acetate, polymethyl methacrylate, or nitrocellulose is preferably used.

Two or more of e above materials may be used in combination for the binder.

The content of the binder in the positive electrode active material layer 102 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive in the positive electrode active material layer 102 is preferably greater than or equal to 1 wt % and less than or equal to 10 wt % and further preferably greater than or equal to 1 wt % and less than or equal to 5 wt %.

In the case where the positive electrode active material layer 102 is formed by a coating method, the positive electrode active material, the binder, and the conductive additive are mixed to form a positive electrode paste (slurry), and the positive electrode paste is applied to the positive electrode current collector 101 and dried.

[1.3. Negative Electrode]

The negative electrode 115 includes, for example, the negative electrode current collector 105 and the negative electrode active material layer 106 formed on the negative electrode current collector 105.

The negative electrode current collector 105 can be formed using a material that has high conductivity and is not alloyed with a carrier ion of lithium or the like, such as a metal like stainless steel, gold, platinum, iron, copper, titanium, or an alloy thereof. Alternatively, an aluminum alloy to which an element which improves heat resistance, such as silicon, titanium, neodymium, scandium, or molybdenum, is added can be used. The negative electrode current collector 105 can have a foil-like shape, a plate-like shape (sheet-like shape), a net-like shape, a punching-metal shape, an expanded-metal shape, or the like as appropriate. The negative electrode current collector 105 preferably has a thickness greater than or equal to 5 µm and less than or equal to 30 μm. The surface of the negative electrode current collector 105 may be provided with an undercoat layer using graphite or the like.

The negative electrode active material layer 106 may further include, in addition to the negative electrode active material, a binder for increasing adhesion of the negative electrode active material, a conductive additive for increasing the conductivity of the negative electrode active material layer 106, and the like. For the materials of the binder and the conductive additive which are used for the negative electrode active material layer, the materials of the binder and the conductive additive which are used for the positive electrode active material layer are referred to.

A material with which lithium can be dissolved and precipitated or a material which can reversibly react with lithium ions can be used for a negative electrode active material; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, and pitch-based artificial graphite, and natural graphite such as spherical natural graphite.

Graphite has a low potential substantially equal to that of a lithium metal (0.1 V to 0.3 V vs. Li/Li$^+$) when lithium ions are intercalated into the graphite (while a lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, other than the above carbon materials, an alloy-based material which enables charge-discharge reaction by alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, and the like can be used as the alloy-based material. Such elements have higher capacity than carbon. In particular, silicon has a significantly high theoretical capacity of 4200 mAh/g. For this reason, silicon is preferably used as the negative electrode active material. Examples of an alloy-based material including such elements are $Mg_2Si$, $Mg_2Ge$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as a positive electrode active material because of its high potential.

In the case where the negative electrode active material layer 106 is formed by a coating method, the negative electrode active material and the binder are mixed to form a negative electrode paste (slurry), and the negative electrode paste is applied to the negative electrode current collector 105 and dried.

Graphene may be formed on a surface of the negative electrode active material layer 106. In the case of using silicon as the negative electrode active material, the volume of silicon is greatly changed due to occlusion and release of carrier ions in charge-discharge cycles. Therefore, adhesion between the negative electrode current collector 105 and the negative electrode active material layer 106 is decreased, resulting in degradation of battery characteristics caused by charge and discharge. Thus, graphene is preferably formed on a surface of the negative electrode active material layer 106 containing silicon because even when the volume of silicon is changed in charge-discharge cycles, decrease in the adhesion between the negative electrode current collector 105 and the negative electrode active material layer 106 can be inhibited, which makes it possible to reduce degradation of battery characteristics.

Alternatively, a coating film of an oxide or the like may be formed on the surface of the negative electrode active material layer 106. A coating film formed by decomposition or the like of an electrolyte solution or the like in charging cannot release electric charges used at the formation, and therefore forms irreversible capacity. In contrast, the film of an oxide or the like provided on the surface of the negative electrode active material layer 106 in advance can reduce or prevent generation of irreversible capacity.

As the coating film coating the negative electrode active material layer 106, an oxide film of any one of niobium, titanium, vanadium, tantalum, tungsten, zirconium, molybdenum, hafnium, chromium, aluminum, and silicon or an oxide film containing any one of these elements and lithium can be used. Such a film is much denser than a conventional film formed on a surface of a negative electrode due to a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions. Alternatively, silicon oxide or aluminum oxide may be used.

A sol-gel method can be used to coat the negative electrode active material layer 106 with the coating film, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In such a manner, the coating film can be formed on the surface of the negative electrode active material layer 106. A decrease in the capacity of the secondary battery can be prevented by using the coating film.

[1.4. Separator]

As a material of the separator 103, a porous insulator such as cellulose, polypropylene (PP), polyethylene (PE), polybutene, nylon, polyester, polysulfone, polyacrylonitrile, polyvinylidene fluoride, or tetrafluoroethylene can be used. Alternatively, nonwoven fabric of a glass fiber or the like, or a diaphragm in which a glass fiber and a polymer fiber are mixed may be used.

[1.5. Electrolyte Solution]

As a solvent for the electrolyte solution 104 used in the secondary battery 10, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent for the electrolyte solution, safety against liquid leakage is improved. Further, a secondary battery can be thinner and more lightweight. Typical examples of gelled high-molecular material include a silicone gel, an acrylic gel, an acrylonitrile gel, a polyethylene oxide-based gel, a polypropylene oxide-based gel, a fluorine-based polymer gel, and the like.

Alternatively, the use of one or more ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

In the case of using lithium ions as carriers, as an electrolyte dissolved in the above-described solvent, one of lithium salts such as $LiPF_6$, $LiClO_4$, $LiAsF_6$, $LiBF_4$, $LiAlCl_4$, $LiSCN$, $LiBr$, $LiI$, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

The electrolyte solution used for the secondary battery preferably contains a small amount of dust particles and elements other than the constituent elements of the electrolyte solution (hereinafter, also simply referred to as impurities so as to be highly purified. Specifically, the weight ratio of impurities to the electrolyte solution is less than or equal to 1%, preferably less than or equal to 0.1% and further preferably less than or equal to 0.01%. An additive agent such as vinylene carbonate may be added to the electrolyte solution.

[1.6. Exterior Body]

There are a variety of structures of a secondary battery, and a film is used for formation of the exterior bodies 107a to 107c in this embodiment. Note that the film used for the exterior bodies 107a to 107c is a single-layer film selected from a metal film (e.g., an aluminum film, a stainless steel film, and a nickel steel film), a plastic film made of an organic material, a hybrid material film including an organic material (e.g., an organic resin or fiber) and an inorganic material (e.g., ceramic), and a carbon-containing inorganic film (e.g., a carbon film or a graphite film); or a stacked-layer film including two or more of the above films. Forming a depression or a projection on a surface of a metal film by embossing increases the surface area of the exterior bodies 107a to 107c exposed to outside air, achieving efficient heat dissipations.

In the case where the secondary battery 10 is changed in form by externally applying force, bending stress is externally applied to the exterior bodies 107a to 107c of the secondary battery 10. This might partly deform or damage the exterior bodies 107a to 107c. Projections or depressions formed on the exterior bodies 107a to 107c can relieve a strain caused by stress applied to the exterior bodies 107a to 107c. Therefore, the secondary battery 10 can be highly reliable. Note that a "strain" is the scale of change in form indicating the displacement of a point of an object relative to the reference (initial) length of the object. The depression or the projection formed on the surfaces of the exterior bodies 107a to 107c can reduce the influence of a strain caused by application of external force to the secondary battery to an acceptable level. Thus, a highly reliable secondary battery can be provided.

2. Modification Example 1

Figure 7A:
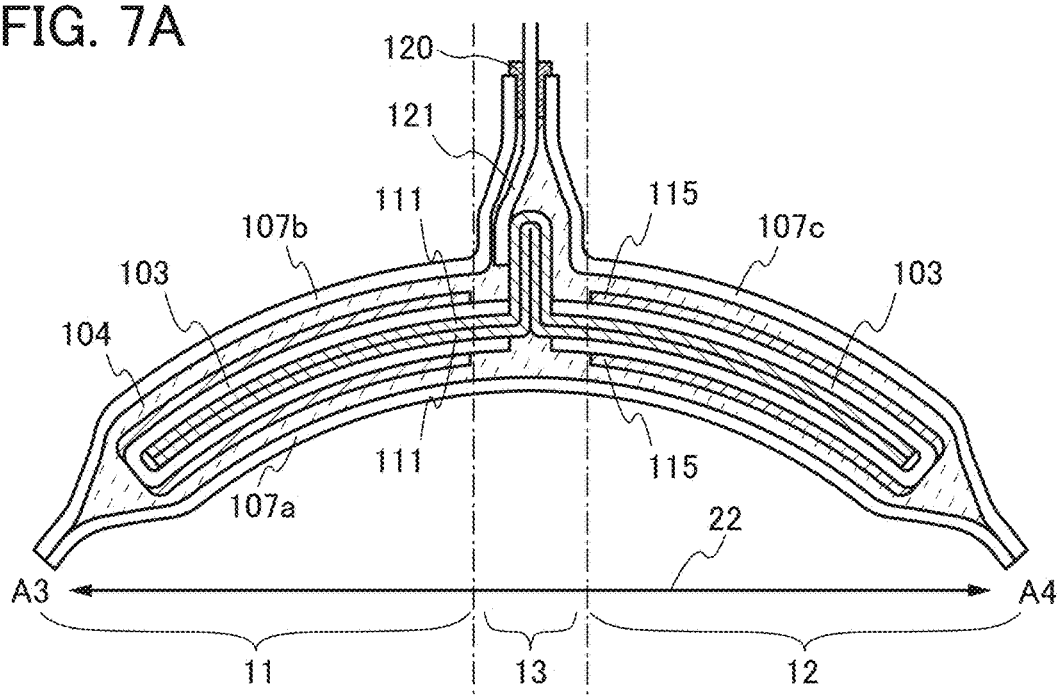
FIGS. 7A to 7C are cross-sectional views illustrating a structure example of a secondary battery.
Figure 7B:
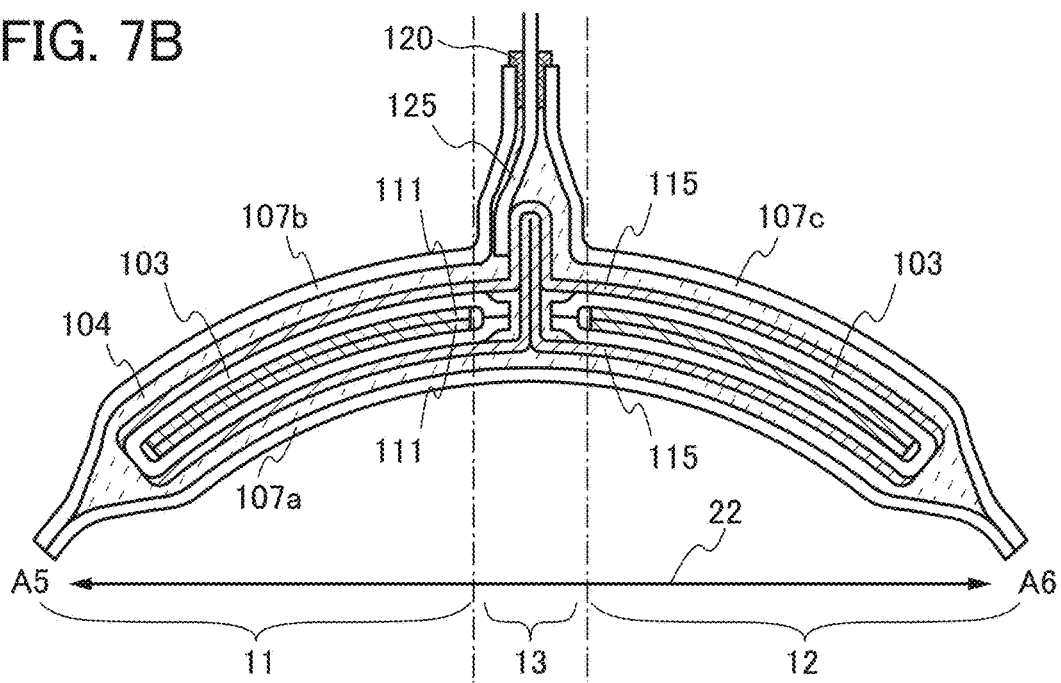
Figure 7C:
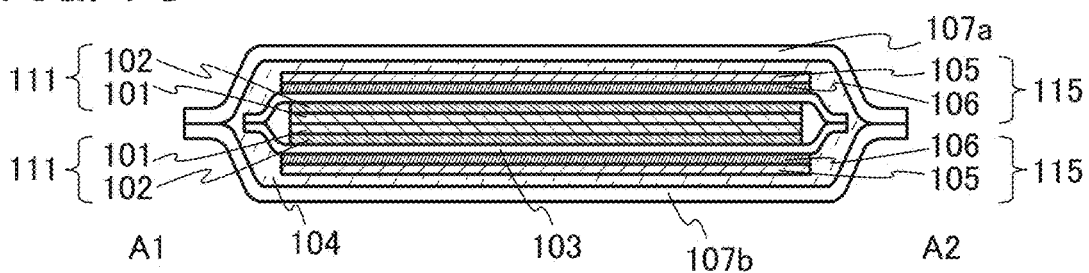

Although FIGS. 1A and 1B and FIGS. 2A and 2B illustrate the secondary battery 10 in which the positive electrode 111 and the negative electrode 115 each have a single-layer structure, one embodiment of the present invention is not limited to such a structure. For example, in the secondary battery 10, the positive electrode 111 and the negative electrode 115 each may have a stacked-layer structure. FIGS. 7A to 7C illustrate the secondary battery 10 in which the positive electrode 111 and the negative electrode 115 each have a two-layer structure. Note that FIG. 7A is a cross-sectional view taken along the dashed-dotted line A3-A4 in FIG. 1B, FIG. 7B is a cross-sectional view taken along the dashed-dotted line A5-A6 in FIG. 1B, and FIG. 7C is a cross-sectional view taken along the dashed-dotted line A1-A2 in FIG. 1B.

The secondary battery 10 illustrated in FIGS. 7A to 7C includes the negative electrode 115, the positive electrode 111, the positive electrode 111, and the negative electrode 115 in this order on the exterior body 107a side, and the separator 103 is provided between the negative electrodes 115 and the positive electrodes 111. Further, as illustrated in FIG. 7C, in the positive electrode 111, the positive electrode active material layer 102 is formed on each surface of the positive electrode current collector 101, and in the negative electrode 115, the negative electrode active material layer 106 is formed on each surface of the negative electrode current collector 105. The positive electrode active material layer 102 and the negative electrode active material layer 106 face each other with the separator 103 provided therebetween. Note that in the secondary battery 10 illustrated in FIGS. 7A to 7C, the separator 103 has a bag-like structure to wrap a pair of positive electrodes 111. Needless to say, the separator 103 may be provided with a bag-like structure to wrap one positive electrode 111.

In this manner, the capacity of the secondary battery 10 per unit area can be increased by stacking the plurality of positive electrodes 111 and the plurality of negative electrodes 115.

As illustrated in FIGS. 7A and 7B, the plurality of positive electrodes 111 are fixed to the positive electrode lead 121 in the third portion 13, and the plurality of negative electrodes 115 are fixed to the negative electrode lead 125 in the third portion 13.

As described above, in the secondary battery with a curved shape like the secondary battery 10, when the positive electrode lead and the negative electrode lead are each connected to the edge in the first direction 21, stress due to transformation of the secondary battery tends to concentrate on the positive electrode tab and the negative electrode tab. Particularly when a plurality of positive electrodes and a plurality of negative electrodes are stacked and a plurality of electrode tabs are collectively fixed to a lead electrode, stress due to transformation of a secondary battery tends to concentrate on the positive electrode tab and the negative electrode tab. Thus, the positive electrode tab and the negative electrode tab are more likely to be cracked or broken when expansion and contraction of the secondary battery toward the second direction 22 are repeated.

However, in the secondary battery 10 illustrated in FIGS. 7A to 7C, a plurality of positive electrode tabs and a plurality of negative electrode tabs are provided in the third portion 13 (at the center of the secondary battery 10 in the first direction 21), Hardly any positional misalignment occur in the positive electrode 111, the negative electrode 115, and the separator 103 at the center; therefore, stress due to transformation of the secondary battery 10 does not concentrate on the positive electrode tab and the negative electrode tab. Thus, it is possible to reduce the possibility of cracking or breaking the positive electrode tab and the negative electrode tab even when expansion and contraction of the secondary battery 10 toward the second direction 22 are repeated.

With such a structure, it is possible to provide the secondary battery 10 with a structure that can inhibit deterioration of the positive electrode 111 or the negative electrode 115, in particular, the positive electrode tab or the negative electrode tab. Accordingly, the secondary battery 10 can be highly reliable.

Figure 8A:
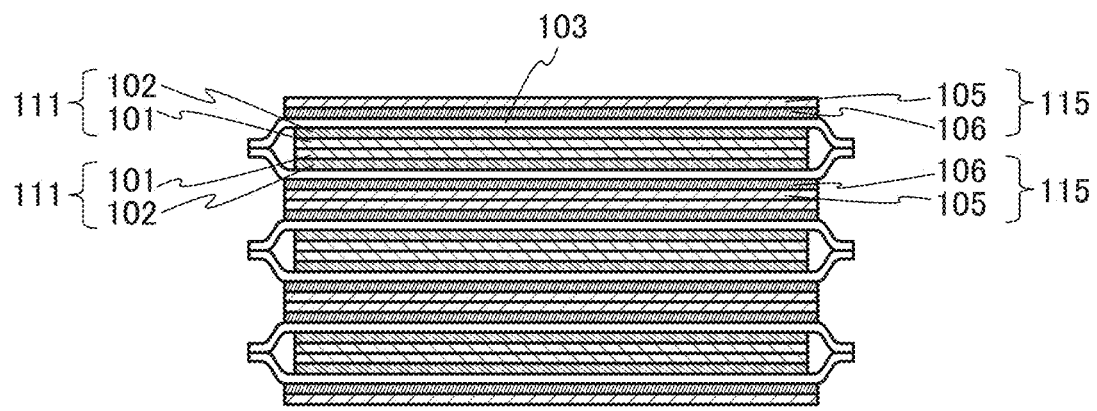
FIGS. 8A to 8C are cross-sectional views illustrating structure examples of a secondary battery.

Moreover, although the two positive electrodes 111 and the two negative electrodes 115 are stacked in the secondary battery 10 illustrated in FIGS. 7A to 7C, needless to say, three or more layers of the positive electrodes 111 and the negative electrodes 115 may be stacked. FIG. 8A illustrates an example in which six layers of the positive electrodes 111 and six layers of the negative electrodes 115 are stacked in the same order as that in FIG. 7C.

In the structure illustrated in FIG. 8A, the positive electrodes 111 and the negative electrodes 115 are stacked so that surfaces of the positive electrodes 111 on each of which the positive electrode active material layer 102 is not provided are in contact with each other and that surfaces of the negative electrodes 115 on each of which the negative electrode active material layer 106 is not provided are in contact with each other. This stacking order makes a contact surface between metals such as a contact surface between surfaces of the positive electrodes 111 on each of which the positive electrode active material layer 102 is not provided and a contact surface between surfaces of the negative electrodes 115 on each of which the negative electrode active material layer 106 is not provided. The contact surface between metals has a lower coefficient of friction than a contact surface between the active material layer and the separator.

The surfaces of the positive electrodes 111 on each of which the positive electrode active material layer 102 is not provided and the surfaces of the negative electrodes 115 on each of which the negative electrode active material layer 106 is not provided slide on each other when the secondary battery 10 is curved, so that stress due to the difference between the inner diameter and the outer diameter of a curved portion can be reduced. Therefore, the deterioration of the secondary battery 10 can be inhibited. Accordingly, the secondary battery 10 can be highly reliable.

Figure 8B:
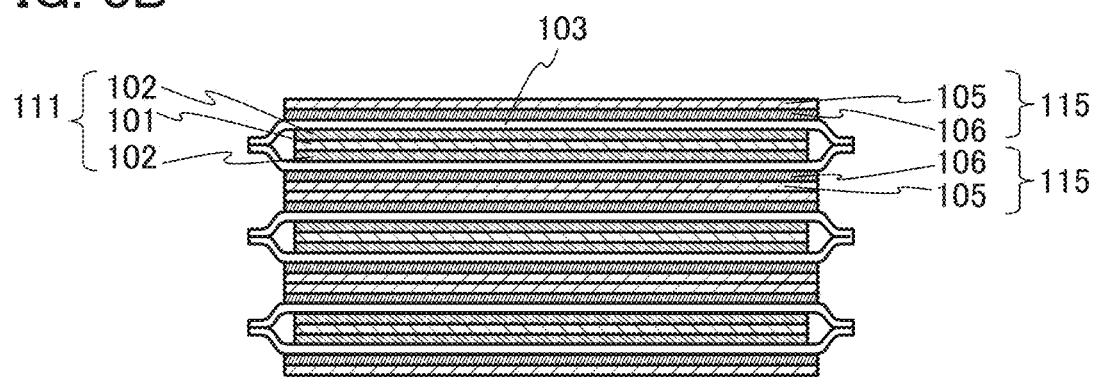

FIG. 8B illustrates an example of a stacked-layer structure of the positive electrodes 111 and the negative electrodes 115 which is different from that in FIG. 8A. The structure illustrated in FIG. 8B is different from that in FIG. 8A in that the positive electrode active material layer 102 is provided on both surfaces of the positive electrode current collector 101. When the positive electrode active material layer 102 is provided on the both surfaces of the positive electrode current collector 101 as illustrated in FIG. 8B, capacity of the secondary battery 10 per unit volume can be increased.

Figure 8C:
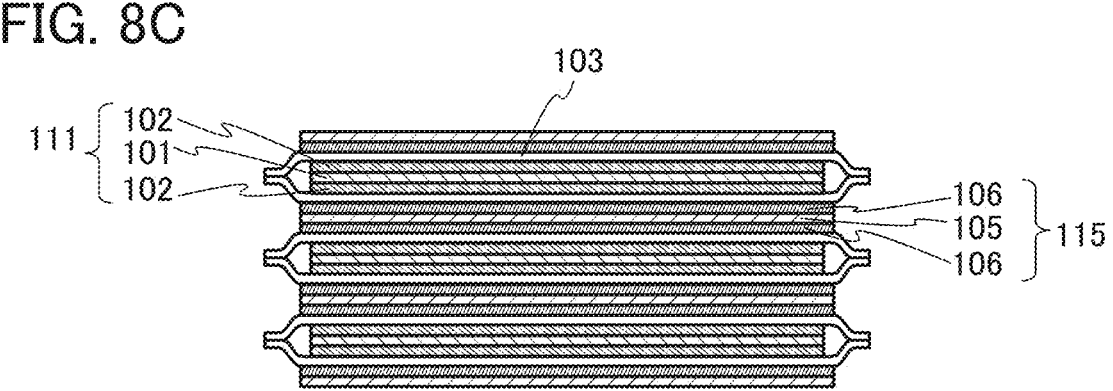

FIG. 8C illustrates an example of a stacked-layer structure of the positive electrodes 111 and the negative electrodes 115 which is different from that in FIG. 8B. The structure illustrated in FIG. 8C is different from that in FIG. 8B in that the negative electrode active material layer 106 is provided on both surfaces of the negative electrode current collector 105. When the negative electrode active material layer 106 is provided on the both surfaces of the negative electrode current collector 105 as illustrated in FIG. 8C, capacity of the secondary battery 10 per unit volume can be further increased.

Figure 9A:
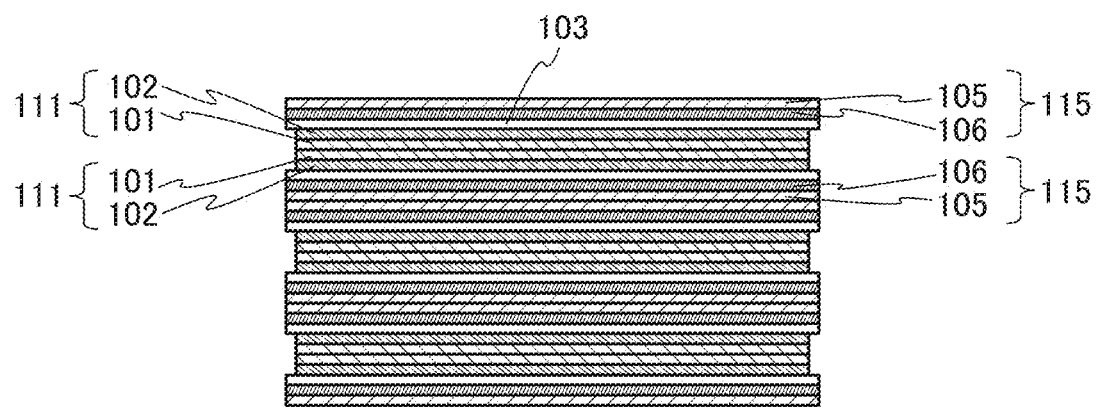
FIGS. 9A and 9B are cross-sectional views illustrating structure examples of a secondary battery.

Although FIGS. 7A to 7C and FIGS. 8A to 8C illustrate the bag-like separator 103 which wraps the positive electrodes 111, one embodiment of the present invention is not limited to such a structure. FIG. 9A illustrates an example in which the separator 103 has a different structure from that in FIG. 8A. The structure illustrated in FIG. 9A is different from that in FIG. 8A in that the separator 103, which is sheet-like, is provided between every pair of the positive electrode active material layer 102 and the negative electrode active material layer 106. In the structure illustrated in FIG. 9A, six layers of the positive electrodes 111 and six layers of the negative electrodes 115 are stacked and six layers of the separators 103 are provided.

Figure 9B:
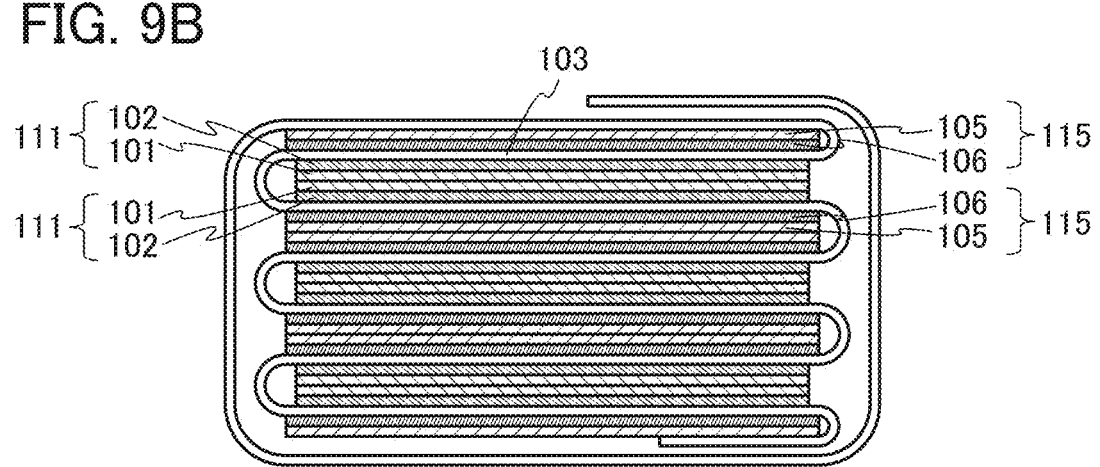

FIG. 9B illustrates an example in which the separator 103 different from that in FIG. 9A is provided. The structure illustrated in FIG. 9B is different from that in FIG. 9A in that one sheet of separator 103 is folded plural times to be interposed between every pair of the positive electrode active material layer 102 and the negative electrode active material layer 106. It can be said that the structure illustrated in FIG. 9B is a structure in which the separators 103 in the respective layers which are illustrated in FIG. 9A are extended and connected together between the layers. In the structure illustrated in FIG. 9B, six layers of the positive electrodes 111 and six layers of the negative electrodes 115 are stacked and the separator 103 is folded five times or more. The separator 103 is not necessarily provided so as to be interposed between every pair of the positive electrode active material layer 102 and the negative electrode active material layer 106, and the plurality of positive electrodes 111 and the plurality of negative electrodes 115 may be bound together by extending the separator 103.

Note that the secondary battery 10 illustrated in FIGS. 7A to 7C, FIGS. 8A to 8C, and FIGS. 9A and 9B are similar to that in FIGS. 1A and 1B and FIGS. 2A and 2B except that the plurality of positive electrodes 111 and the plurality of negative electrodes 115 are stacked, and the above description can be referred to for the detail.

3. Modification Example 2

Figure 10A:
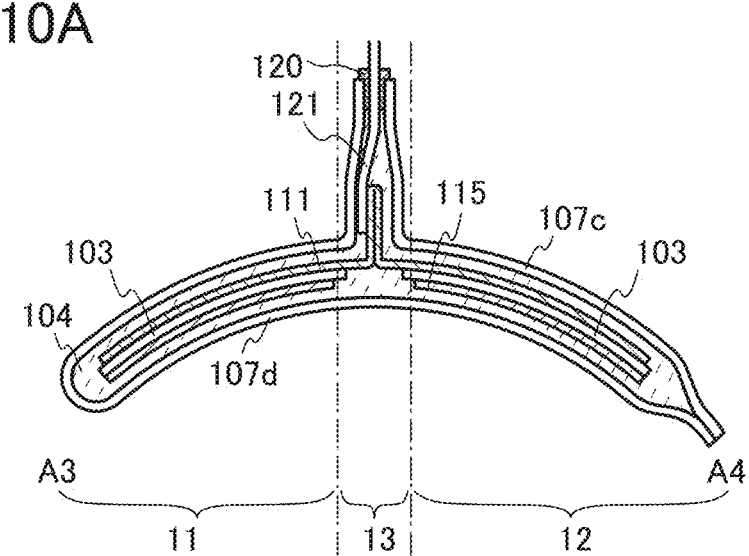
FIGS. 10A to 10C are cross-sectional views illustrating structure examples of a secondary battery.
Figure 10B:
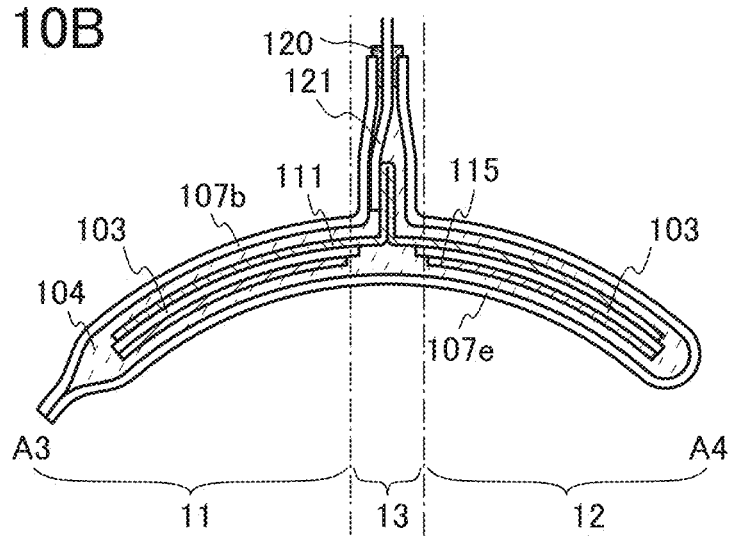
Figure 10C:
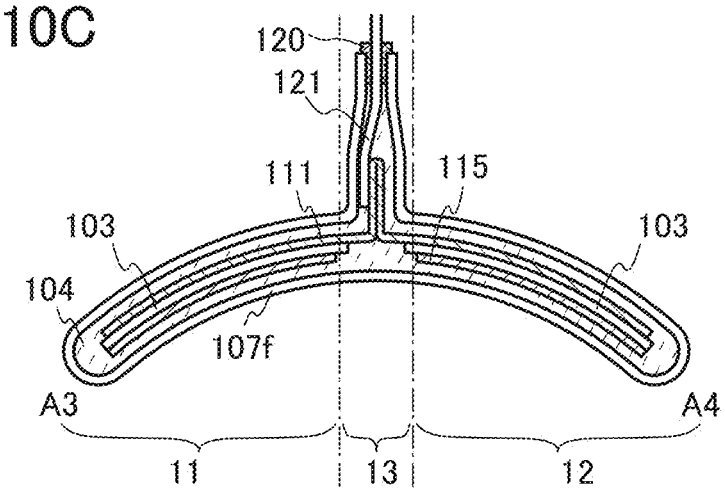

Although FIGS. 1A and 1B and FIGS. 2A and 2B illustrate the structure in which the positive electrode 111, the negative electrode 115, and the separator 103 are wrapped with three sheets of exterior bodies 107a to 107c, one embodiment of the present invention is not limited to such a structure. For example, as illustrated in FIGS. 10A to 10C, the secondary battery 10 may include the two or less sheets of exterior bodies. Note that FIGS. 10A to 10C are each a cross-sectional view taken along the dashed-dotted line A3-A4 in FIG. 1B.

The secondary battery 10 illustrated in FIG. 10A is different from that in FIGS. 1A and 1B and FIGS. 2A and 2B in that an exterior body 107d is provided instead of the exterior bodies 107a and 107b. The exterior body 107d is obtained by integrating the exterior bodies 107a and 107b and is folded at a portion corresponding to the bonding portion of the exterior bodies 107a and 107b.

The secondary battery 10 illustrated in FIG. 10A is different from that in FIGS. 1A and 1B and FIGS. 2A and 2B in that an exterior body 107d is provided instead of the exterior bodies 107a and 107c. The exterior body 107d is obtained by integrating the exterior bodies 107a and 107c and is folded at a portion corresponding to the bonding portion of the exterior bodies 107a and 107c.

The secondary battery 10 illustrated in FIG. 10C is different from that in FIGS. 1A and 1B and FIGS. 2A and 2B in that an exterior body 107f is provided instead of the exterior bodies 107a to 107c. The exterior body 107f is obtained by integrating the exterior bodies 107a to 107c and is folded at the portion corresponding to the bonding portion of the exterior bodies 107a and 107b and the portion corresponding to the bonding portion of the exterior bodies 107a and 107c.

Note that the secondary batteries 10 illustrated in FIGS. 10A to 10C are similar to that in FIGS. 1A and 1B and FIGS. 2A and 2B except for the structure of the exterior bodies and the above description can be referred to for the detail.

4. Modification Example 3

Figure 11A:
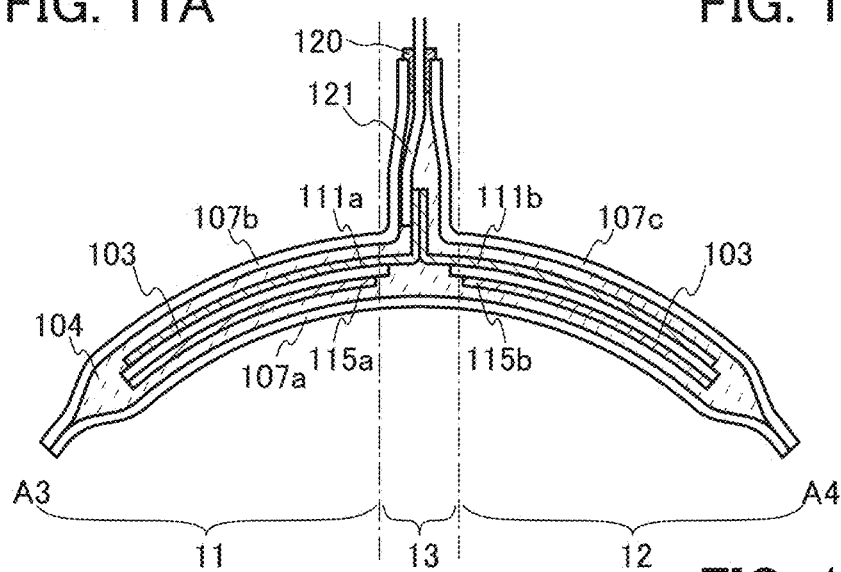
FIGS. 11A to 11F are cross-sectional views and plan views illustrating structure examples of a secondary battery.
Figure 11B:
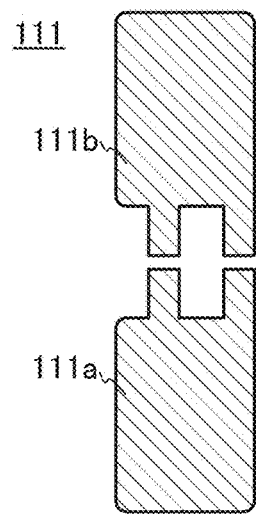
Figure 11C:
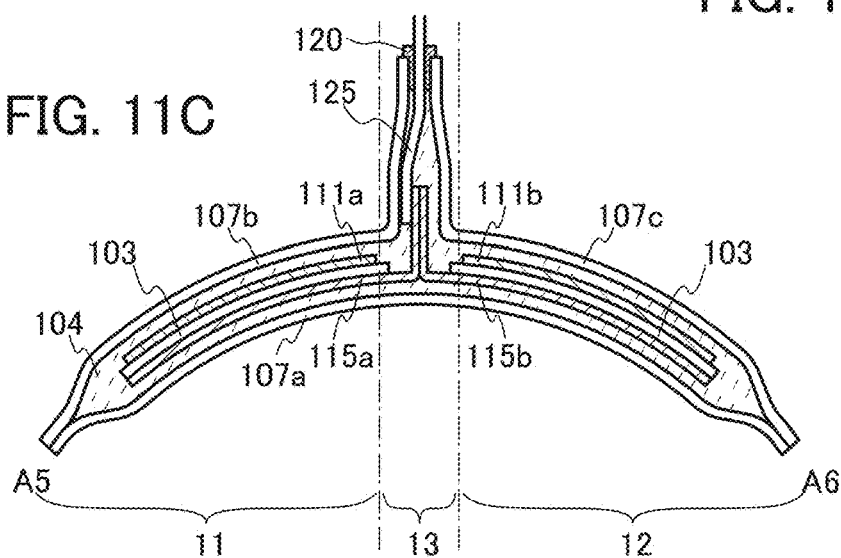
Figure 11D:
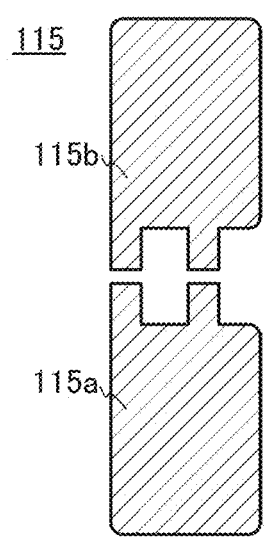

Although FIGS. 1A and 1B and FIGS. 2A and 2B illustrate the secondary battery 10 in which the positive electrode 111 and the negative electrode 115 are each continuous from the first portion 11 side to the second portion 12 side, one embodiment of the present invention is not limited to such a structure. For example, as illustrated in FIGS. 11A to 11D, the positive electrode 111 may be divided into a positive electrode 111a on the first portion 11 side and a positive electrode 111b on the second portion 12 side, and the negative electrode 115 may be divided into a negative electrode 115a on the first portion 11 side and a negative electrode 115b on the second portion 12 side. Note that FIG. 11A is a cross-sectional view taken along the dashed-dotted line A3-A4 in FIG. 1B, and FIG. 11B is a top view of the positive electrode 111. FIG. 11C is across-sectional view taken along the dashed-dotted line A5-A6 in FIG. 1B, and FIG. 11D is a top view of the negative electrode 115.

Here, the positive electrodes 111a and 111b can be collectively connected to the positive electrode lead 121 in the third portion 13. Similarly, the negative electrodes 115a and 115b can be collectively connected to the negative electrode lead 125 in the third portion 13.

Figure 11E:
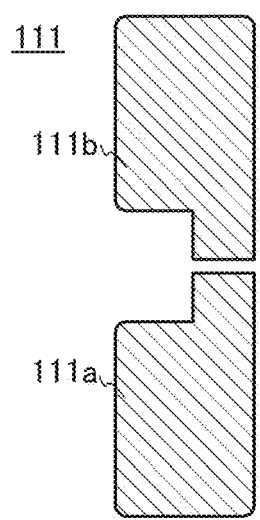
Figure 11F:
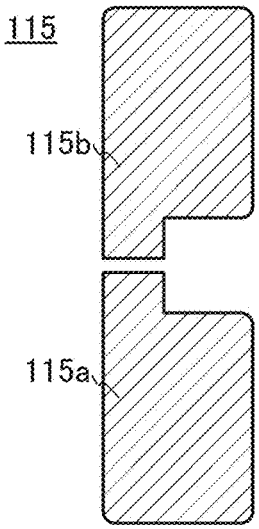

The positive electrode 111 and the negative electrode 115 illustrated in FIGS. 11B and 11D are similar to those in FIG. 4A, in which the first portion 11 and the second portion 12 are joined to each other at two places. However, without limitation to such a shape, the positive electrode 111 and the negative electrode 115 can have a shape in which the first portion 11 and the second portion 12 are joined at one place, as illustrated in FIGS. 11E and 11F.

Note that the secondary batteries 10 illustrated in FIGS. 11A to 11D are similar to that in FIGS. 1A and 1B and FIGS. 2A and 2B except that the positive electrode 111 is divided into the positive electrodes 111a and 111b and the negative electrode 115 is divided into the negative electrodes 115a and 115b, and the above description can be referred to for the detail.

5. Modification Example 4

Figure 12A:
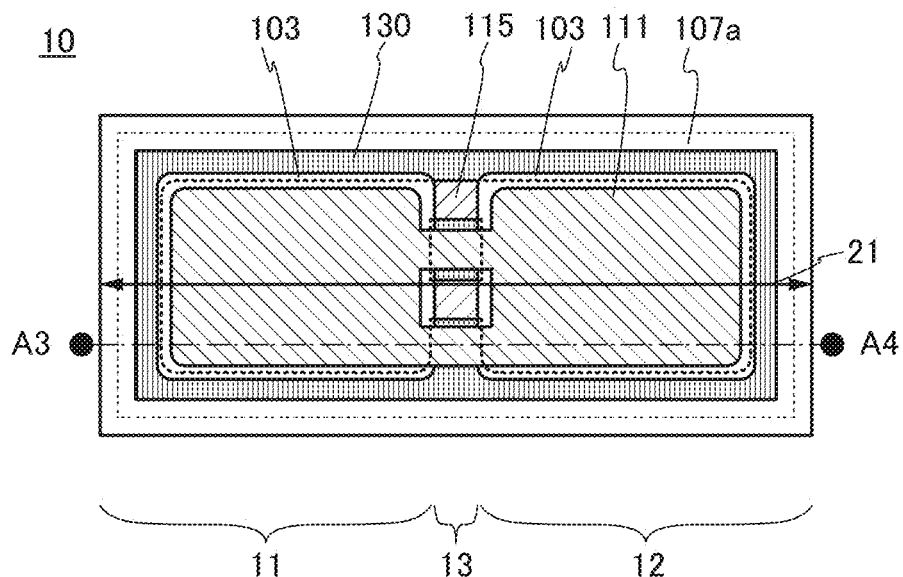
FIGS. 12A and 12B are a cross-sectional view and a plan view illustrating a structure example of a secondary battery.
Figure 12B:
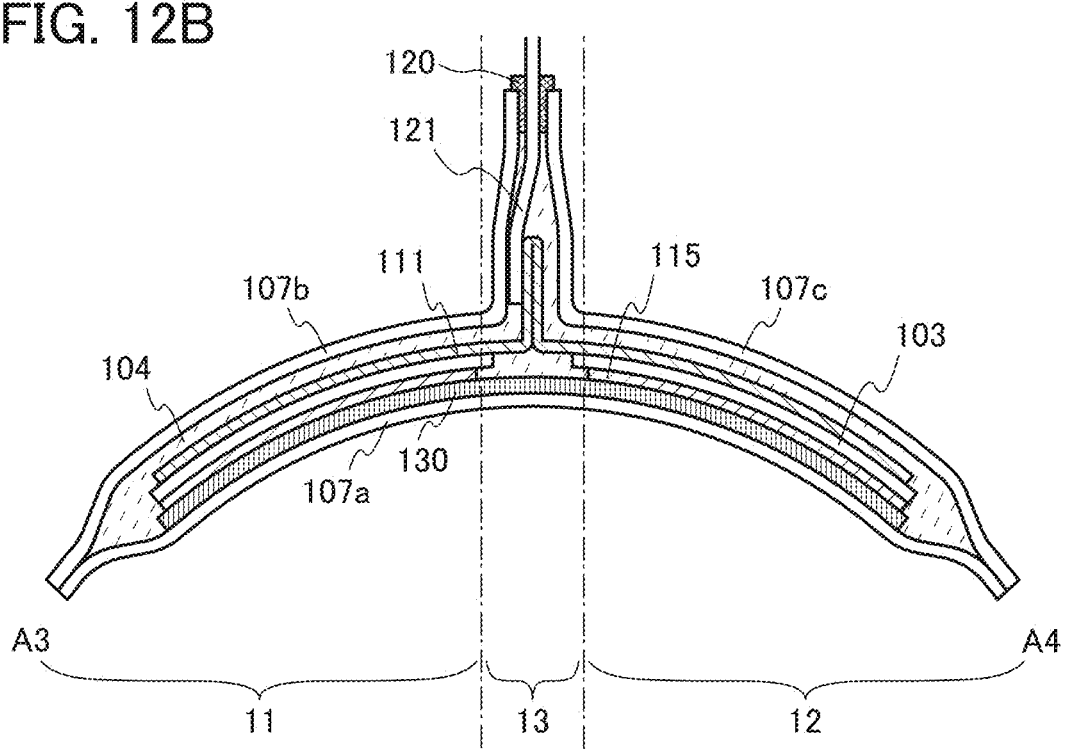

As illustrated in FIGS. 12A and 12B, the secondary battery 10 illustrated in FIGS. 1A and 1B and FIGS. 2A and 2.B may be further provided with a cushioning material 130. Note that FIG. 12A is a top view of the secondary battery 10, and FIG. 12B is a cross-sectional view taken along the dashed-dotted line A3-A4 in FIG. 12A.

The cushioning material 130 is provided between the exterior body 107a and the positive electrode 111 or between the exterior body 107a and the negative electrode 115. FIG. 12B illustrates an example in which the cushioning material 130 is provided between the exterior body 107a and the negative electrode 115.

A sheet-like plastic film having a larger area than the positive electrode 111, the negative electrode 115, or the separator 103 can be used as the cushioning material 130. A plastic film having a larger thickness than the separator 103 can be used as the cushioning material 130. The cushioning material 130 may be provided with slits. The shape of the cushioning material 130 is not limited to a rectangle and may be a shape with four round angles. If the shape of the cushioning material 130 has an acute angle, when the secondary battery 10 is curved, the angle might damage the exterior bodies 107a to 107c. Thus, angles of the cushioning material 130 are chamfered, so that the secondary battery 10 can be highly reliable. An insulating material is used as a material of the cushioning material 130; for example, PP, PE, polyester such as PET or PBT, polyamide such as nylon 6 or nylon 66, an inorganic deposition film, or paper is used.

By providing the cushioning material 130 between the exterior body 107a and the positive electrode 111 or between the exterior body 107a and the negative electrode 115, the positive electrodes 111 or the negative electrode 115 can be positioned stably. When the secondary battery 10 is curved to have a desired shape, the cushioning material 130 can also be curved so that the secondary battery 10 can have the desired shape, contributing to maintaining of the curved shape of the secondary battery 10. Furthermore, a restricting function of preventing the secondary battery 10 from being curved more than necessary may be provided. The cushioning material 130 can also serve as a framework of the secondary battery 10. By providing the cushioning material 130, the influence of a strain caused by externally applying force to the secondary battery 10 can be reduced to be acceptable. Thus, the secondary battery 10 can be highly reliable.

Furthermore, when the cushioning material 130 provided between the exterior body 107a and the positive electrode 111 or between the exterior body 107a and the negative electrode 115 is a plastic film with a smooth surface, the cushioning material 130 can be slid with an electrode in contact with the surface of the cushioning, material 130 and the exterior body in contact with the surface of the cushioning material 130. Thus, the secondary battery 10 can have resistance to repeated bending.

Note that the secondary batteries 10 illustrated in FIGS. 12A and 12B are similar to that in FIGS. 1A and 1B and FIGS. 2A and 2B except that the cushioning material 130 is provided, and the above description can be referred to for the detail.

A secondary battery with a novel structure or, specifically, a flexible secondary battery with a novel structure can be provided with the above structure.

Note that the example in which the secondary battery is curved is shown, one embodiment of the present invention is not limited thereto. Depending on circumstances or conditions, in one embodiment of the present invention, the secondary battery may be transformed as needed by bending, straightening, or the like, or may be kept in some shape. Alternatively, for example, depending on circumstances or conditions, the secondary battery is not necessarily curved in one embodiment of the present invention. The example in which one embodiment of the present invention is applied to a lithium-ion secondary battery is described; however, one embodiment of the present invention is not limited thereto. Depending on circumstances or conditions, one embodiment of the present invention may be applied to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, an air battery, a primary battery, a capacitor, an electric double layer capacitor, an ultracapacitor, a supercapacitor, a lithium ion capacitor, and the like. Alternatively, for example, depending on circumstances or conditions, one embodiment of the present invention is not necessarily applied to a lithium-ion secondary battery.

Moreover, a secondary battery having a combination of the typical structure and the modification examples shown in this embodiment may be employed. The structure described in this embodiment can be used in appropriate combination with any of the structures described in the other embodiments.

Embodiment 2

In this embodiment, an example of a method for manufacturing the secondary battery described in the above embodiment will be described with reference to FIGS. 13A to 13C, FIGS. 14A to 14D, and FIGS. 15A to 15C.

[1. Preparation of Negative Electrode]

First, the negative electrode active material layer 106 is formed over the negative electrode current collector 105 and a groove or an opening is provided in a portion corresponding to the third portion 13, so that the negative electrode 115 is formed (see FIG. 13A). Note that the negative electrode active material layer 106 may be formed in portions corresponding to the first portion 11 and the second portion 12 of the negative electrode 115.

[2. Preparation of Positive Electrode and Wrapping Positive Electrode with Separator]

Next, the positive electrode active material layer 102 is formed over the positive electrode current collector 101 and a groove or an opening is provided in a portion corresponding to the third portion 13, on that the positive electrode 111 is formed. Note that the positive electrode active material layer 102 may be formed in portions corresponding to the first portion 11 and the second portion 12 of the positive electrode 111. Then, the first portion 11 and the second portion 12 of the positive electrode 111 are each interposed between surfaces of the folded separator 103 (see FIG. 13B).

The outer edges of the separators 103 on the first portion 11 side and the second portion 12 side of the positive electrode 111 are bonded so that the separators 103 have a bag-like shape (see FIG. 13C). The bonding of the outer edges of the separators 103 can be performed with the use of an adhesive or the like, by ultrasonic welding, or by thermal fusion bonding.

In this embodiment, polypropylene is used as the separators 103, and the outer edges of the separators 103 are bonded to each other by heating. In this manner, each of the first portion 11 and the second portion 12 of the positive electrode 111 can be wrapped with the separator 103. The separator 103 is formed so as to wrap at least the positive electrode active material layer 102 and does not necessarily wrap the whole positive electrode 111.

Note that although the separator 103 is folded in a bag-like shape in FIG. 13B, one embodiment of the present invention is not limited to such a shape. For example, the positive electrode 111 may be interposed between two separators. In that case, bonding is performed to surround almost all of the four sides of the separator.

The outer edges of the separator 103 may be bonded either using bonding portions provided at irregular intervals or using dot-like bonding portions provided at regular intervals.

Alternatively, bonding may be performed on only one side of the outer edges. Alternatively, bonding may be performed on only two sides of the outer edges. Alternatively, bonding may be performed on four sides of the outer edges. Accordingly, the four sides can be in an even state.

Note that although the case where the positive electrode 111 is wrapped with the bag-like separator 103 is described in this embodiment, one embodiment of the present invention is not limited thereto. For example, the separator 103 of one layer may be interposed between the positive electrode 111 and the negative electrode 115 as illustrated in FIG. 3A and the like. As will be described later, after the positive electrodes 111 and the negative electrodes 115 are stacked, one sheet of separator 103 may be folded plural times to be interposed between every pair of the positive electrode 111 and the negative electrode 115 as illustrated in FIG. 9B. Instead of the positive electrode 111, the negative electrode 115 may be wrapped with the bag-like separators 103. As illustrated in FIGS. 7A to 7C, two sheets of positive electrodes 111 may be collectively wrapped with the bag-like separators 103.

[3. Stacking of Positive Electrode and Negative Electrode]

Figure 14A:
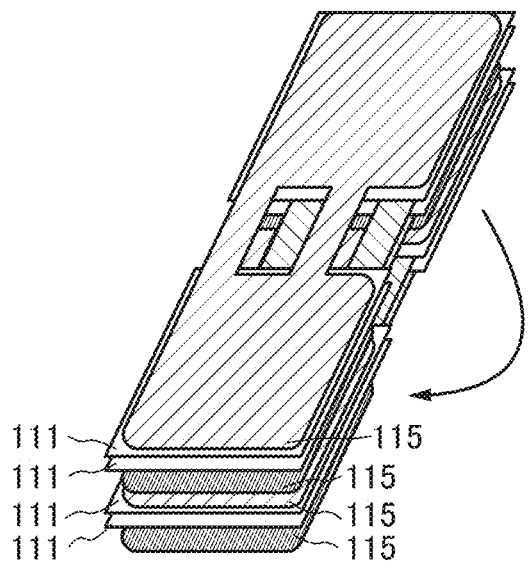
FIGS. 14A to 14D illustrate a method for manufacturing a secondary battery.

Next, the positive electrodes 111 and the negative electrodes 115 are stacked (FIG. 14A). In this embodiment, four sheets of positive electrodes 111 each having the positive electrode active material layer 102 on one surface and four sheets of negative electrodes 115 each having the negative electrode active material layer 106 on one surface are stacked. The positive electrodes 111 and the negative electrodes 115 are positioned so that the positive electrode active material layer 102 and the negative electrode active material layer 106 are arranged to face each other with the separator 103 provided therebetween. Furthermore, the negative electrodes 115 are positioned so that the surfaces having no negative electrode active material layer 106 are in contact with each other.

After the positive electrodes 111 and the negative electrodes 115 are stacked, they are folded along the center of the third portion 13 as illustrated in FIG. 14A. Accordingly, the positive electrode tab and the negative electrode tab are formed in the portions of the positive electrodes 111 and the negative electrodes 115 corresponding to the third portion 13.

[4. Connection Between Positive Electrode Lead and Negative Electrode Lead]

Next the positive electrode lead 121 including the sealing layer 120 is connected to positive electrode tabs of the plurality of positive electrode current collectors 101 by applying ultrasonic wave while pressure is applied (hereinafter also referred to as ultrasonic welding in some cases).

The tabs are likely to be cracked or cut by stress due to external force applied after manufacture of the secondary battery 10. Here, when subjected to ultrasonic welding, the positive electrode lead 121 may be placed between bonding dies provided with projections, whereby a curved portion can be formed in the positive electrode tab in addition to the bonding region. This curved portion can relieve stress due to external force applied after manufacture of the secondary battery 10. Therefore, the secondary battery 10 can be highly reliable.

The curved portion is not necessarily formed in the positive electrode tab. The positive electrode current collector 101 may be formed using a high-strength material such as stainless steel to a thickness of 10 µm or less, in order to easily relieve stress due to external force applied after manufacture of a secondary battery.

It is needless to say that two or more of the above examples may be combined to relieve concentration of stress in the positive electrode tab.

Figure 14B:
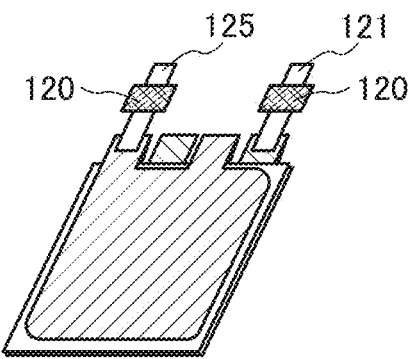

Then, in a manner similar to that of the positive electrode current collector 101, the negative electrode lead 125 including the sealing layer 120 is connected to negative electrode tabs of the plurality of negative electrode current collectors 105 by ultrasonic welding (see FIG. 14B).

Note that when the positive electrode 111 and the negative electrode 115 have planar shapes in each of which the first portion 11 and the second portion 12 are continuous through two or more places, positional misalignment of the plurality of positive electrodes 111 and the plurality of negative electrodes 115 can be prevented when the lead electrodes are attached.

[5. Wrapping of Positive Electrode and Negative Electrode with Exterior Body]

Figure 14C:
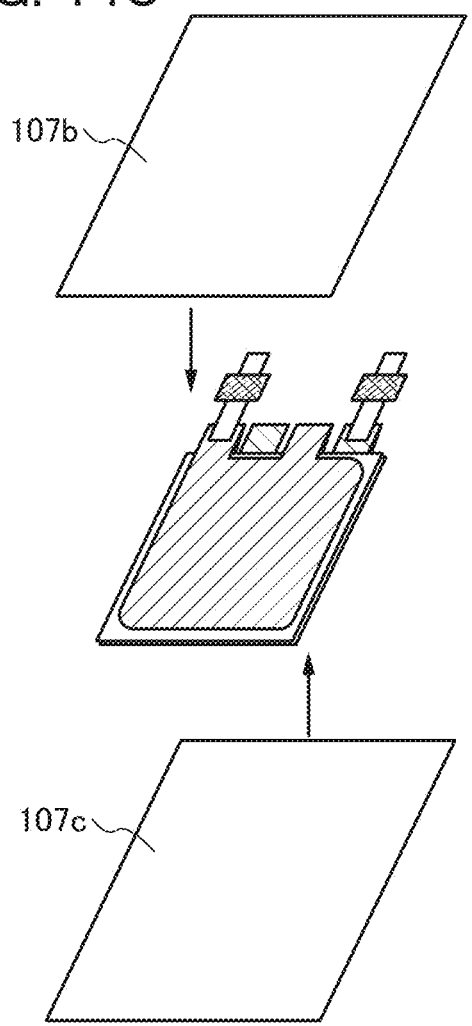

Next, the positive electrode 111 and the negative electrode 115 are interposed between the exterior bodies 107b and 107c (see FIG. 14C). The portions of the exterior bodies 107b and 107c each corresponding to the third portion 13 are sealed by thermocompression bonding, whereby the positive electrode 111 and the negative electrode 115 are wrapped with the exterior bodies 107b and 107c (see FIG. 14D). Here, the portion of the exterior bodies 107b and 107c sealed by thermocompression bonding is illustrated as a bonding portion 107bc. The bonding portion 107bc overlaps with the sealing layers 120 included in the positive electrode lead 121 and the negative electrode lead 125.

Figure 14D:
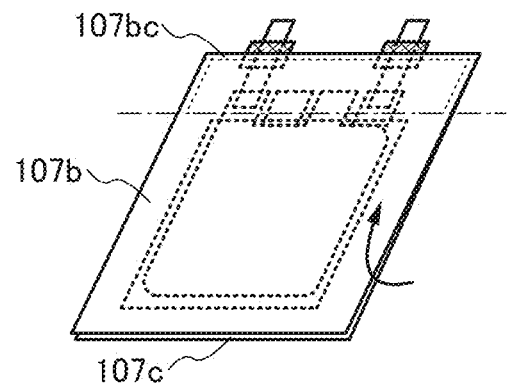

Next, the exterior body 107b and portions of the positive electrode 111 and the negative electrode 115 corresponding to the first portion 11 are folded along a dashed-dotted line (corresponding to a boundary between the third portion 13 and the first portion 11) illustrated in FIG. 14D.

Figure 15A:
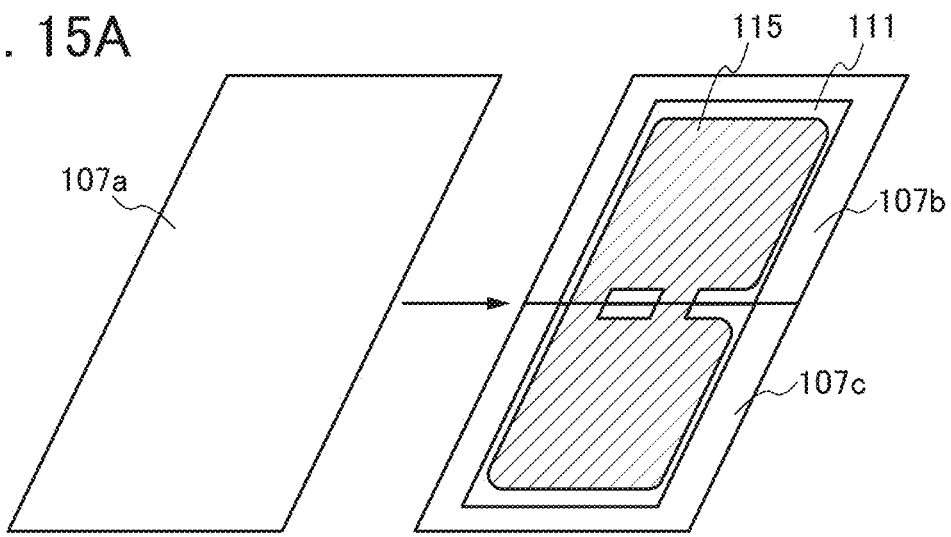
FIGS. 15A to 15C illustrate a method for manufacturing a secondary battery.

The positive electrode 111 and the negative electrode 115 are interposed between the exterior body 107a and the exterior bodies 107b and 107c (see FIG. 15A). Three sides of the exterior bodies 107a to 107c are sealed by thermocompression bonding, whereby the positive electrode 111 and the negative electrode 115 are wrapped with the exterior bodies 107a to 107c (see FIG. 15B). Here, the portion of the exterior bodies 107a and 107b sealed by thermocompression bonding is illustrated as a bonding portion 107ab, and the portion of the exterior bodies 107a and 107c sealed by thermocompression bonding is illustrated as a bonding portion 107ac.

[6. Injection of Electrolyte Solution and Sealing]

Figure 15B:
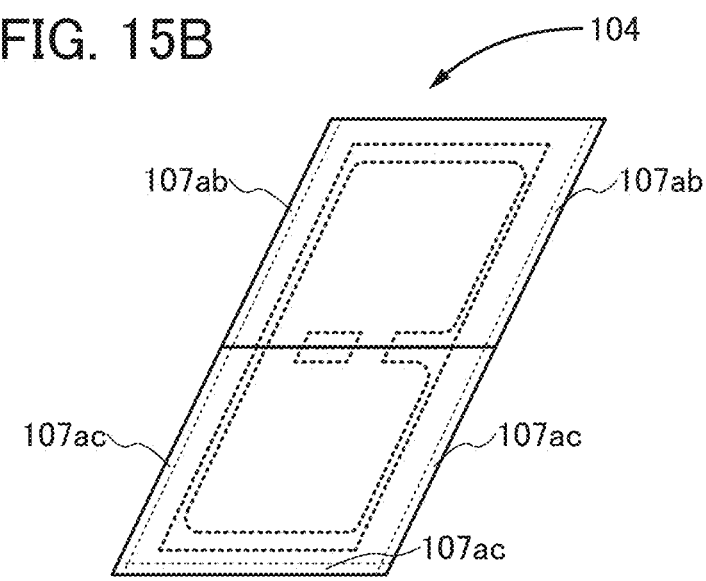

Next, the electrolyte solution 104 is injected from unsealed sides of the exterior bodies 107a and 107b (see FIG. 15B). Then, the remaining open sides of the exterior body 107a and 107b are sealed under vacuum, heat, and pressure. This treatment is performed in a low pressure environment from which oxygen is eliminated, for example, in a glove box. The evacuation to a vacuum may be performed with a vacuum sealer, a liquid pouring sealer, or the like. Heating and pressing can be performed with the exterior bodies 107a and 107b placed between two heatable bars included in the sealer. For example, the pressure in the low pressure environment is 60 kPa, the heating temperature of the bars is 190° C., and a pressure of 0.1 MPa is applied by the bars for 3 seconds. At this time, pressure may be applied to the positive electrode and the negative electrode through the exterior body 107a. The application of pressure enables removal of bubbles which enter between the positive electrode and the negative electrode when the electrolyte solution is injected.

After the exterior bodies 107a to 107c are attached to one another through the above steps, charging and discharging are preferably performed in aging treatment. Here, the aging treatment refers to a step performed to detect an initial defect of a secondary battery or a step performed to form a stable coating film over a negative electrode active material layer in initial charging and discharging. It is further preferable that gas caused by decomposition of an electrolyte solution or the like at the time of aging treatment be let out and the exterior bodies 107a to 107c be sealed again. In the case of performing the aging treatment, for example, the exterior bodies 107a to 107c are sealed again in such a manner that the exterior bodies 107a and 107b are extended from the designed length of the secondary battery and the extended parts of the exterior bodies 107a and 107b are removed after the gas is let out.

Figure 15C:
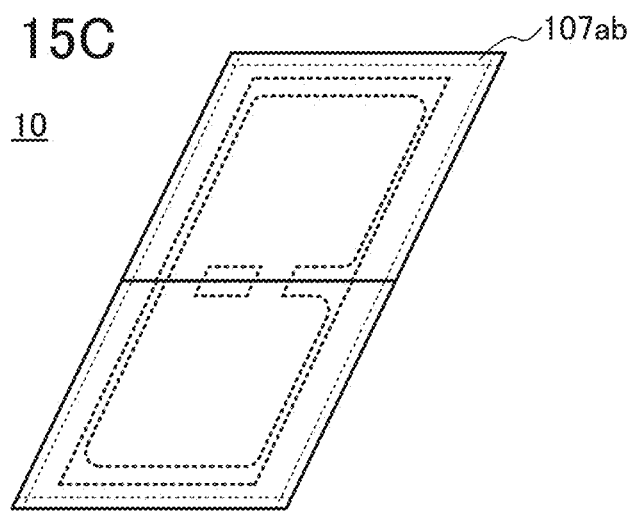

Through the above-described process, the secondary battery 10 can be manufactured (see FIG. 15C).

Note that the secondary battery 10 illustrated in FIG. 15C can have the curved shape as illustrated in FIG. 1A by being interposed between a projected arc-shaped mold and a depressed arc-shaped mold. At the time of sealing, the exterior bodies which are curved in advance may be sealed. However, the secondary battery 10 does not necessarily have a curved shape. For example, when the secondary battery 10 is mounted on an electronic device or the like, the secondary battery 10 may be curved as appropriate in accordance with the shape of the electronic device.

Figure 16A:
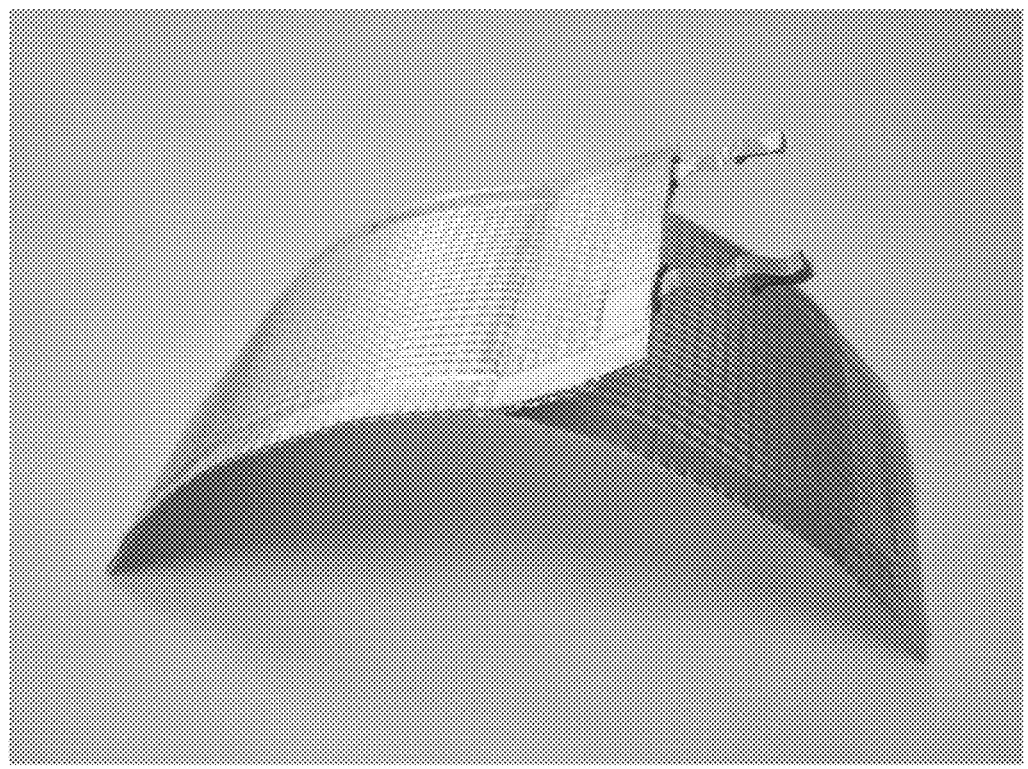
FIGS. 16A and 16B are a photograph of the exterior of a secondary battery and a schematic view thereof.
Figure 16B:
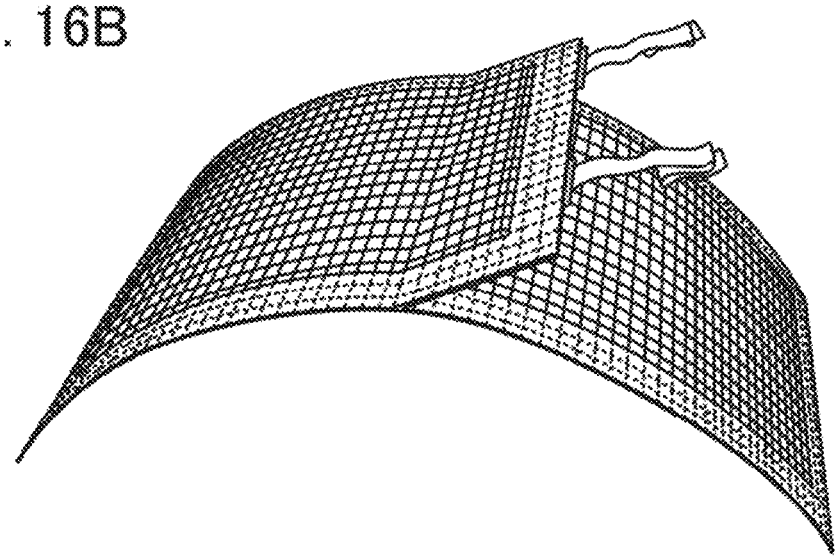

FIG. 16A is a photograph taken of a curved lithium-ion secondary battery which is manufactured with the above method. FIG. 16B is a schematic view corresponding to the photograph in FIG. 16A. Note that the exterior bodies of the secondary battery in FIGS. 16A and 16B are embossed to form unevenness on the surface.

This embodiment can be implemented in appropriate combination with any of the other embodiments.

Embodiment 3

A battery management unit (BMU) which can be combined with the secondary battery including the material described in the above embodiment and a transistor suitable for a circuit included in the battery management unit will be described with reference to FIG. 17, FIGS. 18A to 18C, FIG. 19, FIG. 20, FIGS. 21A to 21C, FIG. 22, and FIG. 23. In this embodiment, a battery management unit of a power storage device including battery cells that are connected in series is particularly described.

When a plurality of battery cells connected in series are charged and discharged repeatedly, each battery cell has different capacity (output voltage) from one another due to the variation in charge and discharge characteristics among the battery cells. A discharge capacity of all of the battery cells connected in series depends on a battery cell with small capacity. Capacity variation reduces the discharge capacity. Charging based on a battery cell with small capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit configurations for reducing variation in capacities among the battery cells include a resistive type, a capacitor type, and an inductor type, here, a circuit structure which can reduce variation in capacities among the battery cells using transistors with a low off-state current is explained as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of electric charge leaking from a battery can be reduced, and reduction in capacity with the lapse of time can be inhibited.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:Al:Zn=$x_1$:$y_1$:$z_1$, $x_1/y_1$ is preferably greater than or equal to ⅓ and less than or equal to 6 and further preferably greater than or equal to 1 and less than or equal to 6, and $z_1/y_1$ is preferably greater than or equal to ⅓ and less than or equal to 6 and further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film are described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary is not clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or a top surface of the CAAC-OS film, and is arranged parallel to the formation surface or the top surface of the CAAC-OS film.

On the other hand, according to the high-resolution planar TEM image of a plane of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an InGaZnO$_4$ crystal is analyzed by an out-of-plane method, a peak appears frequently when the diffraction angle (2θ) is around 31°. This peak is derived from the (009) plane of the InGaZnO$_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film with an InGaZnO$_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above-described OS transistor is suitable for a circuit of a battery management unit which is used for such battery cells in the power storage device.

Figure 17:
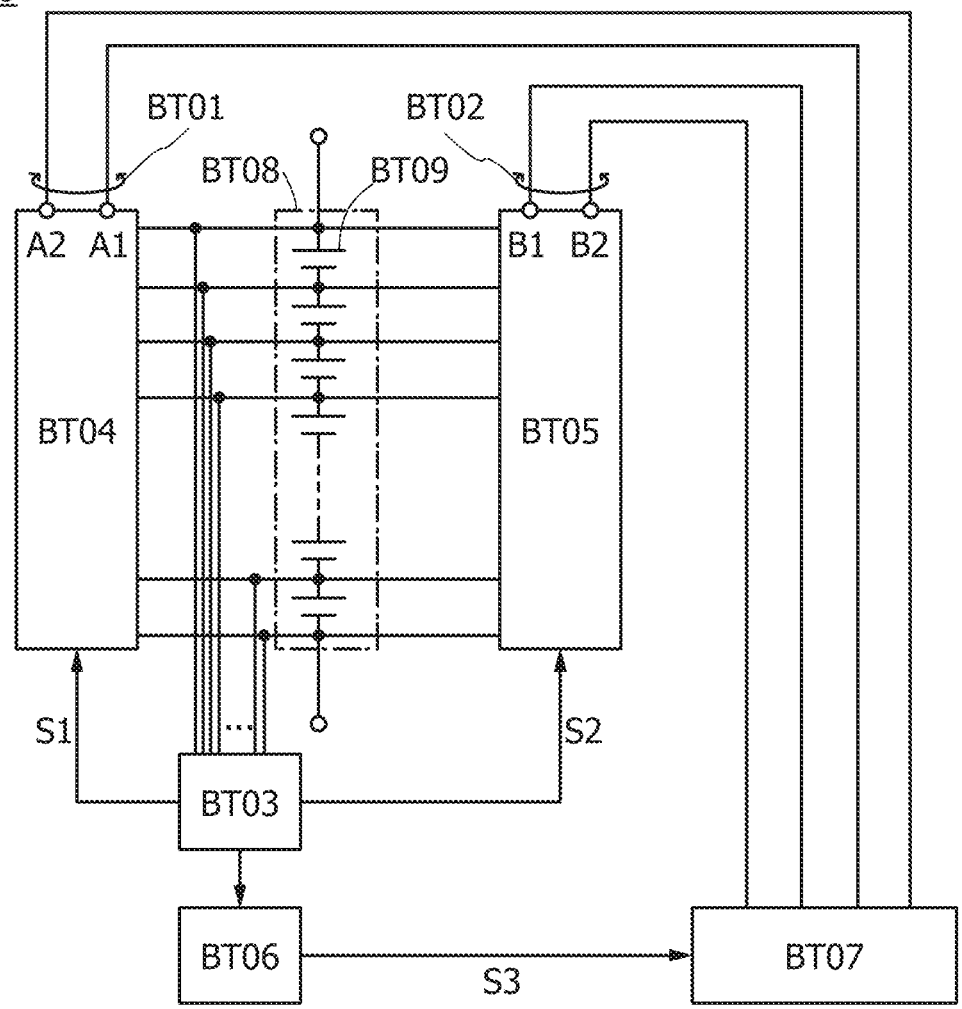
FIG. 17 is a block diagram illustrating a battery management unit of a power storage device.

FIG. 17 is an example of a block diagram of the power storage device. A power storage device BT00 illustrated in FIG. 17 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 17, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

An operation of the switching control circuit BT03 is described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that a battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having the highest voltage or the lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select battery cells BT09 which are near overcharge or overdischarge as the discharge battery cell group or the charge battery cell group.

Figure 18A:
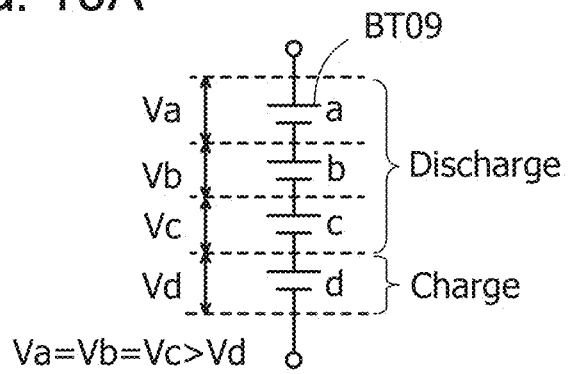
FIGS. 18A to 18C are conceptual diagrams illustrating a battery management unit of a power storage device.
Figure 18B:
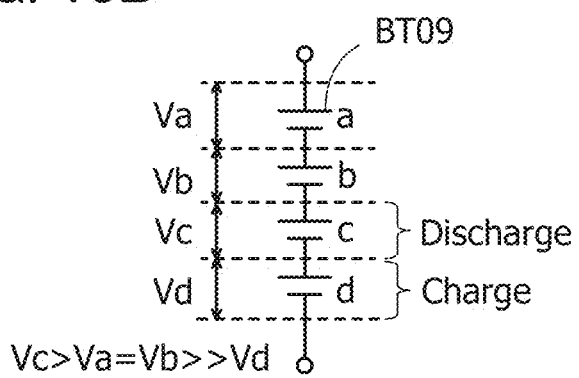
Figure 18C:
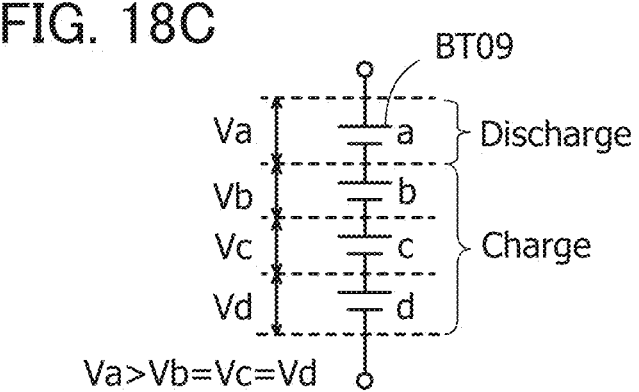

Here, operation examples of the switching control circuit BT03 in this embodiment are described with reference to FIGS. 18A to 18C. FIGS. 18A to 18C illustrate operation examples of the switching control circuit BT03. Note that FIGS. 18A to 18C each illustrate the case where tour battery cells BT09 are connected in series as an example for convenience of explanation.

FIG. 18A illustrates the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and one low-voltage cell d are connected in series. In that case, the switching control circuit BT03 selects the series of three high-voltage cells a to c as the discharge battery cell group. In addition, the switching control circuit BT03 selects the low-voltage cell d as the charge battery cell group.

Next, FIG. 18B illustrates the case where the relation of the voltages is Vc>Va=Vb>>Vd. That is, a series of two low-voltage cells a and b, one high-voltage cell c, and one low-voltage cell d which is close to overdischarge are connected in series. In that case, the switching control circuit BT03 selects the high-voltage cell c as the discharge battery cell group. Since the low-voltage cell d is close to overdischarge, the switching control circuit BT03 preferentially selects the low-voltage cell d as the charge battery cell group instead of the series of two low-voltage cells a and b.

Lastly, FIG. 18C illustrates the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 18A to 18C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switch circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 19:
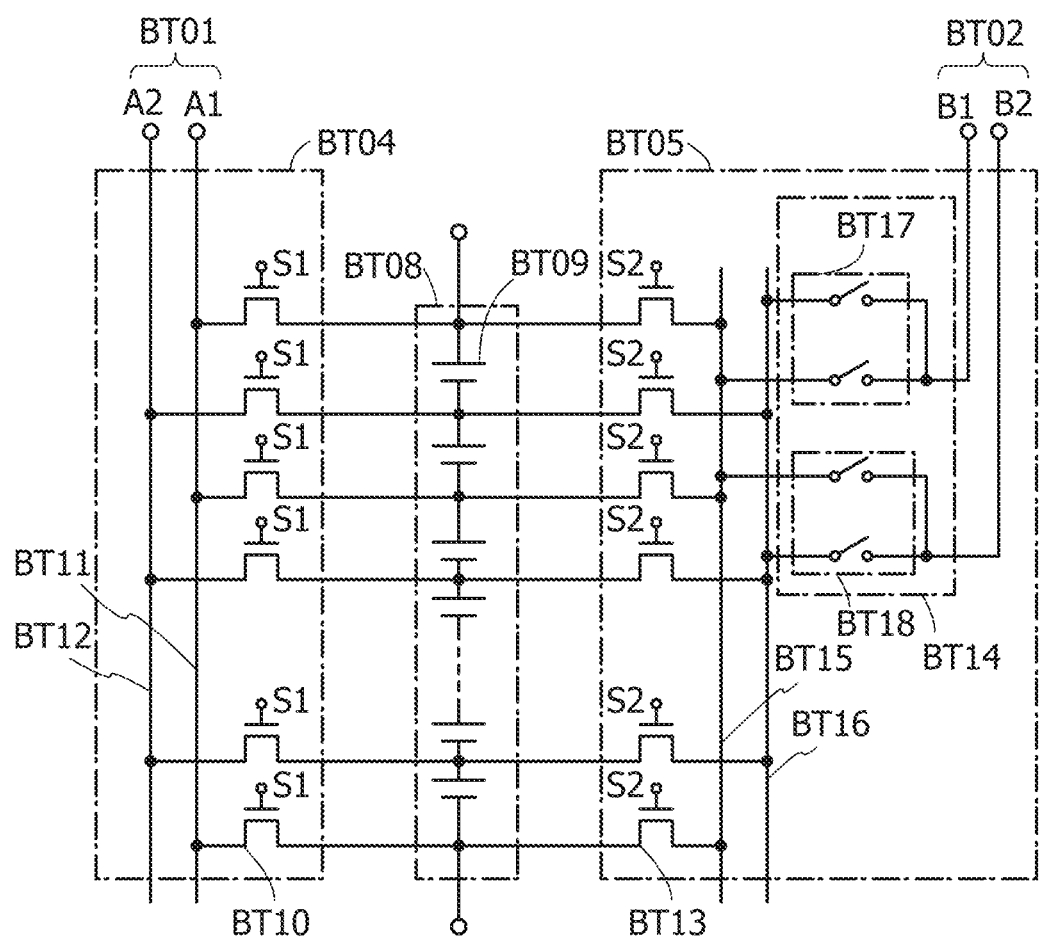
FIG. 19 is a circuit diagram illustrating a battery management unit of a power storage device.
Figure 20:
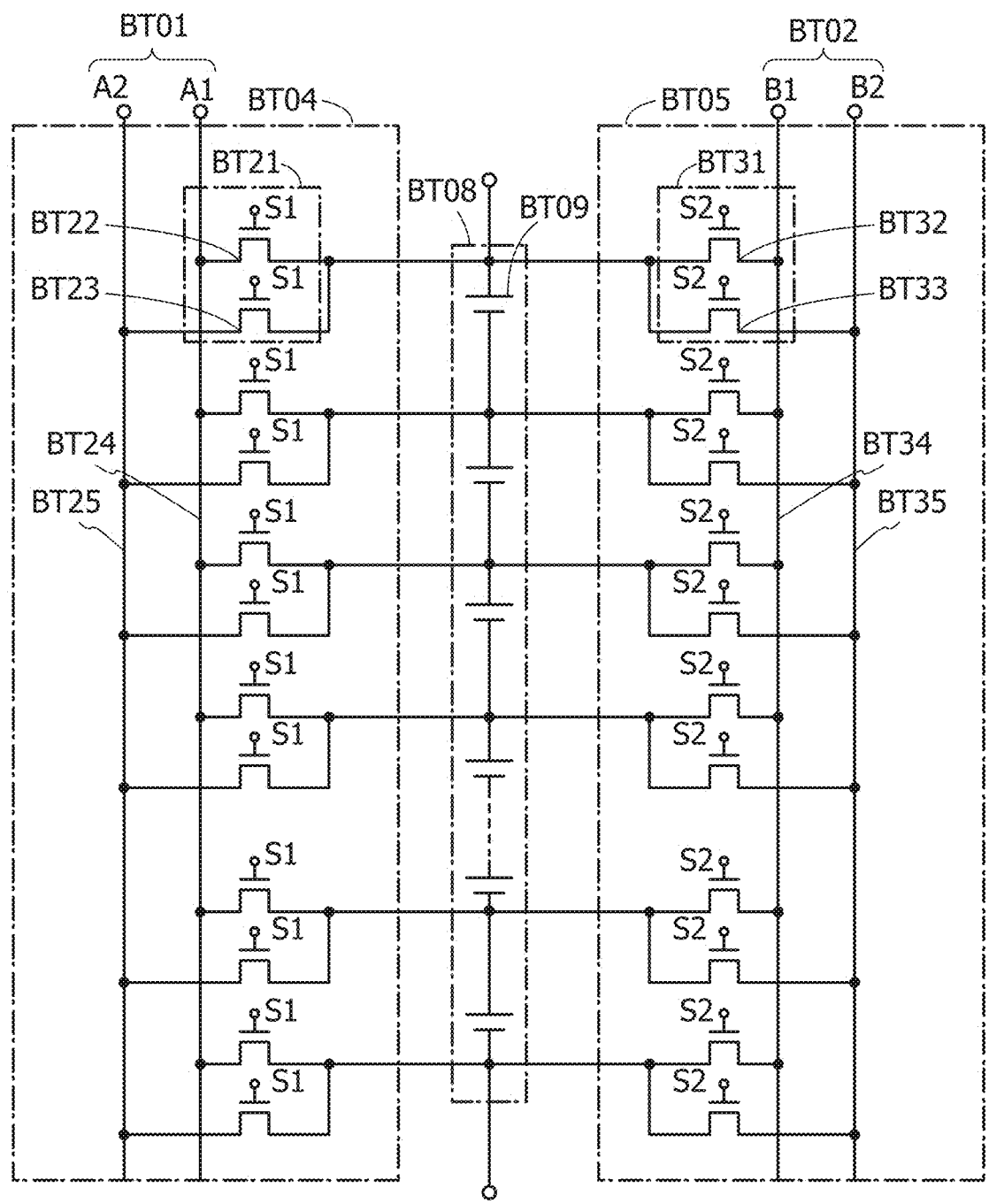
FIG. 20 is a circuit diagram illustrating a battery management unit of a power storage device.

FIG. 19 and FIG. 20 are circuit diagrams illustrating configuration example of the switching circuits BT04 and BT05.

In FIG. 19, the switching circuit BT04 includes a plurality of the transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of the transistors BT10 are each connected between two adjacent battery cells BT09.

A source or a drain of the transistor BT10 which is not connected to the bus BT11 on the most upstream side of the plurality of transistors BT10 is connected to a positive electrode terminal of a battery cell BT09 on the most upstream side of the battery portion BT08. A source or a drain of a transistor BT10 which is not connected to the bus BT11 of the transistor BT10 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

OS transistors are preferably used as the transistors BT10. Since the off-state current of the OS transistor is low, the amount of electric charge leaking from battery cells which do not belong to the discharge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 19, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. Sources or drains which are not connected to the bus BT15 and the bus BT16 of the plurality of transistors BT13 are each connected between two adjacent battery cells BT09.

A source or a drain of a transistor BT13 which is not connected to the bus BT15 on the most upstream side of the plurality of transistors BT13 is connected to the positive electrode terminal of the battery cell BT09 on the most upstream side of the battery portion BT08. A source or a drain of a transistor BT13 which is not connected to the bus BT15 on the most downstream side of the plurality of transistors BT13 is connected to the negative electrode terminal of the battery cell BT09 on the most downstream side of the battery portion BT08.

OS transistors are preferably used as the transistors BT13 like the transistors BT10. Since the off-state current of the OS transistor is low, the amount of electric charge leaking from the battery cells which do not belong to the charge battery cell group can be reduced, and reduction in capacity with the lapse of time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other ends of the switch pair BT17 extend from respective switches. One switch is connected to the bus BT15, and the other switch is connected to the bus BT16. One end of the switch pair BT18 is connected to the terminal B2. The other ends of the switch pair BT18 extend from respective switches. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 by controlling the combination of on and off states of the transistors BT13 and the current control switch BT14 in response to the control signal S2.

For example, the switching circuit BT05 connects the charge battery cell group and the terminal pair BT02 in the following manner.

The switching circuit BT05 brings a transistor BT13 connected to the positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to the negative electrode terminal of a battery cell BT09 on the most downstream side of the charge battery cell group into an on state in response to the control signal S2 supplied to the gates of the plurality of the transistors BT13.

The polarities of voltages applied to the terminal pair BT02 can vary in accordance with the connection structures of the voltage transformer circuit BT07 and the discharge battery cell group connected to the terminal pair BT01. In order to supply current in a direction for charging the charge battery cell group, terminals with the same polarity of the terminal pair BT02 and the charge battery cell group are required to be connected. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14. In that case, the polarities of the voltages applied to the terminal pair BT02 are controlled by controlling the polarities of the voltages applied to the terminal pair BT01 in response to the operation of the current control switch BT14 and the control signal S1. Thus, the current control switch BT14 controls the direction of current which flows from the terminal pair BT02 to the charge battery cell group.

FIG. 20 is a circuit diagram illustrating structure examples of the switching circuit BT04 and the switching circuit BT05 which are different from those of FIG. 19.

In FIG. 20, the switching circuit BT04 includes a plurality of transistor pairs BT21, a bus BT24, and a bus BT25. The bus BT24 is connected to the terminal A1. The bus BT25 is connected to the terminal A2. One ends of the plurality of transistor pairs BT21 extend from transistors BT22 and transistors BT23. Sources or drains of the transistors BT22 are connected to the bus BT24. Sources or drains of the transistors BT23 are connected to the bus BT25. In addition, the other ends of the plurality of transistor pairs BT21 are each connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to a negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT21 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34 and a bus BT35. The bus BT34 is connected to the terminal B1. The bus BT35 is connected to the terminal B2. One ends of the plurality of transistor pairs BT31 extend from transistors BT32 and transistors BT33. One end extending from the transistor BT32 is connected to the bus BT34. One end extending from the transistor BT33 is connected to the bus BT35. The other ends of the plurality of transistor pairs BT31 are each connected between two adjacent battery cells BT09. The other end of the transistor pair BT31 on the most upstream side of the plurality of transistor pairs BT31 is connected to the positive electrode terminal of the battery cell BT09 on the most upstream side of the battery portion BT08. The other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected to each other. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off. In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction for charging the charge battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging overvoltage from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where charging overvoltage is not applied to the charge battery cell group.

The voltage level of the charging overvoltage is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 21A:
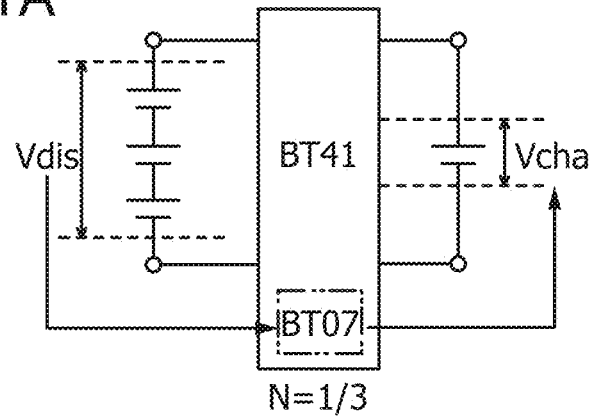
FIGS. 21A to 21C are conceptual diagrams illustrating a battery management unit of a power storage device.
Figure 21B:
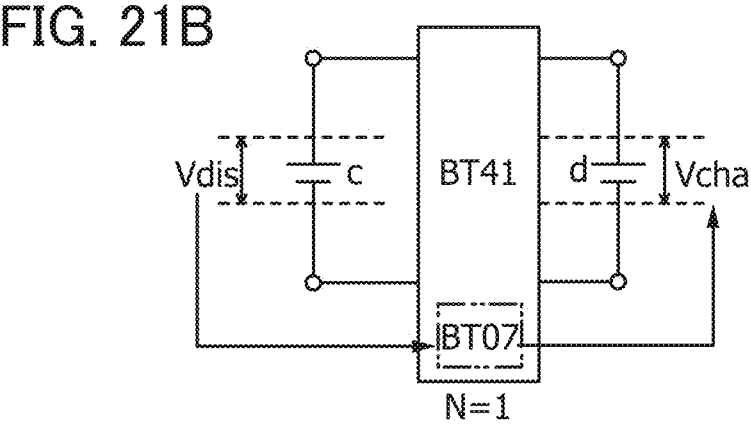
Figure 21C:
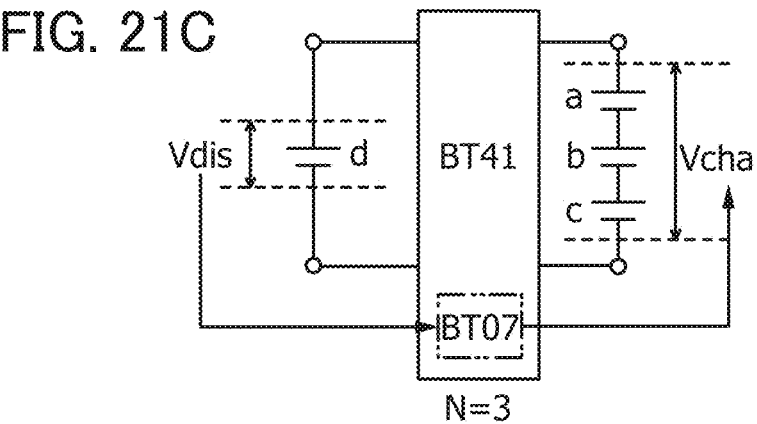

Here, operation examples of the voltage transformation control circuit BT06 in this embodiment are described with reference to FIGS. 21A to 21C. FIGS. 21A to 21C are conceptual diagrams for explaining the operation examples of the voltage transformation control circuit BT06 corresponding to the discharge battery cell group and the charge battery cell group described in FIGS. 18A to 18C. FIGS. 21A to 21C each illustrate a battery management unit BT41. As described above, the battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 21A, the series of three high-voltage cells a to c and one low-voltage cell d are connected in series as described in FIG. 18A. In that case, as described with reference to FIG. 18A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) based on the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when discharging voltage is applied to the terminal pair BT02 without transforming the voltage, overvoltage may be applied to the battery cells BT09 included in the charge battery cell group through the terminal pair BT02. Thus, in the case of FIG. 21A, it is necessary that a charging voltage (Vcha) applied to the terminal pair BT02 be lower than the discharging voltage. In addition, in order to charge the charge battery cell group, it is necessary that the charging voltage be higher than the total voltage of the battery cells BT09 included in the charge battery cell group. Thus, the voltage transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made higher than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 21A, since the number of the battery cells BT09 included in the discharge battery cell group is three and the number of the battery cells BT09 included in the charge battery cell group is one, the voltage transformation control circuit BT06 calculates a value which is slightly larger than ⅓ as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is obtained by transformation in response to the voltage transformation signal S3 to the terminal pair BT02. Then, the battery cells BT09 included in the charge battery cell group are charged with the charging voltage applied to the terminal pair BT02.

In each of examples illustrated in FIGS. 21B and 21C, the conversion ratio N is calculated in a manner similar to that of FIG. 21A. In each of the examples illustrated in FIGS. 21B and 21C, since the number of the battery cells BT09 included in the discharge battery cell group is less than or equal to the number of the battery cells BT09 included in the charge battery cell group, the conversion ratio N is 1 or more. Therefore, in this case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 prevents a short circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 22:
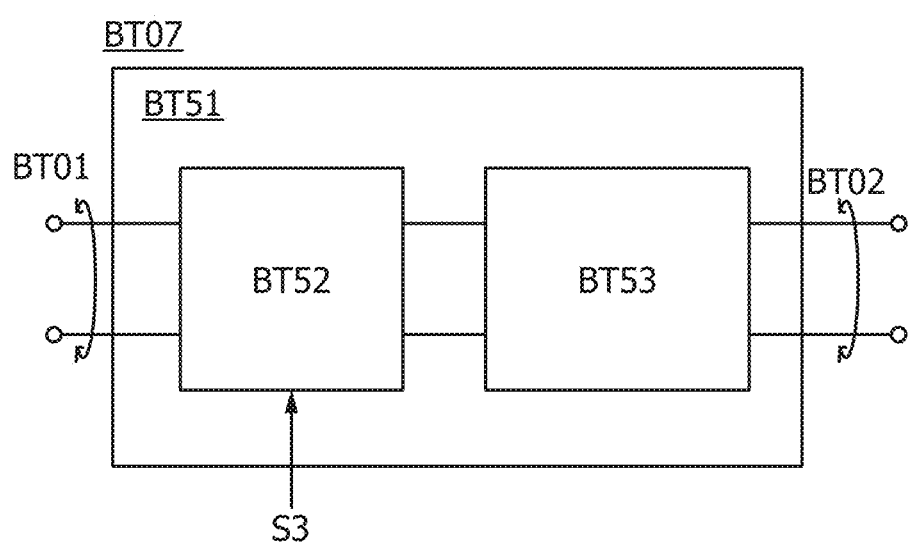
FIG. 22 is a block diagram illustrating a battery management unit of a power storage device.

The structure of the voltage transformer circuit BT07 including the insulated DC-DC converter is illustrated in FIG. 22. An insulated DC-DC converter BT51 includes a switch portion BT52 and a transformer BT53. The switch portion BT52 is a switch for switching on/off of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 23:
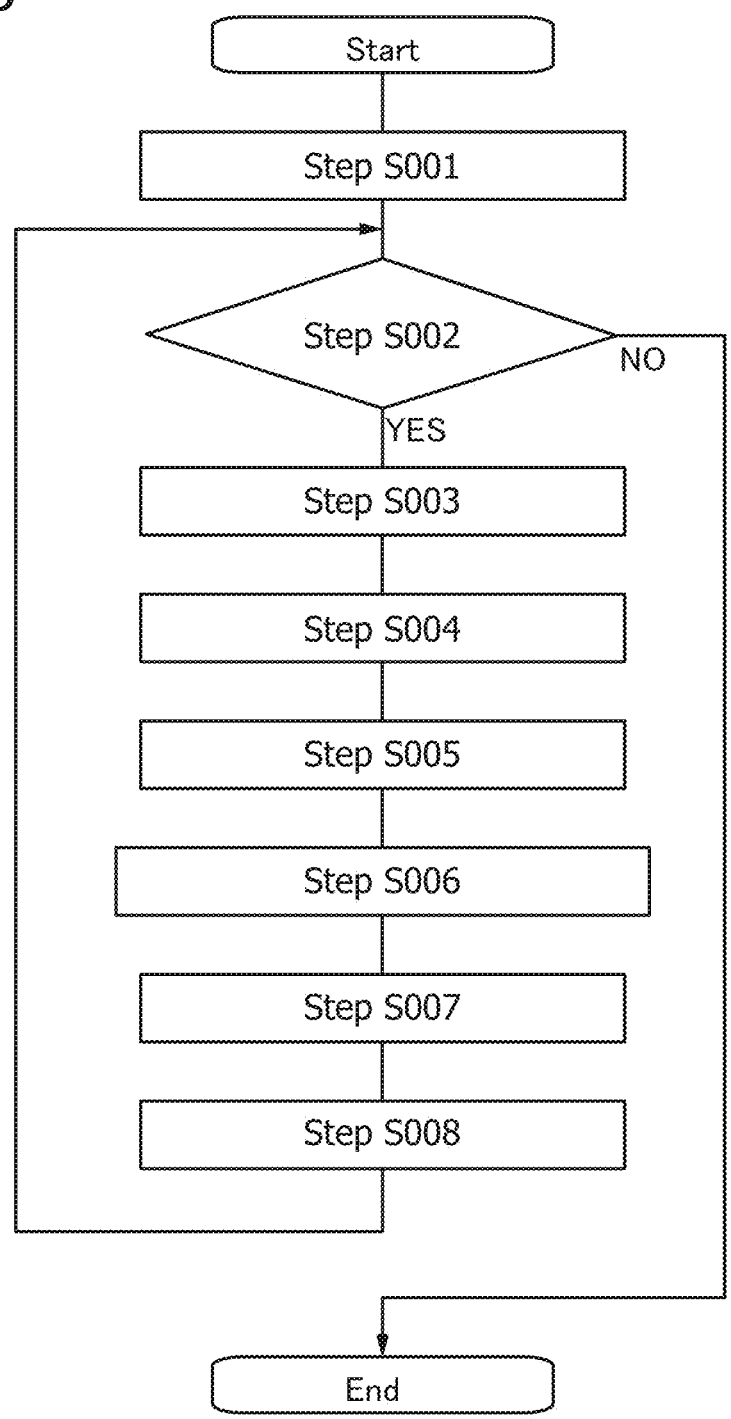
FIG. 23 is a flow chart showing an operation of a battery management unit of a power storage device.

A flow of operation of the power storage device BT00 in this embodiment is described with reference to FIG. 23. FIG. 23 is a flow chart illustrating the flow of the operation of the power storage device BT00.

First, the power storage device BT00 obtains a voltage measured for each of the plurality of battery cells BT09 (step S001). Then, the power storage device BT00 determines whether or not the condition for starting the operation of reducing variation in voltages of the plurality of battery cells BT09 is satisfied (step S002). An example of the condition can be that the difference between the maximum value and the minimum value of the voltage measured for each of the plurality of battery cells BT09 is higher than or equal to the predetermined threshold value. In the case where the condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variation in the voltages of the battery cells BT09. In this operation, the power storage device BT00 determines whether each battery cell BT09 is a high-voltage cell or a low-voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the determined discharge battery cell group as the connection destination of the terminal pair BT01, and the control signal S2 for setting the determined charge battery cell group as the connection destination of the terminal pair BT02 (step S005). The power storage device BT00 outputs the generated control signals S1 and S2 to the switching circuit BT04 and the switching circuit BT05 respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts the discharging voltage applied to the terminal pair BT01 into a charging voltage based on the voltage transformation signal S3 and applies the charging voltage to the terminal pair BT02 (step S008). In this way, electric charge of the discharge battery cell group is transferred to the charge battery cell group.

Although the plurality of steps are shown in order in the flow chart of FIG. 23, the order of performing the steps is not limited to the order.

According to the above embodiment, when an electric charge is transferred from the discharge battery cell group to the charge bailer cell group, a structure where an electric charge from the discharge battery cell group is temporarily stored and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of a Si transistor. Accordingly, even when the temperature of the battery cells BT09 is increased, an operation such as turning on or off the transistors in response to the control signals S1 and S2 can be performed normally.

Embodiment 4

In this embodiment, an example of an electronic device including the secondary battery described in Embodiment 1 will be described.

Figure 24:
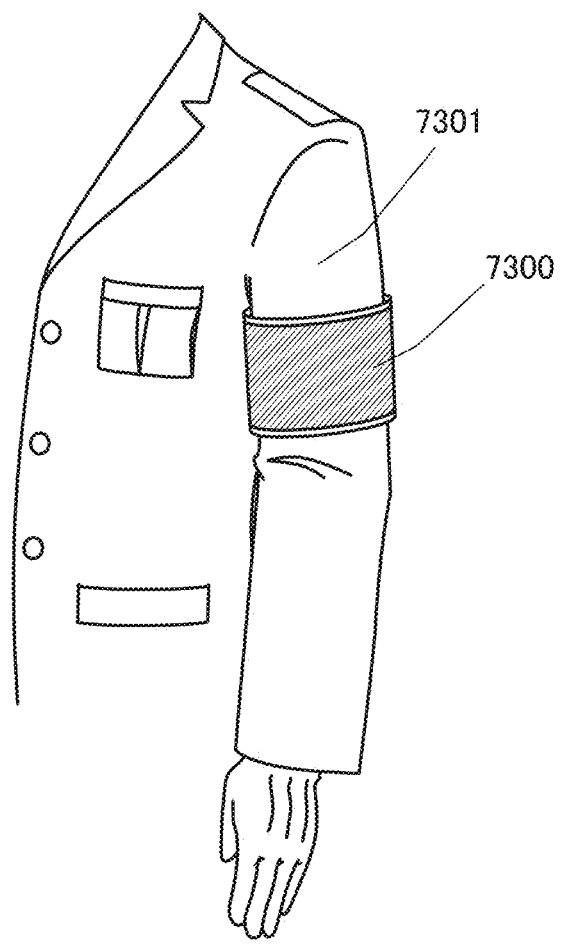
FIG. 24 illustrates an example of an electronic device.

FIG. 24 illustrates an example of an armband electronic device including a flexible secondary battery. An armband device 7300 illustrated in FIG. 24 can be worn on an arm 7301 and includes a display portion having a curved surface and a bendable secondary battery.

Note that in the display portion, a display element, a display device which is a device including a display element, a light-emitting element, and a light-emitting device which is a device including a light-emitting element can employ various modes or can include various elements. The display element, the display device, the light-emitting element, or the light-emitting device includes at least one of an electroluminescence (EL) element (e.g., an EL element including organic and inorganic materials, an organic EL element, or an inorganic EL element), an LED (e.g., a white LED, a red LED, a green LED, or a blue LED), a transistor (a transistor that emits light depending on current), an electron emitter, a liquid crystal element, electronic ink, an electrophoretic element, a grating light valve (GLV), a plasma display panel (PDP), a display element using micro electro mechanical systems (MEMS), a digital micromirror device (DMD), a digital micro shutter (DMS), MIRASOL (registered trademark), an interferometric modulator display (IMOD) element, a MEMS shutter display element, an optical-interference-type MEMS display element, an electrowetting element, a piezoelectric ceramic display, a display element including a carbon nanotube, and the like. Other than the above, a display element, a display device, a light-emitting element, or a light-emitting device may include a display medium whose contrast, luminance, reflectivity, transmittance, or the like is changed by electrical or magnetic effect. Note that examples of display devices having EL elements include an EL display. Examples of display devices including electron emitters are a field emission display (FED) and an SED-type flat panel display (SED: surface-conduction electron-emitter display). Examples of display devices including liquid crystal elements include a liquid crystal display (e.g., a transmissive liquid crystal display, a transflective liquid crystal display, a reflective liquid crystal display, a direct-view liquid crystal display, or a projection liquid crystal display). Examples of a display device including electronic ink, electronic liquid powder (registered trademark), or electrophoretic elements include electronic paper. In the case of a transflective liquid crystal display or a reflective liquid crystal display, some of or all of pixel electrodes function as reflective electrodes. For example, some or all of pixel electrodes are formed to contain aluminum, silver, or the like. In such a case, a memory circuit such as an SRAM can be provided under the reflective electrodes, leading to lower power consumption. Note that in the case of using an LED, graphene or graphite may be provided under an electrode or a nitride semiconductor of the LED. Graphene or graphite may be a multilayer film in which a plurality of layers are stacked. As described above, provision of graphene or graphite enables easy formation of a nitride semiconductor film thereover, such as an n-type GaN semiconductor layer including crystals. Furthermore, a Hype GaN semiconductor layer including crystals or the like can be provided thereover, and thus the LED can be formed. Note that an AlN layer may be provided between the n-type GaN semiconductor layer including crystals and graphene or graphite. The GaN semiconductor layers included in the LED may be formed by MOCVD. Note that when the graphene is provided, the GaN semiconductor layers included in the LED can also be formed by a sputtering method.

The armband device 7300 preferably further includes one or more functional elements. An example of a functional element is a sensor. As the sensor, a sensor having a function of measuring force, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays can be used. The armband device 7300 may include a functional element such as a touch panel, an antenna, a power generation element, and a speaker.

For example, when a user wears the armband device 7300 on his or her arm and makes its display emit light at night-time, traffic safety can be ensured. For another example, when a soldier, a security guard, or the like wears the armband device 7300 on an upper arm, he or she can check a chief's command, which is received in real time and displayed on its display portion, while creeping. It is difficult for a soldier or a security guard to use a wireless device, a mobile phone, or a head-mounted device because he or she wears a helmet and has weapons or tools with hands in executing his or her duties. Thus, it is useful that a soldier or a security guard can wear the armband device 7300 on his or her upper arm and operate it by, for example, voice input to an audio input portion such as a microphone even when his or her hands are full.

The armband device 7300 can also be effectively used in the field of sports. For example, it is difficult for a marathoner to check the time on his or her watch without stopping swinging his or her arms. Stopping swinging his or her arms might disturb his or her rhythm, obstructing his or her run. However, wearing the armband device 7300 on his or her upper arm enables him or her to check the time without stopping swinging of his or her arm. Furthermore, it can display other information (e.g., his or her position in a course or his or her health condition) on its display screen. It is more useful that the armband device 7300 further has a function that allows an athlete to operate it by voice input or the like without using his or her hands, seek instructions from his or her coach by a communication function, and listen the directions output by voice output from an audio output portion such as a speaker or view the instructions displayed on its display screen.

For another example, when a construction crew or the like who wears a helmet wears the armband device 7300 and operates it, he or she can exchange information by communication to easily obtain the positional information of other crews so that he or she can work safely.

FIGS. 25A to 25F illustrate other electronic devices including flexible secondary batteries. Examples of an electronic device including a flexible secondary battery include television sets (also referred to as televisions or television receivers), monitors of computers or the like, cameras such as digital cameras or digital video cameras, digital photo frames, mobile phones (also referred to as cellular phones or mobile phone devices), portable game machines, portable information terminals, audio reproducing devices, and large game machines such as pachinko machines.

In addition, a flexible secondary battery can be incorporated along a curved inside/outside wall surface of a house or a building or a curved interior/exterior surface of an automobile.

Figure 25A:
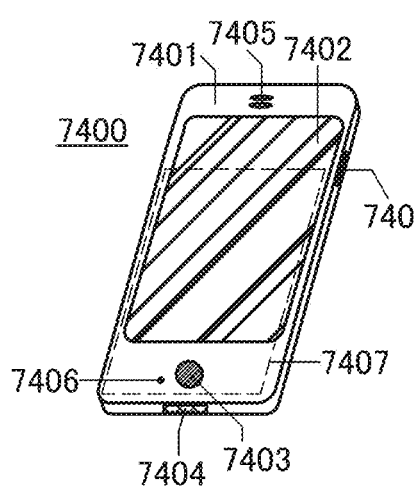
FIGS. 25A to 25F illustrate examples of electronic devices.

FIG. 25A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a secondary battery 7407.

Figure 25B:
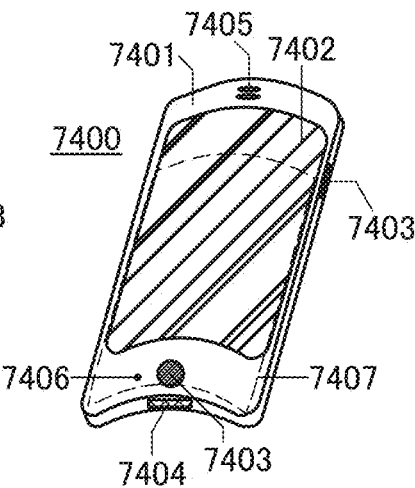
Figure 25C:
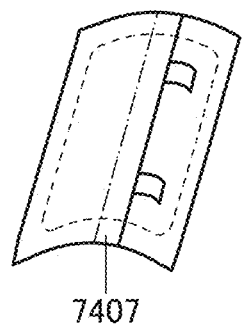

FIG. 25B illustrates the mobile phone 7400 that is curved. When the whole mobile phone 7400 is curved by external force, the secondary battery 7407 included in the mobile phone 7400 is also curved. FIG. 25C illustrates the curved secondary battery 7407. The secondary battery 7407 is a thin secondary battery. The secondary buttery 7407 is curved and fixed. Note that the secondary battery 7407 includes a lead electrode electrically connected to a current collector. The current collector is, for example, copper foil, and partly alloyed with gallium; thus, adhesion between the current collector and an active material layer is improved. Consequently, the secondary battery 7407 can have high reliability even in a state of being curved.

Figure 25D:
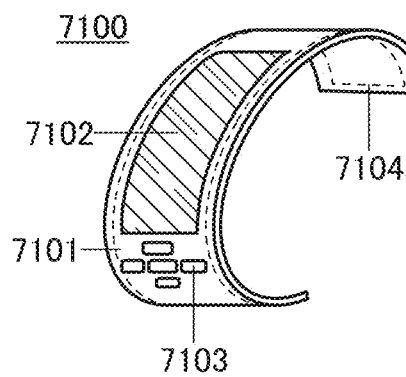
Figure 25E:
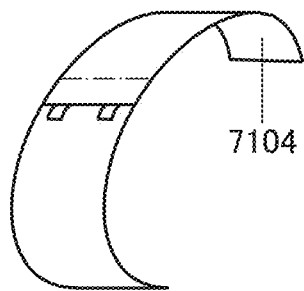
Figure 25F:
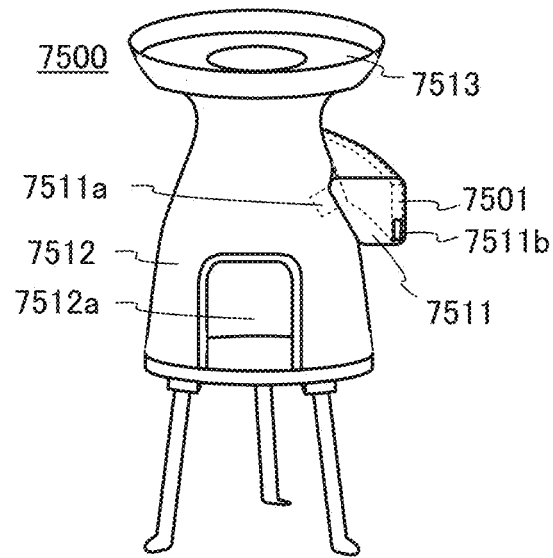

FIG. 25D illustrates an example of a bangle display device. A portable display device 7100 includes a housing 7101, a display portion 7102, an operation button 7103, and a secondary battery 7104. FIG. 25E illustrates the curved secondary battery 7104. When the curved secondary battery 7104 is on a user's arm, the housing changes its form and the curvature of part or the whole of the secondary battery 7104 is changed. Note that the radius of curvature of a curve at a point refers to the radius of the circular arc that best approximates the curve at that point. The reciprocal of the radius of curvature is curvature. Specifically, part or the whole of the housing or the main surface of the secondary battery 7104 is changed in the range of radius of curvature from 4 mm to 150 mm. When the radius of curvature at the main surface of the secondary battery 7104 is greater than or equal to 40 mm and less than or equal to 150 mm, the reliability can be kept high.

With the use of the secondary battery described in the above embodiment as the secondary battery 7104, stress applied to the secondary battery 7104 does not concentrate on the positive electrode tab and the negative electrode tab even when the secondary battery 7104 is transformed at the time of attaching and detaching the portable display device 7100. Thus, it is possible to reduce the possibility of cracking or breaking the positive electrode tab and the negative electrode tab even when attachment and detachment of the portable display device 7100 are repeated. Accordingly, the reliability of the portable display device 7100 can be increased.

Moreover, in the secondary battery described in the above embodiment, the third portion having the lead electrodes is provided between the first and second portions that generate an electromotive force. The lead electrodes of the secondary battery 7104 can be provided close to the display portion 7102 when the secondary battery is used as the secondary battery 7104. Therefore, the secondary battery 7104 can be provided without lengthening a lead wiring.

A secondary battery that can be curved can be provided with high space efficiency in any of a variety of electronic devices. For example, in a stove 7500 illustrated in FIG. 25F, a module 7511 is attached to a main body 7512. The module 7511 includes the secondary battery 7501, a motor, a fan, an air outlet 7511*a*, and a thermoelectric generation device. In the stove 7500, after a fuel is injected through an opening 7512a and ignited, outside air can be sent through the air outlet 7511a to the inside of the stove 7500 by rotating the motor and the fan which are included in the module 7511 using power of the secondary battery 7501. In this manner, the stove 7500 can have strong heating power because outside air can be taken into the inside of the stove 7500 efficiently. In addition, cooking can be performed on an upper grill 7513 with thermal energy generated by the combustion of fuel. The thermal energy is converted into power with the thermoelectric generation device of the module 7511, and the secondary battery 7501 is charged with the power. The power charged into the secondary battery 7501 can be output through an external terminal 7511b.

This embodiment can be implemented in appropriate combination with any of the other embodiments.

Embodiment 5

In this embodiment, other examples of electronic devices that can include the secondary battery described in Embodiment 1 will be described.

Figure 26A:
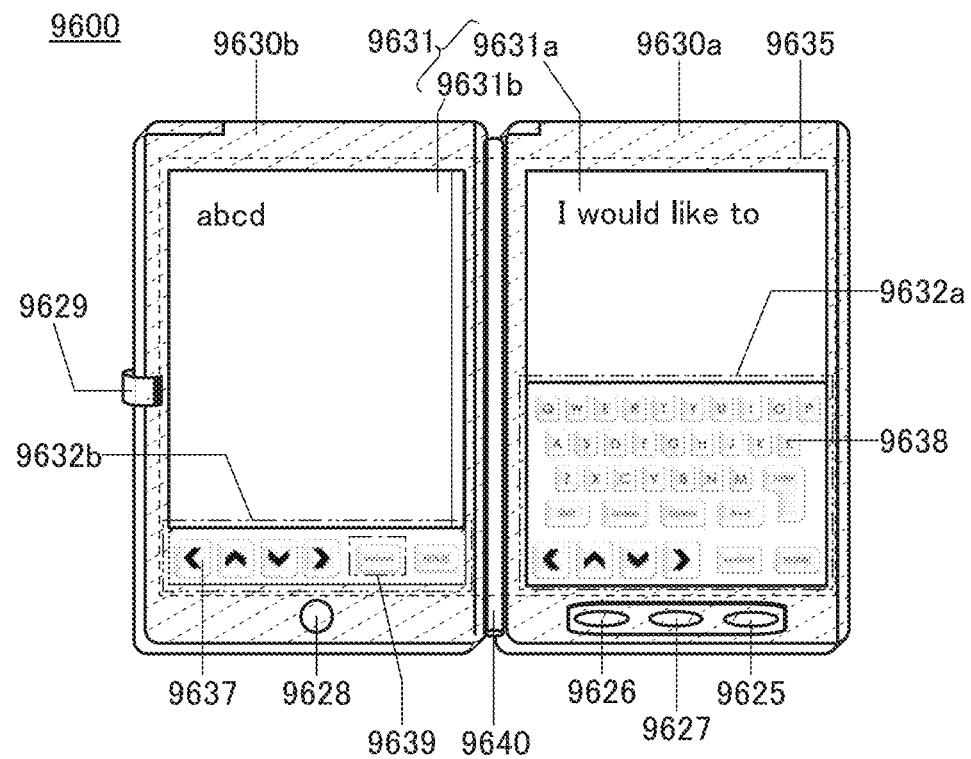
FIGS. 26A to 26C illustrate an example of an electronic device.
Figure 26B:
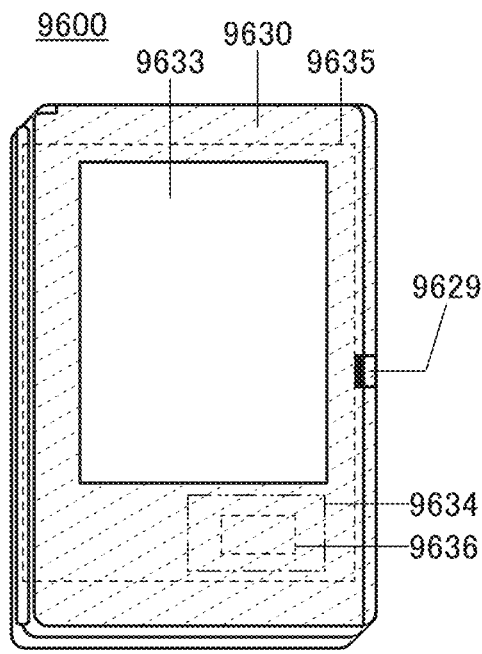

FIGS. 26A and 26B illustrate an example of a tablet terminal that can be folded in half. A tablet terminal 9600 illustrated in FIGS. 26A and 26B includes a housing 9630a, a housing 9630b, a movable portion 9640 connecting the housings 9630a and 9630b, a display portion 9631 including a display portion 9631a and a display portion 9631b, a display mode switch 9626, a power switch 9627, a power-saving mode switch 9625, a fastener 9629, and an operation switch 9628. FIGS. 26A and 26B illustrate the tablet terminal 9600 opened and closed, respectively.

The tablet terminal 9600 includes a secondary battery 9635 inside the housings 9630a and 9630b. The secondary battery 9635 is provided across the housings 9630a and 9630b, passing through the movable portion 9640.

Part of the display portion 9631a can be a touch panel region 9632a, and data can be input by touching operation keys 9638 that are displayed. Note that FIG. 26A illustrates, as an example, that half of the area of the display portion 9631a has only a display function and the other half of the area has a touch panel function. However, the structure of the display portion 9631a is not limited to this, and all the area of the display portion 9631a may have a touch panel function. For example, all the area of the display portion 9631a can display keyboard buttons and serve as a touch panel while the display portion 9631b can be used as a display screen.

As in the display portion 9631a, part of the display portion 9631b can be a touch panel region 9632b. When a keyboard display switching button 9639 displayed on the touch panel is touched with a finger, a stylus, or the like, a keyboard can be displayed on the display portion 9631b.

Touch input can be performed in the touch panel region 9632a and the touch panel region 9632b at the same time.

The switch 9626 for switching a display mode allows switching between a landscape mode and a portrait mode, color display and black-and-white display, and the like. The power-saving mode switch 9625 can control display luminance in accordance with the amount of external light in use of the tablet terminal 9600, which is measured with an optical sensor incorporated in the tablet terminal 9600. In addition to the optical sensor, other detecting devices such as sensors for determining inclination, such as a gyroscope or an acceleration sensor, may be incorporated in the tablet terminal.

Note that FIG. 26A illustrates an example in which the display portion 9631a and the display portion 9631b have the same display area; however, one embodiment of the present invention is not limited and one of the display portions may be different from the other display portion in size and display quality. For example, one of the display portions 9631a and 9631b may display higher definition images than the other.

The tablet terminal is closed in FIG. 26B. The tablet terminal includes the housing 9630, a solar cell 9633, and a charge and discharge control circuit 9634 including a DC-DC converter 9636. The secondary battery of one embodiment of the present invention is used for the secondary battery 9635.

The tablet terminal 9600 can be folded so that the housings 9630a and 9630b overlap with each other when not in use. Thus, the display portions 9631a and 9631b can be protected, which increases the durability of the tablet terminal 9600. In addition, the secondary battery 9635 of one embodiment of the present invention has flexibility and can be repeatedly bent without a large decrease in charge and discharge capacity. Thus, a highly reliable tablet terminal can be provided.

The tablet terminal illustrated in FIGS. 26A and 26B can also have a function of displaying various kinds of data (e.g., a still image, a moving image, and a text image), a function of displaying a calendar, a date, or the time on the display portion, a touch-input function of operating or editing data displayed on the display portion by touch input, a function of controlling processing by various kinds of software (programs), and the like.

The solar cell 9633, which is attached on the surface of the tablet terminal, supplies electric power to a touch panel, a display portion, an image signal processor, and the like. Note that the solar cell 9633 can be provided on one or both surfaces of the housing 9630 and the secondary battery 9635 can be charged efficiently. When the secondary battery of one embodiment of the present invention is used as the secondary battery 9635, a tablet terminal can be used for a long period because the deterioration of discharge capacity caused by repetition of charging and discharging can be suppressed.

Figure 26C:
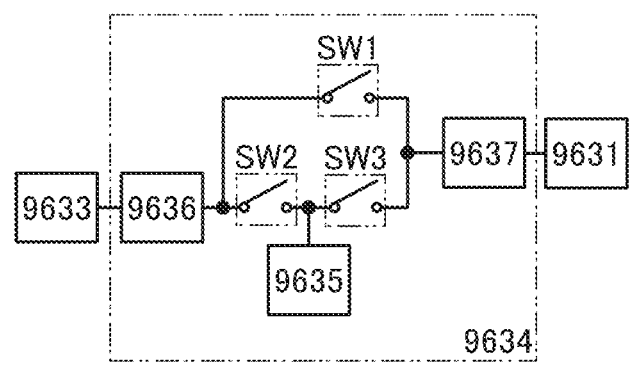

The structure and the operation of the charge and discharge control circuit 9634 illustrated in FIG. 26B will be described with reference to a block diagram in FIG. 26C. The solar cell 9633, the secondary battery 9635, the DC-DC converter 9636, a converter 9637, switches SW1 to SW3, and the display portion 9631 are illustrated in FIG. 26C, and the secondary battery 9635, the DC-DC converter 9636, the converter 9637, and the switches SW1 to SW3 correspond to the charge and discharge control circuit 9634 in FIG. 26B.

First, an example of operation in the case where power is generated by the solar cell 9633 using external light is described. The voltage of electric power generated by the solar cell is raised or lowered by the DC-DC converter 9636 to a voltage for charging the secondary battery 9635. When the display portion 9631 is operated with the power from the solar cell 9633, the switch SW1 is turned on and the voltage of the power is raised or lowered by the converter 9637 to a voltage needed for operating the display portion 9631. In addition, when display on the display portion 9631 is not performed, the switch SW1 is turned off and the switch SW2 is turned on so that the secondary battery 9635 may be charged.

Note that the solar cell 9633 is described as an example of a power generation means; however, one embodiment of the present invention is not limited to this example. The secondary battery 9635 may be charged using another power generation means such as a piezoelectric element or a thermoelectric conversion element (Peltier element). For example, the secondary battery 9635 may be charged with a non-contact power transmission module capable of performing charging by transmitting and receiving electric power wirelessly (without contact), or any of the other charge means used in combination.

Figure 27A:
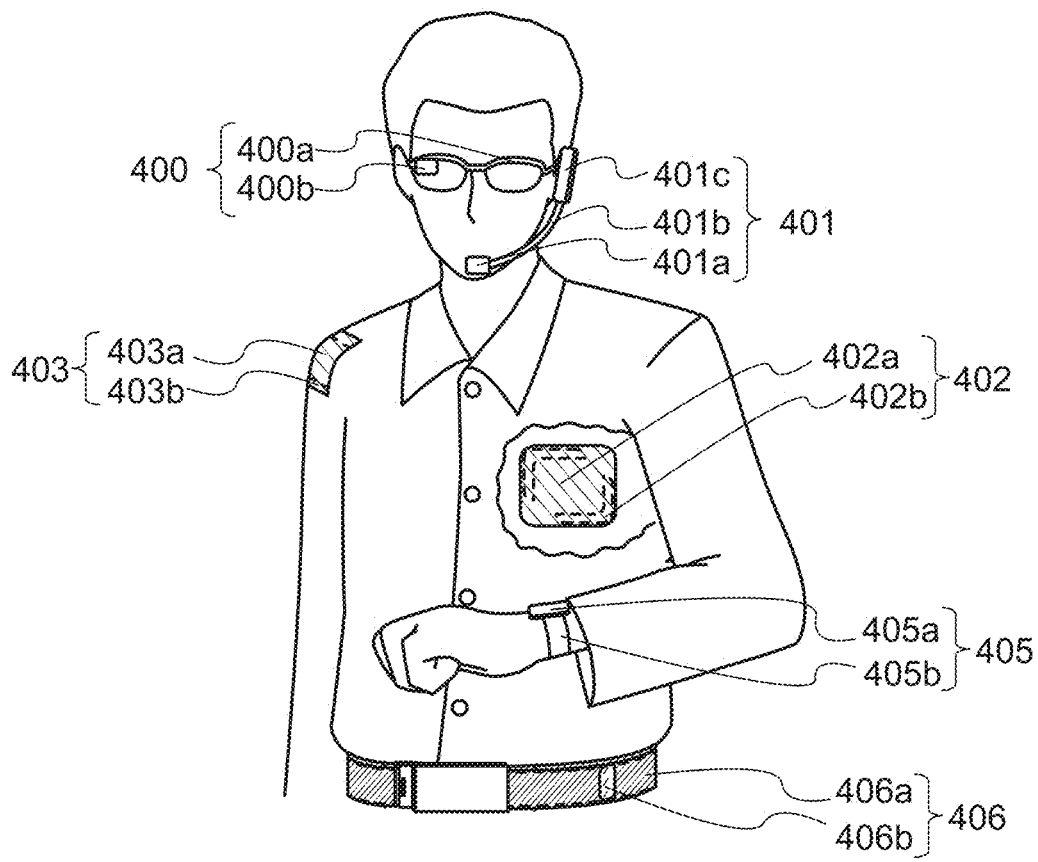
FIGS. 27A to 27C illustrate examples of electronic devices.
Figure 27B:
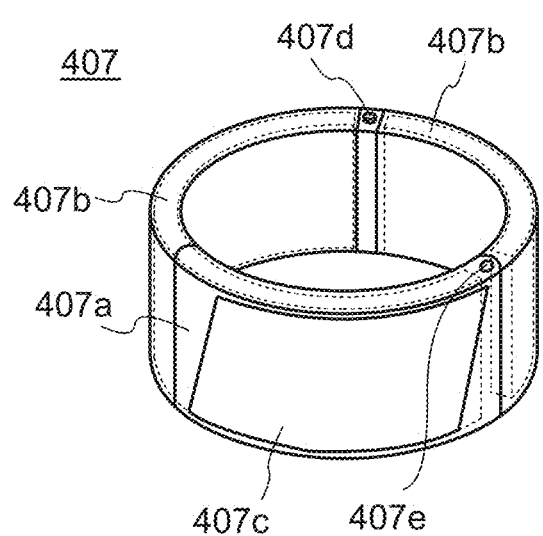
Figure 27C:
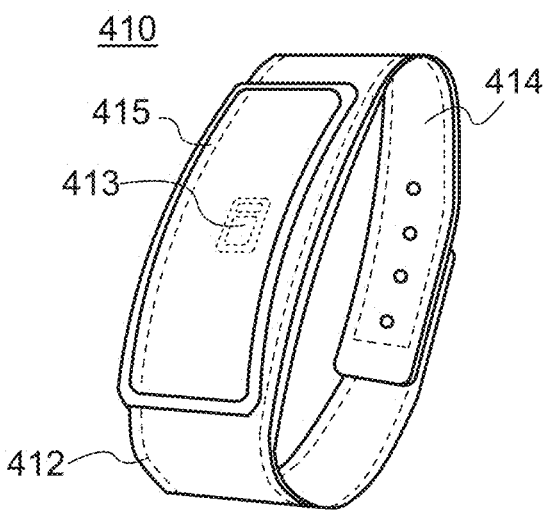

The secondary battery described in Embodiment 1 can be provided in wearable devices illustrated in FIGS. 27A to 27C.

For example, the secondary battery can be provided in a glasses-type device 400 illustrated in FIG. 27A. The glasses-type device 400 includes a frame 400a and a display portion 400b. The secondary battery is provided in a temple of the frame 400a with a curved shape, whereby the glasses-type device 400 can have a well-balanced weight and can be used continuously for a long time.

The secondary battery can be provided in a headset-type device 401. The headset-type device 401 includes at least a microphone part 401a, a flexible pipe 401b, and an earphone part 401c. The secondary battery can be provided in the flexible pipe 401b and the earphone part 401c.

Furthermore, the secondary battery can be provided in a device 402 that can be attached directly to a body. The secondary battery 402b can be provided in a thin housing 402a of the device 402.

Furthermore, the secondary battery can be provided in a device 403 that can be attached to clothes. The secondary battery 403b can be provided in a thin housing 403a of the device 403.

Furthermore, the secondary battery can be provided in a watch-type device 405. The watch-type device 405 includes a display portion 405a and a belt portion 405b, and the secondary battery can be provided in the display portion 405a or the belt portion 405b. Moreover, in the secondary battery described in the above embodiment, the third portion having the lead electrodes is provided between the first and second portions that generate an electromotive force. For example, the lead electrodes of the secondary battery 7104 can be provided close to the display portion 405a when the secondary battery is used for the belt portion 405b. Therefore, the secondary battery 7104 can be provided without lengthening a lead wiring.

Furthermore, the secondary battery can be provided in a bell-type device 406. The belt-type device 406 includes a belt portion 406a and a wireless power feeding and receiving portion 406b, and the secondary battery can be provided inside the belt portion 406a.

The secondary battery described in Embodiment 1 can be provided in a wristband device 407 illustrated in FIG. 27B. The wristband device 407 includes two curved secondary batteries 407b in a case 407a. A curved display portion 407c is provided over a surface of the case 407a. For the display portion which can be used for the display portion 407c, the description of the display portion in FIG. 24 can be referred to. The armband device 407 includes a connection portion 407d and a hinge portion 407e. A portion between the connection portion 407d and the hinge portion 407e can be flexibly moved using the hinge portion 407e as an axis. Charging or the like through an external terminal provided in the connection portion 407d is also possible.

The secondary battery described in the above embodiment can be provided in a wearable device 410 illustrated in FIG. 27C. The wearable device 410 includes a sensor portion 413, a display portion 415, and a band portion 414 and can be worn on a wrist or the like, for example. A curved secondary battery 412 is provided on the band portion 414.

With the use of the secondary battery described in the above embodiment as the secondary battery 412, stress applied to the secondary battery 412 does not concentrate on the positive electrode tab and the negative electrode tab even when the secondary battery 412 is transformed at the time of attaching and detaching the wearable device 410. Thus, it is possible to reduce the possibility of cracking or breaking the positive electrode tab and the negative electrode tab even when attachment and detachment of the wearable device 410 are repeated. Accordingly, the reliability of the wearable device 410 can be increased.

Moreover, in the secondary battery described in the above embodiment, the third portion having the lead electrodes is provided between the first and second portions that generate an electromotive force. The lead electrodes of the secondary battery 412 can be provided close to the sensor portion 413 and the display portion 415 when the secondary battery is used as the secondary battery 412. Therefore, the secondary battery 412 can be provided without lengthening a lead wiring.

Figure 28:
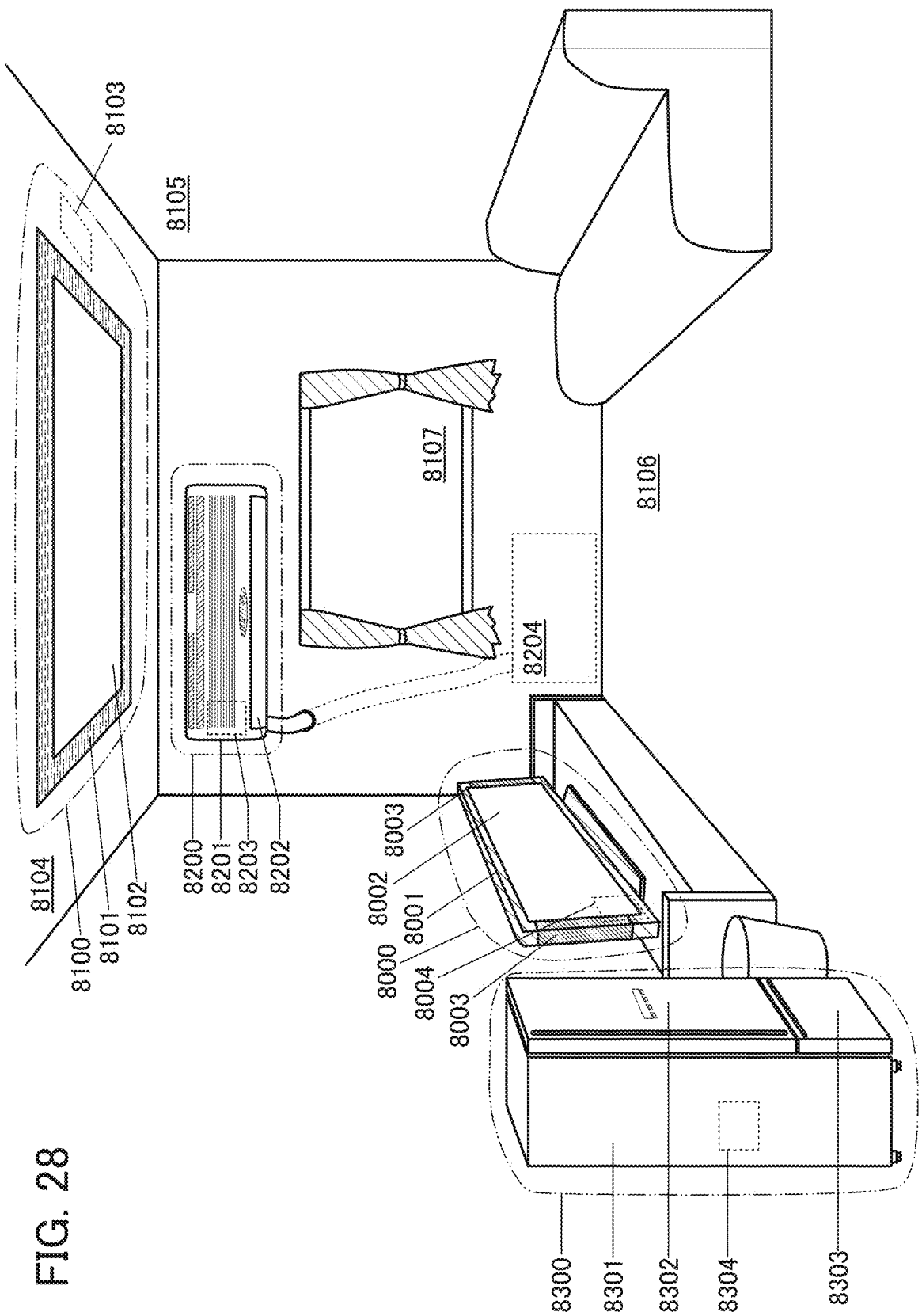
FIG. 28 illustrates examples of electronic devices.

FIG. 28 illustrates examples of other electronic devices. In FIG. 28, a display device 8000 is an example of an electronic device using a secondary battery 8004 of one embodiment of the present invention. Specifically, the display device 8000 corresponds to a display device for TV broadcast reception and includes a housing 8001, a display portion 8002, speaker portions 8003, the secondary battery 8004, and the like. The secondary battery 8004 of one embodiment of the present invention is provided in the housing 8001. The display device 8000 can receive power from a commercial power source. Alternatively, the display device 8000 can use power stored in the secondary battery 8004. Thus, the display device 8000 can be operated with the use of the secondary battery 8004 of one embodiment of the present invention as an uninterruptible power source even when power cannot be supplied from a commercial power source due to power failure or the like.

A semiconductor display device such as a liquid crystal display device, a light-emitting device in which a light-emitting element such as an organic EL element is provided in each pixel, an electrophoretic display device, a digital micromirror device (DMD), a plasma display panel (PDP), or a field emission display (FED) can be used for the display portion 8002.

Note that the display device includes, in its category, all of information display devices for personal computers, advertisement displays, and the like besides TV broadcast reception.

In FIG. 28, an installation lighting device 8100 is an example of an electronic device using a secondary battery 8103 of one embodiment of the present invention. Specifically, the installation lighting device 8100 includes a housing 8101, a light source 8102, the secondary battery 8103, and the like. Although FIG. 28 illustrates the case where the secondary battery 8103 is provided in a ceiling 8104 on which the housing 8101 and the light source 8102 are installed, the secondary battery 8103 may be provided in the housing 8101. The installation lighting device 8100 can receive power from a commercial power source. Alternatively, the installation lighting device 8100 can use power stored in the secondary battery 8103. Thus, the installation lighting device 8100 can be operated with the use of the secondary battery 8103 of one embodiment of the present invention as an uninterruptible power source even when power cannot be supplied from a commercial power source due to power failure or the like.

Note that although the installation lighting device 8100 provided in the ceiling 8104 is illustrated in FIG. 28 as an example, the secondary battery of one embodiment of the present invention can be used as an installation lighting device provided in, for example, a wall 8105, a floor 8106, a window 8107, or the like other than the ceiling 8104. Alternatively, the secondary battery can be used in a tabletop lighting device or the like.

As the light source 8102, an artificial light source which emits light artificially by using electric power can be used. Specifically, an incandescent lamp, a discharge lamp such as a fluorescent lamp, and light-emitting elements such as an LED and an organic EL element are given as examples of the artificial light source.

In FIG. 28, an air conditioner including an indoor unit 8200 and an outdoor unit 8204 is an example of an electronic device using a secondary battery 8203 of one embodiment of the present invention. Specifically, the indoor unit 8200 includes a housing 8201, an air outlet 8202, the secondary battery 8203, and the like. Although FIG. 28 illustrates the case where the secondary battery 8203 is provided in the indoor unit 8200, the secondary battery 8203 may be provided in the outdoor unit 8204. Alternatively, the secondary batteries 8203 may be provided in both the indoor unit 8200 and the outdoor unit 8204. The an conditioner can receive power from a commercial power source. Alternatively, the air conditioner can use power stored in the secondary battery 8203. Particularly in the case where the secondary batteries 8203 are provided in both the indoor unit 8200 and the outdoor unit 8204, the air conditioner can be operated with the use of the secondary battery 8203 of one embodiment of the present invention as an uninterruptible power source even when power cannot be supplied from a commercial power source due to power failure or the like.

Note that although the split-type air conditioner including the indoor unit and the outdoor unit is illustrated in FIG. 28 as an example, the secondary battery of one embodiment of the present invention can be used in an air conditioner in which the functions of an indoor unit and an outdoor unit are integrated in one housing.

In FIG. 28, an electric refrigerator-freezer 8300 is an example of an electronic device using a secondary battery 8304 of one embodiment of the present invention. Specifically, the electric refrigerator-freezer 8300 includes a housing 8301, a door for a refrigerator 8302, a door for a freezer 8303, the secondary battery 8304, and the like. The secondary battery 8304 is provided inside the housing 8301 in FIG. 28. The electric refrigerator-freezer 8300 can receive power from a commercial power source. Alternatively, the electric refrigerator-freezer 8300 can use power stored in the secondary battery 8304. Thus, the electric refrigerator-freezer 8300 can be operated with the use of the secondary battery 8304 of one embodiment of the present invention as an uninterruptible power source even when power cannot be supplied from a commercial power source due to power failure or the like.

This embodiment can be implemented in appropriate combination with any of the other embodiments.

Embodiment 6

In this embodiment, examples of vehicles including the secondary battery described in Embodiment 1 will be described.

The use of secondary batteries in vehicles enables production of next-generation clean energy vehicles such as hybrid electric vehicles (HEVs), electric vehicles (EVs), and plug-in hybrid electric vehicles (PHEVs).

Figure 29A:
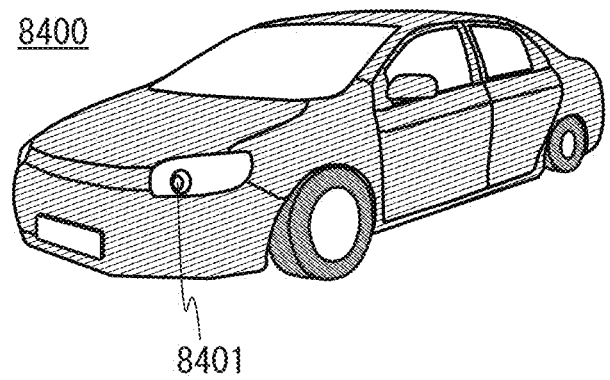
FIGS. 29A and 29B illustrate examples of vehicles.
Figure 29B:
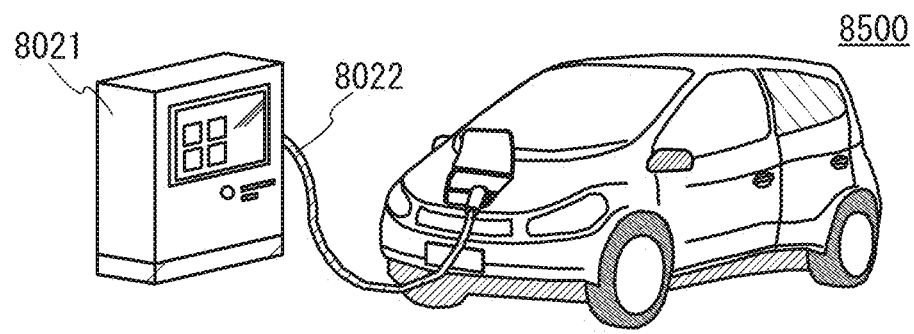

FIGS. 29A and 29B each illustrate an example of a vehicle using one embodiment of the present invention. An automobile 8400 illustrated in FIG. 29A is an electric vehicle which runs on the power of the electric motor. Alternatively, the automobile 8400 is a hybrid electric vehicle capable of driving using either the electric motor or the engine as appropriate. One embodiment of the present invention achieves a high-mileage vehicle. The automobile 8400 includes the secondary battery. The secondary battery is used not only to drive the electric motor, but also to supply electric power to a light-emitting device such as a headlight 8401 or a room light (not illustrated).

The secondary battery can also supply electric power to a display device of a speedometer, a tachometer, or the like included in the automobile 8400. Furthermore, the secondary battery can supply electric power to a semiconductor device included in the automobile 8400, such as a navigation system.

FIG. 29B illustrates an automobile 8500 including the secondary battery. The automobile 8500 can be charged when the secondary battery is supplied with electric power through external charging equipment by a plug-in system, a contactless power feeding system, or the like. In FIG. 29B, the power storage device included in the automobile 8500 is charged with the use of a ground-based charging apparatus 8021 through a cable 8022. In charging, a given method such as CHAdeMO (registered trademark) or Combined Charging System may be referred to for a charging method, the standard of a connector, or the like as appropriate. The charging apparatus 8021 may be a charging station provided in a commerce facility or a power source in a house. With the use of a plug-in technique, the secondary battery included in the automobile 8500 can be charged by being supplied with electric power, from outside, for example. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between vehicles. A solar cell may be provided in the exterior of the vehicle to charge the secondary battery when the vehicle stops or moves. To supply electric power in such a contactless manner, an electromagnetic induction method or a magnetic resonance method can be used.

Furthermore, the secondary battery included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

REFERENCE NUMERALS

10: secondary battery, 11: first portion, 12: second portion, 13: third portion, 21: first direction, 22: second direction, 101: positive electrode current collector, 102: positive electrode active material layer, 103: separator, 104: electrolyte solution, 105: negative electrode current collector, 106: negative electrode active material layer, 107a: exterior body, 107b: exterior body, 107c: exterior body, 107d: exterior body, 107e: exterior body, 107f: exterior body, 107ab: bonding portion, 107ac: bonding portion, 107bc: bonding portion, 111: positive electrode, 111a: positive electrode, 111b: positive electrode, 115: negative electrode, 115a: negative electrode, 115b: negative electrode, 120: sealing layer, 121: positive electrode lead, 125: negative electrode lead, 130: cushioning material, 321: graphene, 322: positive electrode active material, 331: region, 332: region, 333: region, 400: glasses-type device, 400a: frame, 400b: display portion, 401: headset-type device, 401a: microphone part, 401b: flexible pipe, 401c: earphone part, 402: device, 402a: housing, 402b: secondary battery, 403: device, 403a: housing, 403b: secondary battery, 405: watch-type device, 405a: display portion, 405b: belt portion, 406: belt-type device, 406a: belt portion, 406b: wireless power feeding and receiving portion, 407: armband device, 407a: case, 407b: secondary battery, 407c: display portion, 407d: connection portion, 407e: hinge portion, 410: wearable device, 412: secondary battery, 413: sensor portion, 414: band portion, 415: display portion, 7100: portable display device, 7101: housing, 7102: display portion, 7103: operation button, 7104: secondary battery, 7300: armband device, 7301: arm, 7400: mobile phone, 7401: housing, 7402: display portion, 7403: operation button, 7404: external connection port, 7405: speaker, 7406: microphone, 7407: secondary battery, 7500: stove, 7501: secondary battery, 7511: module, 7511a: air outlet, 7511b: external terminal, 7512: main body, 7512a: opening, 7513: grill, 8000: display device, 8001: housing, 8002: display portion, 8003: speaker portion, 8004: secondary battery, 8021: charging apparatus, 8022: cable, 8100: lighting device, 8101 housing, 8102: light source, 8103: secondary battery, 8104: ceiling, 8105: wall, 8106: floor, 8107: window, 8200: indoor unit, 8201: housing, 8202: air outlet, 8203: secondary battery, 8204: outdoor unit, 8300: electric refrigerator-freezer, 8301: housing, 8302: door for a refrigerator, 8303: door for a freezer, 8304: secondary battery, 8400: automobile, 8401: headlight, 8500: automobile, 9600: tablet terminal, 9625: switch, 9626: switch, 9627: power switch, 9628: operation switch, 9629: fastener, 9630: housing, 9630a: housing, 9630b: housing, 9631: display portion, 9631a: display portion, 9631b: display portion, 9632a: region, 9632b: region, 9633: solar cell, 9634: charge and discharge control circuit, 9635: secondary battery, 9636: DC-DC converter, 9637: converter, 9638: operation key, 9639: button, 9640: movable portion, BT00: power storage device, BT01: terminal pair, BT02: terminal pair, BT03: control circuit, BT04: circuit, BT05: circuit, BT06: voltage transformation control circuit, BT07: voltage transformer circuit, BT08: battery portion, BT09: battery cell, BT10: transistor, BT11: bus, BT12: bus, BT13: transistor, BT14: current control switch, BT15: bus, BT16: bus, BT17: switch pair, BT18: switch pair, BT21: transistor pair, BT22: transistor, BT23: transistor, BT24: bus, BT25: bus, BT31: transistor pair, BT32: transistor, BT33: transistor, BT34: bus, BT35: bus, BT41: battery management unit, BT51: insulated DC-DC converter, BT52: switch portion, BT53: transformer, S1: control signal, S2: control signal, S3: voltage transformation signal, SW1: switch, SW2: switch, SW3: switch.

This application is based on Japanese Patent Application serial no. 2015-010992 filed with Japan Patent Office on Jan. 23, 2015, the entire contents of which are hereby incorporated by reference.

The invention claimed is:

1. A secondary battery comprising:
a first electrode;
a second electrode;
a separator;
a first lead; and
a second lead,
wherein the secondary battery comprises a bottom surface forming an arc, the arc comprising a first portion extending from a first edge to a first vicinity of a center of curvature of the arc, a second portion extending from a second edge to a second vicinity of the center of curvature of the arc, and a third portion including the center of curvature of the arc and between the first portion and the second portion,
wherein the first electrode overlaps with the second electrode with the separator provided therebetween in the first portion and the second portion,
wherein the first electrode is curved along the arc in the first portion and the second portion,
wherein the first electrode is bent outward to protrude from an upper surface of the arc opposite the bottom surface in the third portion so as to form a first folded portion, and the first lead is connected to the first folded portion, and
wherein the third portion and the first portion or the second portion form an angle.

2. The secondary battery according to claim 1,
wherein the first electrode comprises a first groove or a first opening in the third portion,
wherein the second electrode comprises a second groove or a second opening in the third portion, and
wherein the separator comprises a third groove or a third opening in the third portion.

3. The secondary battery according to claim 1,
wherein an edge of the first electrode is located inside an edge of the second electrode.

4. A secondary battery comprising:
a first electrode;
a second electrode;
a separator;
a first lead;
a second lead;
a first exterior body; and
a second exterior body,
wherein the secondary battery comprises a bottom surface forming an arc, the arc comprising a first portion extending from a first edge to a first vicinity of a center of curvature of the arc, a second portion extending from a second edge to a second vicinity of the center of curvature of the arc, and a third portion including the center of curvature of the arc and between the first portion and the second portion,
wherein the first electrode overlaps with the second electrode with the separator provided therebetween in the first portion and the second portion,
wherein the first electrode is curved along the arc in the first portion and the second portion,
wherein the first electrode is bent outward to protrude from an upper surface of the arc opposite the bottom surface in the third portion so as to form a first folded portion, and the first lead is connected to the first folded portion, wherein the second electrode is curved along the arc in the first portion and the second portion, wherein the second electrode is bent outward to protrude from the upper surface of the arc opposite the bottom surface in the third portion so as to form a second folded portion, and the second lead is connected to the second folded portion, wherein the third portion and the first portion or the second portion form an angle, wherein the first exterior body and the second exterior body are provided to wrap the first electrode, the second electrode, and the separator, and wherein the first exterior body is attached to the second exterior body in the third portion.

5. The secondary battery according to claim 4, further comprising a third exterior body, wherein the third exterior body is attached to the first exterior body in the first portion, and wherein the third exterior body is attached to the second exterior body in the second portion.

6. The secondary battery according to claim 4, wherein the first electrode comprises a first groove or a first opening in the third portion, wherein the second electrode comprises a second groove or a second opening in the third portion, and wherein the separator comprises a third groove or a third opening in the third portion.

7. The secondary battery according to claim 4, wherein an edge of the first electrode is located inside an edge of the second electrode.

8. The secondary battery according to claim 4, wherein the first exterior body is folded at a boundary between the first portion and the third portion, and wherein the second exterior body is folded at a boundary between the second portion and the third portion.

9. The secondary battery according to claim 4, wherein a cushioning material is provided between the first exterior body, and the first electrode or the second electrode.

10. A secondary battery comprising:
a first negative electrode;
a first separator over the first negative electrode;
a first positive electrode over the first separator;
a second positive electrode over the first positive electrode;
a second separator over the second positive electrode;
a second negative electrode over the second separator;
a first lead; and
a second lead, wherein the secondary battery comprises a bottom surface forming an arc, the arc comprising a first portion extending from a first edge to a first vicinity of a center of curvature of the arc, a second portion extending from a second edge to a second vicinity of the center of curvature of the arc, and a third portion including the center of curvature of the arc and between the first portion and the second portion, wherein the first negative electrode overlaps with the first positive electrode, the second positive electrode, and the second negative electrode in the first portion and the second portion, wherein the first negative electrode is curved along the arc in the first portion and the second portion, wherein the second negative electrode is curved along the arc in the first portion and the second portion, wherein the first negative electrode and the second negative electrode are bent outward to protrude from an upper surface of the arc opposite the bottom surface in the third portion so as to form a first folded portion, and the first lead is connected to the first folded portion, wherein the first positive electrode is curved along the arc in the first portion and the second portion, wherein the second positive electrode is curved along the arc in the first portion and the second portion, wherein the first positive electrode and the second positive electrode are bent outward to protrude from the upper surface of the arc opposite the bottom surface in the third portion so as to form a second folded portion, and the second lead is connected to the second folded portion, wherein the first negative electrode and the second negative electrode are fixed to the first lead in the third portion, wherein the first positive electrode and the second positive electrode are fixed to the second lead in the third portion, and wherein the third portion and the first portion or the second portion form an angle.

11. The secondary battery according to claim 10, wherein each of the first negative electrode and the second negative electrode comprises a first groove or a first opening in the third portion, wherein each of the first positive electrode and the second positive electrode comprises a second groove or a second opening in the third portion, and wherein each of the first separator and the second separator comprises a third groove or a third opening in the third portion.

12. A watch-type device comprising:
a display portion;
a belt portion; and
the secondary battery according to claim 1,
wherein the secondary battery is in the belt portion, and
wherein the first lead or the second lead is provided close to the display portion.

13. A watch-type device comprising:
a display portion;
a belt portion; and
the secondary battery according to claim 4,
wherein the secondary battery is in the belt portion, and
wherein the first lead or the second lead is provided close to the display portion.

14. A watch-type device comprising:
a display portion;
a belt portion; and
the secondary battery according to claim 10,
wherein the secondary battery is in the belt portion, and
wherein the first lead or the second lead is provided close to the display portion.

* * * * *